United States Patent
Inazumi et al.

(10) Patent No.: US 10,311,596 B2
(45) Date of Patent: Jun. 4, 2019

(54) IMAGE PROCESSING DEVICE, ROBOT, ROBOT SYSTEM, AND MARKER

(71) Applicant: Seiko Epson Corporation, Tokyo (JP)

(72) Inventors: Mitsuhiro Inazumi, Shiojiri (JP); Seiji Aiso, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/290,324

(22) Filed: Oct. 11, 2016

(65) Prior Publication Data

US 2017/0109856 A1 Apr. 20, 2017

(30) Foreign Application Priority Data

Oct. 16, 2015 (JP) ................................. 2015-204358
Oct. 16, 2015 (JP) ................................. 2015-204360
Oct. 19, 2015 (JP) ................................. 2015-205301

(51) Int. Cl.
*B25J 9/16* (2006.01)
*G06T 7/73* (2017.01)

(52) U.S. Cl.
CPC ............... *G06T 7/73* (2017.01); *B25J 9/1697* (2013.01); *G06T 2207/10004* (2013.01)

(58) Field of Classification Search
CPC ............... G06K 7/1443; G06K 9/4604; G06K 19/06037; G06T 1/0014; G06T 7/73; G06T 2207/10004; B25J 9/1697
See application file for complete search history.

(56) References Cited

U.S. PATENT DOCUMENTS

| | | | | |
|---|---|---|---|---|
| 4,939,354 A | * | 7/1990 | Priddy ..................... | G06K 7/14 235/436 |
| 5,614,704 A | * | 3/1997 | Aoki ..................... | G06K 7/1093 235/436 |
| 5,726,435 A | * | 3/1998 | Hara ........................ | G06K 7/14 235/462.09 |
| 6,000,614 A | * | 12/1999 | Yang ..................... | G06K 7/1473 235/456 |
| 6,082,619 A | * | 7/2000 | Ma .......................... | G06K 7/14 235/462.1 |
| 6,550,685 B1 | * | 4/2003 | Kindberg ......... | G06K 19/06028 235/462.01 |
| 8,434,690 B2 | * | 5/2013 | Ushijima ......... | G06K 19/06037 235/454 |
| 8,526,668 B2 | | 9/2013 | Inazumi | |
| 2001/0012413 A1 | * | 8/2001 | Longacre, Jr. ..... | G06K 7/10722 382/313 |
| 2007/0069026 A1 | | 3/2007 | Aoyama | |

(Continued)

FOREIGN PATENT DOCUMENTS

JP H10-214317 A 8/1998
JP 2007-090448 A 4/2007

(Continued)

*Primary Examiner* — Brenda C Bernardi
(74) *Attorney, Agent, or Firm* — Harness, Dickey & Pierce, P.L.C.

(57) ABSTRACT

An image processing device that detects a marker, in which the marker includes a first figure in which three or more figure centers are overlapped with each other and a data area provided on an internal or external portion of the first figure, and the image processing device detects the first figure and detects the data area based on the figure centers of the first figure.

19 Claims, 45 Drawing Sheets

(56) References Cited

U.S. PATENT DOCUMENTS

| | | | |
|---|---|---|---|
| 2007/0071320 A1* | 3/2007 | Yada | G06K 7/14 |
| | | | 382/181 |
| 2008/0249663 A1 | 10/2008 | Aoyama | |
| 2011/0135160 A1* | 6/2011 | Sagan | G06K 9/00577 |
| | | | 382/108 |
| 2012/0145779 A1* | 6/2012 | Bietenbeck | G06K 19/06037 |
| | | | 235/375 |
| 2013/0313330 A1* | 11/2013 | Inazumi | G06K 9/4604 |
| | | | 235/494 |
| 2014/0100694 A1* | 4/2014 | Rueckl | B25J 9/1692 |
| | | | 700/254 |
| 2016/0059419 A1* | 3/2016 | Suzuki | B25J 9/1697 |
| | | | 700/114 |
| 2016/0155037 A1* | 6/2016 | Kobori | G06K 19/06168 |
| | | | 235/494 |
| 2016/0239952 A1* | 8/2016 | Tanaka | G01D 5/26 |
| 2018/0085926 A1* | 3/2018 | Kogan | B25J 9/1676 |

FOREIGN PATENT DOCUMENTS

| | | | |
|---|---|---|---|
| JP | 2007-304732 A | 11/2007 | |
| JP | 2011-216067 A | 10/2011 | |
| JP | 2013-084031 A | 5/2013 | |

* cited by examiner

| MARKER | SIZE OF MARKER VERTICAL × HORIZONTAL (mm) | NUMBER OF BITS INDICATING CODE | NUMBER OF BITS THAT CAN CORRECT ERROR |
|---|---|---|---|
| Mk3 | 10 × 28<br>7 × 20<br>(5 × 14) | 12 | 0 |
|  |  | 11 | 1<br>(PARITY) |
| Mk4 | 10 × 21<br>7 × 15<br>(5 × 11) | 18 | 0 |
|  |  | 16 | 2<br>(PARITY) |
|  |  | 11 | 7<br>(HUMMING CODE + PARITY) |

FIG.28

CORRESPONDING INFORMATION

| MARKER ID | DETECTION METHOD | DETECTABLE RANGE | |
|---|---|---|---|
| | | DETECTABLE MINIMUM THRESHOLD VALUE | DETECTABLE MAXIMUM THRESHOLD VALUE |
| 1 | -1 | Null | Null |
| 2 | 90 | 80 | 100 |
| 3 | 180 | 160 | 200 |
| 4 | -2 | Null | Null |
| ... | ... | ... | ... |
| N | -1 | Null | Null |

CORRESPONDING INFORMATION FOR EACH CONDITION BASED ON SAMPLE IMAGE GS1

| MARKER ID | DETECTABLE RANGE | | WHETHER DETECTION BY SECOND DETECTION METHOD CAN BE PERFORMED | THRESHOLD VALUE OF BINARIZATION BY SECOND DETECTION METHOD |
|---|---|---|---|---|
| | DETECTABLE MINIMUM THRESHOLD VALUE | DETECTABLE MAXIMUM THRESHOLD VALUE | | |
| 1 | 70 | 120 | 1 | 90 |
| 2 | 80 | 140 | 0 | Null |
| 3 | 90 | 150 | 1 | 200 |
| ... | ... | ... | ... | ... |
| N | 50 | 160 | 0 | Null |

CORRESPONDING INFORMATION FOR EACH CONDITION BASED ON SAMPLE IMAGE GS2

| MARKER ID | DETECTABLE RANGE | | WHETHER DETECTION BY SECOND DETECTION METHOD CAN BE PERFORMED | THRESHOLD VALUE OF BINARIZATION BY SECOND DETECTION METHOD |
|---|---|---|---|---|
| | DETECTABLE MINIMUM THRESHOLD VALUE | DETECTABLE MAXIMUM THRESHOLD VALUE | | |
| 1 | 90 | 130 | 1 | 160 |
| 2 | 70 | 170 | 0 | Null |
| 3 | 100 | 130 | 0 | Null |
| ... | ... | ... | ... | ... |
| N | 80 | 140 | 1 | 100 |

CORRESPONDING INFORMATION FOR EACH CONDITION BASED ON SAMPLE IMAGE GS3

| MARKER ID | DETECTABLE RANGE | | WHETHER DETECTION BY SECOND DETECTION METHOD CAN BE PERFORMED | THRESHOLD VALUE OF BINARIZATION BY SECOND DETECTION METHOD |
|---|---|---|---|---|
| | DETECTABLE MINIMUM THRESHOLD VALUE | DETECTABLE MAXIMUM THRESHOLD VALUE | | |
| 1 | 120 | 150 | 1 | 30 |
| 2 | 100 | 140 | 1 | 110 |
| 3 | 110 | 180 | 0 | Null |
| ... | ... | ... | ... | ... |
| N | 100 | 200 | 0 | Null |

FIG.47

IMAGE PROCESSING DEVICE, ROBOT, ROBOT SYSTEM, AND MARKER

BACKGROUND

1. Technical Field

The invention relates to an image processing device, a robot, a robot system, and a marker.

2. Related Art

There has been research and development on a robot that detects a marker or a target object from an image and performs work according to a detected marker or a detected target object.

Relating to this, a two-dimensional code including a marker configured with an area of a first color and an area of a second color adjacent to each other and a data matrix formed from binary data cells arranged in a matrix form is known (see JP-A-2013-84031).

An image detection method for binarizing a captured image using a threshold value for enabling a marker to be identified, detecting a marker candidate from the binarized captured image, and excluding marker candidates detected by incorrect recognition from the detected marker candidates is known (see JP-A-2007-304732).

However, since the two-dimensional code illustrated in JP-A-2013-84031 has to be detected based on the area of the first color and the area of the second color in the captured image including the aforementioned two-dimensional code, there have been cases where the detection has failed due to external factors such as dirt in these areas, variation of the aforementioned area with time, or variation of image capturing conditions such as ambient light at the time of capturing the aforementioned captured image.

In the image detection method in JP-A-2007-304732, there have been cases where it has been difficult to have compatibility between improvement in the detection accuracy of the marker and shortening of the detection time of the marker without detecting the aforementioned marker by a detection method appropriate for each of plural markers included in a captured image.

In this image detection method, there are cases where a threshold value for binarizing the aforementioned captured image in which can detect all markers are included in the captured image cannot be selected as a threshold value appropriate for detecting the marker, and thus there are cases where not all the markers included in the aforementioned captured image can be detected. As a result, in the aforementioned image detection method, there are cases where it is difficult to improve the accuracy of detecting the marker from the aforementioned captured image.

SUMMARY

An advantage of some aspects of the invention is to solve at least a part of the problems described above, and the invention can be implemented as the following aspects or application examples.

Application Example 1

This application example is directed to an image processing device that detects a marker, in which the marker includes a first figure in which three or more figure centers are overlapped with each other and a data area provided on an internal or external portion of the first figure, and the image processing device detects the first figure and detects the data area based on the figure centers of the first figure.

According to this configuration, the image processing device detects the first figure and detects the data area based on the figure centers of the aforementioned first figure. Accordingly, the image processing device can suppress failure of detection of the marker due to external factors for the marker.

Application Example 2

The image processing device according to the application example may be configured such that the image processing device detects the data area based on a direction passing through the figure centers of the first figure.

According to this configuration, the image processing device detects the data area based on a direction passing through the figure centers of the first figure. Accordingly, the image processing device can more reliably detect the data area based on a direction passing through the figure centers of the first figure.

Application Example 3

The image processing device according to the application example may be configured such that the data area is detected by changing the direction with the figure centers of the first figure as a center.

According to this configuration, the image processing device detects the data area by changing the direction passing through the figure centers of the aforementioned first figures with the figure centers of the first figure as a center. Accordingly, the image processing device detects the data area, even in a case where the direction in which the first figure passes through the figure centers of the aforementioned first figure is not illustrated.

Application Example 4

The image processing device according to the application example may be configured such that the data area has a figure having a smaller number of the overlapped figure centers compared with the first figure.

According to this configuration, the image processing device detects the first figure and detects the data area having a smaller number of overlapped figure centers compared with the aforementioned first figure. Accordingly, the image processing device can suppress the figure that the data area has from being erroneously detected as the first figure.

Application Example 5

The image processing device according to the application example may be configured such that the marker has a second figure in which three or more figure centers are overlapped with each other, and the data area is positioned between the first figure and the second figure.

According to this configuration, the image processing device detects the first figure and the second figure and detects the data area based on the figure centers of the aforementioned first figure and the figure centers of the aforementioned second figure. Accordingly, the image processing device can more reliably detect the data area.

Application Example 6

The image processing device according to the application example may be configured such that the data area is detected based on a direction in which the figure centers of the first figure and the figure centers of the second figure are connected to each other.

According to this configuration, the image processing device detects the data area based on the direction in which the figure centers of the first figure and the figure centers of the second figure are connected to each other. Accordingly, the image processing device can more quickly detect the data area based on the direction in which the figure centers of the first figure and the figure centers of the second figure are connected to each other.

Application Example 7

This application example is directed to a robot including the image processing device according to any one of the application examples described above.

According to this configuration, the robot detects the first figure and detects the data area based on the figure centers of the aforementioned first figure. Accordingly, the robot can suppress the failure of the detection of the marker due to an external factor for the marker.

Application Example 8

This application example is directed to a robot system including an image capturing portion capturing a captured image including a marker; and a robot according to Application Example 7.

According to this configuration, the robot system detects the first figure and detects the data area based on the figure centers of the aforementioned first figure. Accordingly, the robot system can suppress the failure of the detection of the marker due to an external factor for the marker.

Application Example 9

This application example is directed to a marker including a first figure in which three or more figure centers are overlapped with each other, and a data area provided on an external portion of the first figure.

According to this configuration, the marker detects the first figure and detects the data area based on the figure centers of the aforementioned first figure. Accordingly, the marker can suppress the failure of the detection of the marker due to an external factor for the marker.

Application Example 10

The marker according to the application example may be configured to include a second figure in which three or more figure centers are overlapped with each other, and a configuration in which the data area is positioned between the first figure and the second figure may be used.

According to this configuration, the marker detects the first figure and the second figure and detects the data area based on the figure centers of the aforementioned first figure and the figure centers of the aforementioned second figure. Accordingly, the marker can more reliably detect the data area.

According to the application examples described above, the image processing device, the robot, and the robot system detect the first figure and detect the data area based on the figure centers of the aforementioned first figure. Accordingly, the image processing device, the robot, and the robot system can suppress the failure of the detection of the marker due to an external factor for the marker.

The marker detects the first figure and detects the data area based on the figure centers of the aforementioned first figure. Accordingly, the marker can suppress the failure of the detection of the marker due to an external factor for the marker.

Application Example 11

This application example is directed to an image processing device that detects a marker from a image in which a marker is captured, in which the marker is detectable by plural marker detection methods, and the marker is detected by one marker detection method among the plural marker detection methods.

According to this configuration, the image processing device detects the marker by one marker detection method among the plural marker detection methods. Accordingly, the image processing device can make improvement in detection accuracy of the marker and shortening of the detection time of the marker be compatible with each other.

Application Example 12

The image processing device according to Application Example 11 may be configured such that the marker includes the first marker and the second marker, and the marker detection method of the first marker is different from the marker detection method of the second marker.

According to this configuration, the image processing device detects the first marker and the second marker respectively by marker detection methods different from each other. Accordingly, the image processing device can detect the marker by the marker detection method according to the marker.

Application Example 13

The image processing device according to Application Example 11 or 12 may be configured such that the plural marker detection methods include the first detection method for detecting the marker by changing the threshold value for detecting the marker from the image in the predetermined range.

According to this configuration, when the image processing device detects a marker associated with the first detection method from the plural markers, the image processing device detects the marker by changing the threshold value for detecting the marker from the image in the predetermined range. Accordingly, when the image processing device detects the marker associated with the first detection method among the plural markers, it is possible to improve the detection accuracy of the marker.

Application Example 14

The image processing device according to any one of Application Examples 11 to 13 may be configured such that the plural marker detection methods include a second detection method for detecting the marker using a value obtained by maximum likelihood estimation, as the threshold value for detecting the marker from the image.

According to this configuration, when the image processing device detects the marker associated with the second detection method among the plural markers, the image processing device detects the marker using the value obtained by maximum likelihood estimation as the threshold value for detecting the marker from the image. Accordingly, when the image processing device detects the marker associated with the second detection method among the plural markers, it is possible to shorten the detection time of the marker.

Application Example 15

The image processing device according to any one of Application Examples 11 to 14 may be configured such that the plural marker detection methods include a third detection method for detecting the marker using a predetermined value as the threshold value for detecting the marker from the image.

According to this configuration, when the image processing device detects the marker associated with the third detection method among the plural markers, the image processing device detects the marker using a predetermined value as the threshold value for detecting the marker from the image. Accordingly, when the image processing device detects the marker associated with the third detection method among the plural markers, it is possible to shorten the detection time of the marker.

Application Example 16

The image processing device according to any one of Application Examples 13 to 15 may be configured such that the threshold value is a threshold value for binarizing the image.

According to this configuration, the image processing device detects the marker by the marker detection method using a threshold value for detecting the marker from the image and that binarizes the aforementioned image. Accordingly, the image processing device can make the improvement in the detection accuracy of the marker and the shortening of the detection time of the marker be compatible with each other by the marker detection method using the threshold value for binarizing the image.

Application Example 17

The image processing device according to any one of Application Examples 13 to 16 may be configured such that the threshold value is a threshold value for determining a color of the image.

According to this configuration, the image processing device detects the marker by the marker detection method using the threshold value for detecting the marker from the image and for determining the color of the aforementioned image. Accordingly, the image processing device can make the improvement in the detection accuracy of the marker and the shortening of the detection time of the marker to compatible with each other, according to the marker detection method using the threshold value for determining the color of the image.

Application Example 18

The image processing device according to any one of Application Examples 11 to 17 may be configured such that the marker is detected based on a table in which markers and marker detection methods are associated with each other.

According to this configuration, the image processing device detects the marker based on the table in which the markers and the marker detection methods are associated with each other. Accordingly, the image processing device can make the improvement in the detection accuracy of the marker and the shortening of the detection time of the marker be compatible with each other, based on the table in which the markers and the marker detection methods are associated with each other.

Application Example 19

The image processing device according to any one of Application Examples 11 to 18 may be configured such that the marker detection method is determined based on the marker included in the image and a marker included in an image having different image capturing conditions from the image.

According to this configuration, the image processing device determines the marker detection method based on the marker included in the image and the marker included in an image having a different image capturing condition from the aforementioned image. Accordingly, the image processing device can make the improvement in the detection accuracy of the marker and the shortening of the detection time of the marker be compatible with each other by the marker detection method determined based on the marker included in the image and the marker included in the image having a different image capturing condition from the aforementioned image.

Application Example 20

The image processing device according to any one of Application Examples 11 to 19 may be configured such that a threshold value for detecting the marker included in the image and a threshold value for detecting the marker included in an image having a different image capturing condition from the image are displayed on the display portion and the marker detection method can be edited.

According to this configuration, the image processing device causes the display portion to display a threshold value for detecting the marker included in the image and a threshold value for detecting the marker included in the image having a different image capturing condition from the aforementioned image and can edit the marker detection method. Accordingly, the image processing device can make the improvement in the detection accuracy of the marker and the shortening of the detection time of the marker be compatible with each other by the edited marker detection method.

Application Example 21

This application example is directed to a robot including the image processing device according to any one of Application Examples 11 to 20.

According to this configuration, the robot detects the marker by one marker detection method among the plural marker detection methods. Accordingly, the robot can make the improvement in the detection accuracy of the marker and the shortening of the detection time of the marker be compatible with each other.

Application Example 22

This application example is directed to a robot system including an image capturing portion for capturing a range including a marker as an image and the robot according to Application Example 21.

According to this configuration, the robot system detects the marker by one marker detection method among the plural marker detection methods. Accordingly, the robot system can make the improvement in the detection accuracy of the marker and the shortening of the detection time of the marker be compatible with each other.

According to the above, the image processing device, the robot, and the robot system can detect a marker by one marker detection method among the plural marker detection methods. Accordingly, the image processing device, the robot, and the robot system can make the improvement in the detection accuracy of the marker and the shortening of the detection time of the marker be compatible with each other.

Application Example 23

This application example is directed to an image processing device detects a marker for determining a first threshold value which is a threshold value for multivaluing at least a portion of an image in which the one or more markers are included based on the numbers of markers detected from the image or an image different from the image.

According to this configuration, the image processing device determines a first threshold value which is a threshold value for multivaluing at least a portion of the image in which one or more markers are included based on the numbers of the markers detected from the aforementioned image or an image different from the aforementioned image. Accordingly, the image processing device can detect the marker with high accuracy.

Application Example 24

The image processing device according to Application Example 23 may be configured such that the first threshold value is determined based on the number of markers detected from the image according to the change of the second threshold value which is a temporary threshold value used for determining the first threshold value.

According to this configuration, the image processing device determines the first threshold value based on the number of markers detected from the image according to the change of the second threshold value which is the temporary threshold value used for determining the first threshold value. Accordingly, the image processing device can detect the marker with high accuracy based on the first threshold value determined based on the number of the markers detected from the image according to the change of the second threshold value.

Application Example 25

The image processing device according to Application Example 24 may be configured such that the first threshold value is determined based on the number of markers and the number of areas detected when the image is multivalued using the second threshold value.

According to this configuration, the image processing device determines the first threshold value based on the number of markers and the number of areas detected when the aforementioned image is multivalued using the second threshold value. Accordingly, the image processing device can detect the marker with high accuracy based on the first threshold value determined based on the number of markers and the number of areas detected when the aforementioned image is multivalued using the second threshold value.

Application Example 26

The image processing device according to any one of Application Examples 23 to 25 may be configured such that the multivaluing is binarizing.

According to this configuration, the image processing device determines a first threshold value which is a threshold value for binarizing at least a portion of the image in which one or more markers are included based on the number of markers detected from the aforementioned image or an image different from the aforementioned image. Accordingly, the image processing device can detect the marker from the image binarized using the first threshold value.

Application Example 27

The image processing device according to any one of Application Examples 23 to 26 may be configured such that the marker is a figure center marker.

According to this configuration, the image processing device determines the first threshold value which is a threshold value for multivaluing at least a portion of the image in which one or more figure center markers are included, based on the number of markers of the aforementioned image or an image different from the aforementioned image. Accordingly, the image processing device can detect the figure center marker with high accuracy.

Application Example 28

The image processing device according to any one of Application Examples 23 to 27 may be configured such that the target object is detected from the image using the first threshold value.

According to this configuration, the image processing device detects the target object from the image using the first threshold value. Accordingly, the image processing device can detect the target object with high accuracy.

Application Example 29

This application example is directed to a robot including the image processing device according to any one of Application Examples 23 to 28.

According to this configuration, the robot determines a first threshold value which is a threshold value for multivaluing at least a portion of the image in which one or more markers are included, based on the number of markers detected from the aforementioned image or an image different from the aforementioned image. Accordingly, the robot can detect the marker with high accuracy.

Application Example 30

This application example is directed to a robot system including an image capturing portion that captures an image of a range including one or more markers and the robot according to Application Example 29.

According to this configuration, the robot system determines a first threshold value which is a threshold value for multivaluing at least a portion of the image in which one or more markers are included based on the number of markers detected from the aforementioned image or an image different from the aforementioned image. Accordingly, the robot system can detect the marker with high accuracy.

According to the above, the image processing device, the robot, and the robot system determine a first threshold value which is a threshold value for multivaluing at least a portion of the image in which one or more markers are included, based on the number of markers detected from the aforementioned image or an image different from the aforementioned image.

Accordingly, the image processing device, the robot, and the robot system can detect the marker with high accuracy.

BRIEF DESCRIPTION OF THE DRAWINGS

The invention will be described with reference to the accompanying drawings, wherein like numbers reference like elements.

FIG. 28 is a table illustrating an example of information relating to a marker Mk3 and a marker Mk4.

FIG. 47 is a diagram of exemplifying corresponding information for each condition that is generated for each of the sample images GS1 to GS3.

DESCRIPTION OF EXEMPLARY EMBODIMENTS

First Embodiment

Figure 1:
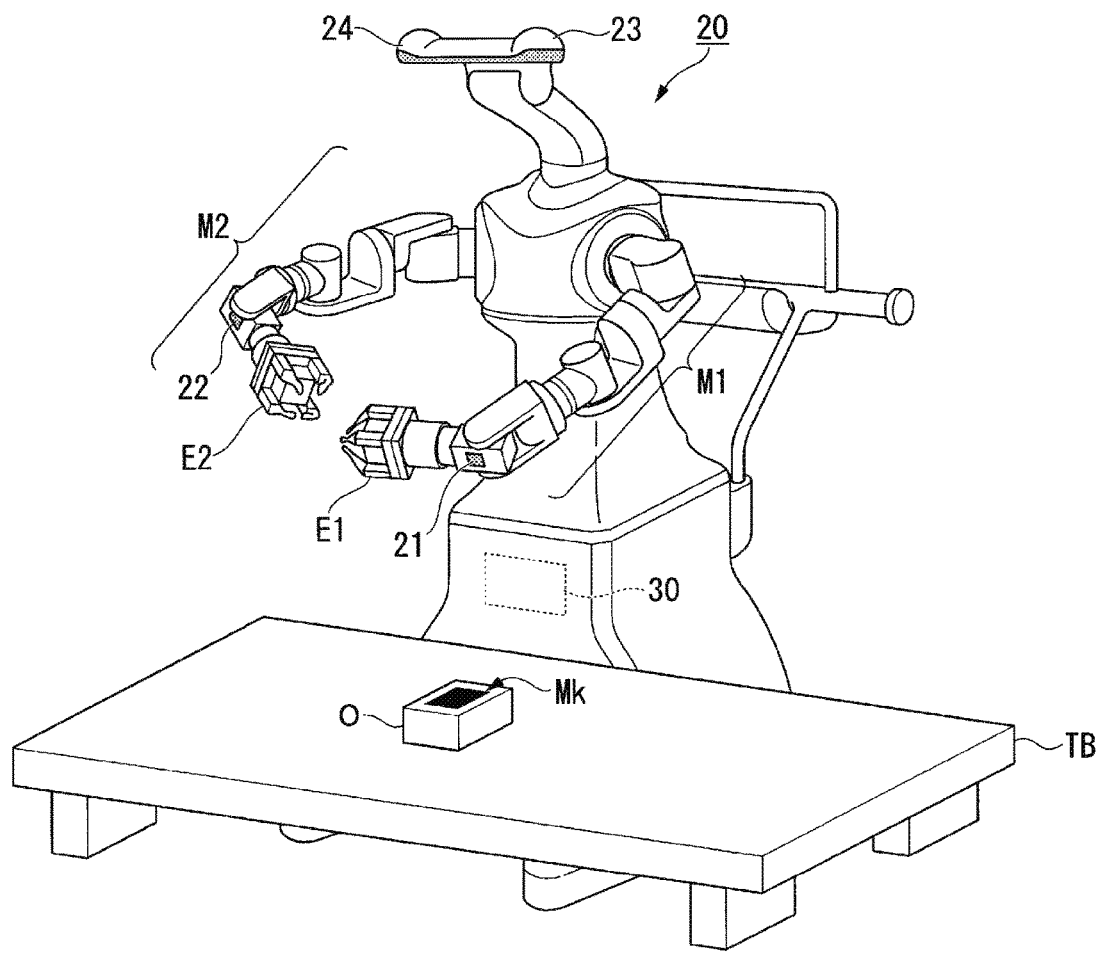
FIG. 1 is a configuration diagram illustrating an example of a robot according to a first embodiment.

Hereinafter, a first embodiment according to the invention is described with reference to drawings. FIG. 1 is a configuration diagram illustrating an example of a robot 20 according to the first embodiment.

Configuration of Robot 20

First, a configuration of the robot 20 is described.

The robot 20 is a double arm robot including a first arm, a second arm, a support supporting the first arm and the second arm, and a robot control device 30. The double arm robot is a robot including two arms such as a first arm and a second arm in this example. The robot 20 is a single arm robot, instead of a double arm robot. The single arm robot is a robot including one arm. For example, the single arm robot includes any one of a first arm and a second arm. The robot 20 may be a duplex arm robot including three or more arms, instead of a double arm robot.

The first arm includes a first end effector E1 and a first manipulator M1.

In this example, the first end effector E1 is an end effector including claw portions that can grip an object. The first end effector E1 may be another end effector such as an end effector including an electric screwdriver, instead of the end effector including the aforementioned claw portions.

The first end effector E1 is communicably connected to the robot control device 30 via cables. Accordingly, the first end effector E1 performs an operation based on a control signal acquired from the robot control device 30. For example, cable communication via cables is performed by standards such as Ethernet (Registered trademark) or universal serial bus (USB). The first end effector E1 may have a configuration connected to the robot control device 30 via wireless communication performed by communication standard such as Wi-Fi (Registered trademark).

The first manipulator M1 includes seven joints and a first image capturing portion 21. The seven joints respectively include actuators (not illustrated). That is, the first arm including the first manipulator M1 is a seven shaft vertical articulation-type arm. The first arm performs an operation in a degree of freedom of seven shafts by operations in association with the support, the first end effector E1, the first manipulator M1, and the actuators of respective seven joints included in the first manipulator M1. The first arm may have a configuration of being operated in a degree of freedom of six or less shafts or may have a configuration of being operated in a degree of freedom of eight or more shafts.

In a case where the first arm is operated in a degree of freedom of seven shafts, the first arm can take more postures than in a case of an operation in a degree of freedom of 6 or less shafts. Accordingly, for example, an operation becomes smoother, and thus the first arm can easily avoid interference with an object existing around the first arm. In a case where the first arm can be operated in a degree of freedom of seven shafts, the control of the first arm has a less calculation amount and is easier than in a case where the first arm is operated in a degree of freedom of eight or more shafts.

The seven actuators (included in the joints) included in the first manipulator M1 are respectively communicably connected to the robot control device 30 via cables. Accordingly, the aforementioned actuators operates the first manipulator M1 based on a control signal acquired from the robot control device 30. The cable communication via the cables is performed, for example, by standards such as Ethernet (Registered trademark) or USB. A portion or all of the seven actuators included in the first manipulator M1 may have a configuration of being connected to the robot control device 30 via wireless communication performed by communication standard such as Wi-Fi (Registered trademark).

The first image capturing portion 21 is, for example, a camera including a charge coupled device (CCD) or a complementary metal oxide semiconductor (CMOS) or the like, which is an image capturing element that converts condensed light into an electric signal. In this example, the first image capturing portion 21 can be included a portion of the first manipulator M1. Accordingly, the first image capturing portion 21 moves according to the movement of the first arm. The range in which the first image capturing portion 21 can capture an image varies according to the movement of the first arm. The first image capturing portion 21 may have a configuration of capturing a still image in the aforementioned range or may have a configuration of capturing a moving image in the aforementioned range.

The first image capturing portion 21 is communicably connected to the robot control device 30 via cables. The cable communication via the cables is performed, for example, by standards such as Ethernet (Registered trademark) or USB. The first image capturing portion 21 may have a configuration of being connected to the robot control device 30 by wireless communication performed by communication standards such as Wi-Fi (Registered trademark).

The second arm includes a second end effector E2 and a second manipulator M2.

The second end effector E2 is, for example, an end effector including claw portions that can grip an object. The second end effector E2 may be another end effector such as an end effector including an electric screwdriver, instead of the end effector including the aforementioned claw portions.

The second end effector E2 is communicably connected to the robot control device 30 via the cables. Accordingly, the second end effector E2 performs an operation based on a control signal acquired from the robot control device 30. The cable communication via the cables is performed, for example, by standard such as Ethernet (Registered trademark) or USB. The second end effector E2 may have a configuration of being connected to the robot control device 30 by wireless communication performed by communication standard such as Wi-Fi (Registered trademark).

The second manipulator M2 includes seven joints and a second image capturing portion 22. The seven joints respectively include actuators (not illustrated). That is, the second arm including the second manipulator M2 is a seven shaft vertical articulation-type arm. The second arm performs an operation in a degree of freedom of seven shafts by operations in association with the support, the second end effector E2, the second manipulator M2, and the actuators of respective seven joints included in the second manipulator M2. The second arm may have a configuration of being operated in a degree of freedom of six or less shafts or may have a configuration of being operated in a degree of freedom of eight or more shafts.

In a case where the second arm is operated in a degree of freedom of seven shaft, the second arm can take more postures than in a case of an operation in a degree of freedom of 6 or less shafts. Accordingly, for example, an operation becomes smoother, and thus the second arm can easily avoid interference with an object existing around the second arm. In a case where the second arm can be operated in a degree of freedom of seven shafts, the control of the second arm has a less calculation amount and is easier than in a case where the second arm is operated in a degree of freedom of eight or more shafts.

The seven actuators (included in the joints) included in the second manipulator M2 are respectively communicably connected to the robot control device 30 via cables. Accordingly, the aforementioned actuators operates the second manipulator M2 based on a control signal acquired from the robot control device 30. The cable communication via the cables is performed, for example, by standards such as Ethernet (Registered trademark) or USB. A portion or all of the seven actuators included in the second manipulator M2 may have a configuration of being connected to the robot control device 30 via wireless communication performed by communication standard such as Wi-Fi (Registered trademark).

The second image capturing portion 22 is, for example, a camera including CCD, CMOS, or the like, which is an image capturing element that converts condensed light into an electric signal. In this example, the second image capturing portion 22 can be included a portion of the second manipulator M2. Accordingly, the second image capturing portion 22 moves according to the movement of the second arm. The range in which the second image capturing portion 22 can capture an image varies according to the movement of the second arm. The second image capturing portion 22 may have a configuration of capturing a still image in the aforementioned range or may have a configuration of capturing a moving image in the aforementioned range.

The second image capturing portion 22 is communicably connected to the robot control device 30 via cables. The cable communication via the cables is performed, for example, by standards such as Ethernet (Registered trademark) or USB. The second image capturing portion 22 may have a configuration of being connected to the robot control device 30 by wireless communication performed by communication standards such as Wi-Fi (Registered trademark).

The robot 20 includes a third image capturing portion 23 and a fourth image capturing portion 24.

The third image capturing portion 23 is, for example, a camera including CCD, CMOS, or the like, which is an image capturing element that converts condensed light into an electric signal. The third image capturing portion 23 may be provided at a portion at which a range that can be captured by the fourth image capturing portion 24 can be stereoscopically captured together with the fourth image capturing portion 24. The third image capturing portion 23 is communicably connected to the robot control device 30 via the cables. The cable communication via the cables is performed, for example, by standards such as Ethernet (Registered trademark) or USB. The third image capturing portion 23 may have a configuration of being connected to the robot control device 30 by wireless communication performed by communication standards such as Wi-Fi (Registered trademark).

The fourth image capturing portion 24 is, for example, a camera including CCD, CMOS, or the like, which is an image capturing element that converts condensed light into an electric signal. The fourth image capturing portion 24 may be provided at a portion at which a range that can be captured by the third image capturing portion 23 can be stereoscopically captured together with the third image capturing portion 23. The fourth image capturing portion 24 is communicably connected to the robot control device 30 via the cables. The cable communication via the cables is performed, for example, by standards such as Ethernet (Registered trademark) or USB. The fourth image capturing portion 24 may have a configuration of being connected to the robot control device 30 by wireless communication performed by communication standards such as Wi-Fi (Registered trademark).

The respective functional portions that the robot 20 include, for example, acquires control signals from the robot control device 30 built in the robot 20. The aforementioned respective functional portions perform operations based on the acquired control signals. The robot 20 may have a configuration of being controlled by the robot control device 30 installed on an external portion, instead of the configuration in which the robot control device 30 is built. In this case, the robot 20 and the robot control device 30 configure a robot system. The robot 20 may have a configuration of not including at least a portion of the first image capturing portion 21, the second image capturing portion 22, the third image capturing portion 23, or the fourth image capturing portion 24.

The robot control device 30 operates the robot 20 by transmitting a control signal to the robot 20. Accordingly, the robot control device 30 causes the robot 20 to perform a predetermined work.

Overview of Predetermined Work Performed by Robot 20

Hereinafter, an overview of the predetermined work performed by the robot 20 is described.

In this example, the robot 20 grips an object disposed a work area which is an area in which a work can be performed by both of the first arm and the second arm and performs a work of supplying (disposing) the gripped object to a material supplying area (not illustrated), as a predetermined work. The robot 20 may have a configuration of performing other works instead of this, as the predetermined work. The work area may be an area in which a work can be performed by any one of the first arm and the second arm.

In this example illustrated in FIG. 1, the work area is an area including an upper surface of a workbench TB. The workbench TB is, for example, a table. The workbench TB may be another object such as a floor or a shelf, instead of the table. A target object O that the robot 20 grips is disposed on an upper surface of the workbench TB. It may be configured that two or more target objects O are disposed on the upper surface of the workbench TB.

The target object O is an industrial component or an industrial member such as a plate, a screw, or a bolt mounted in a product. In FIG. 1, in order to simplify drawings, the target object O is illustrated as an object in a rectangular shape. The target object O may be another object such as a commodity or an organism instead of an industrial component or an industrial member. The shape of the target object O may be another shape instead of the rectangular shape.

Overview of Process Performed by the Robot Control Device 30

Hereinafter, an overview of a process performed by the robot control device 30 is described, in order to cause the robot 20 to perform a predetermined work.

The robot control device 30 causes the third image capturing portion 23 and the fourth image capturing portion 24 to stereoscopically capture a range including a work area as a capture range. The robot control device 30 acquires captured images that the third image capturing portion 23 and the fourth image capturing portion 24 stereoscopically capture. The robot control device 30 detects a marker attached in the work area based on the acquired captured images. The robot control device 30 may have a configuration of stereoscopically capturing the aforementioned capture range, by any two combinations except for the combination of the third image capturing portion 23 and the fourth image capturing portion 24 among the first image capturing portion 21, the second image capturing portion 22, the third image capturing portion 23, and the fourth image capturing portion 24, instead of the configuration of causing the third image capturing portion 23 and the fourth image capturing portion 24 to stereoscopically captured images as the capture range.

The marker of the present embodiment has a data area including a figure illustrating a position and a posture of the aforementioned marker and a figure illustrating other information different from the position and the posture of the aforementioned marker.

One or more figures are included in a figure illustrating a position and a posture of a marker. In this example, a case where the figure illustrating the position and the posture of the marker is two figures of a first figure and a second figure.

The figure illustrating the aforementioned other information is a code figure which is a figure indicating a code (symbol) illustrating the aforementioned other information. The data area may have a configuration including one or more code figures. In a case where plural code figures are included in the data area, independent code figures indicate codes illustrating a portion or all of the aforementioned other information. In this example, a case where four code figures are included in the data area, the aforementioned respective four code figures indicate codes illustrating a portion of the aforementioned other information, and all of the aforementioned four code figures indicate codes illustrating all of one item of the aforementioned other information is described.

In this example, the code illustrates robot operation information illustrating an operation of the robot 20. The robot operation information is, for example, information illustrating an operation of gripping the target object O based on a position and a posture of a marker, among operations of the robot 20, and supplying the target object O to the material supplying area (not illustrated). Each of the four code figures indicating the codes illustrating the robot operation information is a figure indicating a code in several bits. In this example, a case where one code figure indicates a code in four bits is described. That is, four code figures indicate codes in 16 bits in total.

The codes indicated by the four code figures may be information illustrating other operations such as operations for causing the robot 20 to process the target object O, among operations of the robot 20 as the robot operation information. The code indicated by four code figures may have a configuration illustrating other information such as information illustrating a character string (for example, a comment illustrating information relating to the target object O to which a marker is attached) to be displayed, on a display of the robot control device 30, instead of the robot operation information.

The position and the posture of the marker Mk illustrated by the first figure and the second figure that the marker have illustrate a position and a posture in a robot coordinate system of the target object O. The position and the posture of the marker Mk may have a configuration illustrating other positions and postures such as a position and a posture of a via point at which the robot 20 passes through a tool center point (TCP) of the first arm or a TCP of the second arm, instead of a configuration of illustrating the position and the posture in the robot coordinate system of the target object O.

Here, the figure center of the first figure is detected based on a shape of the first figure and the figure center of the second figure is detected based on the shape of the second figure. Therefore, the figure center of the first figure and the figure center of the second figure are hardly erroneously detected due to an external factor such as change of ambient light or change of a marker Mk with time, compared with a case where a marker including a colored figure is detected based on the aforementioned color.

Therefore, when a marker is detected in the process for causing the robot 20 to perform a predetermined work, the robot control device 30 detects at least the first figure among the first figure and the second figure that the marker have and detect the data area, that is, four code figures included in the data area, based on the figure center of the first figure. Accordingly, the robot control device 30 can suppress failure in the detection of the marker caused by the external factor with respect to the marker. Hereinafter, a process in which the robot control device 30 detects the marker from the captured image including the aforementioned marker.

In this example, the marker attached in the work area is the marker Mk attached to the target object O disposed on the upper surface of the workbench TB in the work area. That is, the robot control device 30 detects the marker Mk from the captured image captured by the third image capturing portion 23 and the fourth image capturing portion 24. At the time of detection, among a first figure F1 and a second figure F2 which are the first figure and the second figure that the marker Mk have, at least the first figure F1 is detected, the robot control device 30 detects a data area, that is four code figures included in the data area, based on the figure center of the first figure F1. In FIG. 1, in order to simplify drawings, the marker Mk is indicated by a black square attached to the target object O. The marker Mk may have a configuration of being attached to another object different from the target object O in the work area, an upper surface of the workbench TB, or the like, instead of this.

After the data area is detected, the robot control device 30 calculates the position and the posture of the detected marker Mk, as a position and a posture of the target object O in the robot coordinate system. The robot control device 30 causes the first arm of the robot 20 to grip the target object O in the calculated aforementioned position and the calculated aforementioned posture based on the code indicated by the code figure included in the data area of the marker Mk and causes the target object O to be supplied to the material supplying area (not illustrated). Instead of this, the robot control device 30 may have a configuration of causing the second arm to grip the target object O or may have another configuration of a configuration of causing both of the first arm and the second arm to grip the target object O.

Hardware Configuration of Robot Control Device 30

Figure 2:
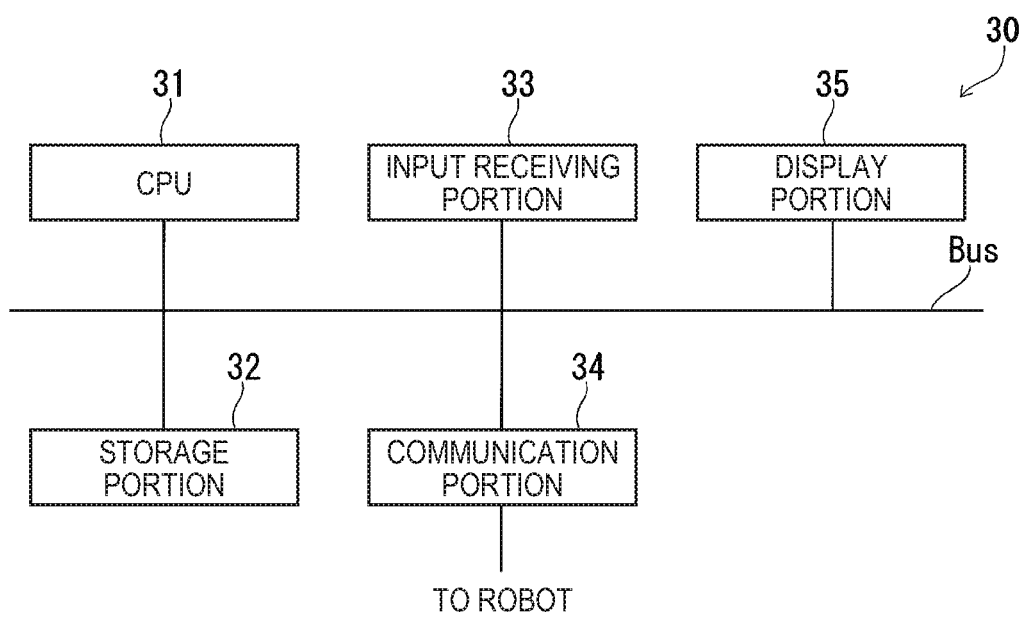
FIG. 2 is a diagram illustrating an example of a hardware configuration of a robot control device.

Hereinafter, with reference to FIG. 2, a hardware configuration of the robot control device 30 is described. FIG. 2 is a diagram illustrating an example of a hardware configuration of the robot control device 30. The robot control device 30 includes, for example, a central processing unit (CPU) 31, a storage portion 32, an input receiving portion 33, a communication portion 34, and a display portion 35. The robot control device 30 performs a communication with the robot 20 via the communication portion 34. These components are communicably connected to each other via buses Bus.

The CPU 31 executes various programs stored in the storage portion 32.

The storage portion 32 includes, for example, a hard disk drive (HDD), a solid state drive (SSD), an electrically erasable programmable read-only memory (EEPROM), a read-only memory (ROM), and a random access memory (RAM). The storage portion 32 may be an external storage device connected via a digital input-output port such as USB, instead of a storage portion built in the robot control device 30. The storage portion 32 stores various items of information processed by the robot control device 30 and information illustrating an image, a program, a position of a material supplying area (not illustrated), and the like.

The input receiving portion 33 is, for example, a teaching pendant including a keyboard, a mouse, a touch pad, or the like, or other input devices. The input receiving portion 33 may be integrally configured with the display portion 35 as the touch panel.

The communication portion 34 is configured, for example, to include a digital input-output port such as USB, an Ethernet (Registered trademark) port, or the like.

The display portion 35 is, for example, a liquid crystal display panel or an organic Electro Luminescence (EL) display panel.

Functional Configurations of Robot Control Device 30

Figure 3:
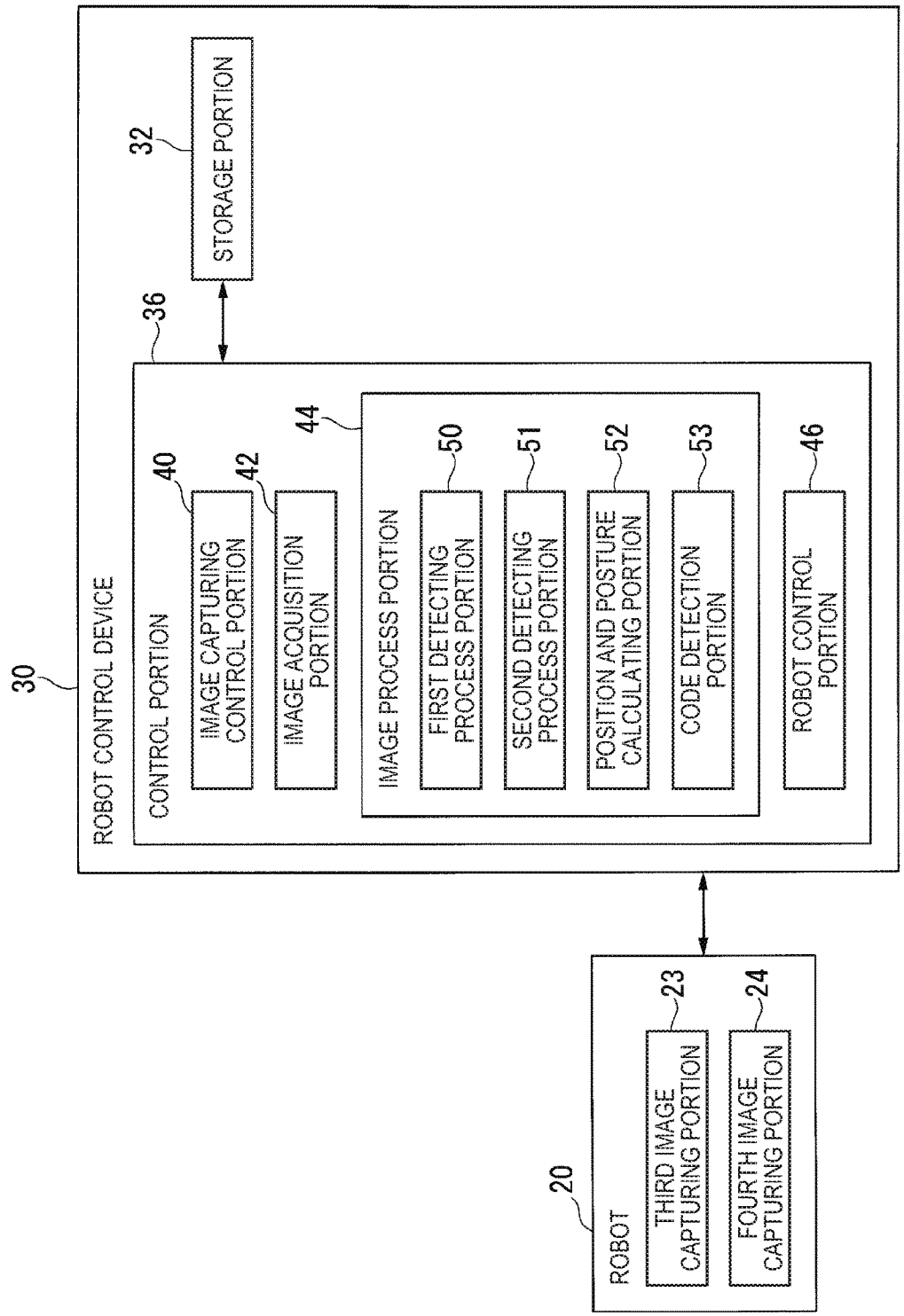
FIG. 3 is a diagram illustrating an example of a functional configuration of the robot control device.

Hereinafter, with reference to FIG. 3, functional configurations of the robot control device 30 are described. FIG. 3 is a diagram illustrating an example of a functional configuration of the robot control device 30. The robot control device 30 includes the storage portion 32 and a control portion 36.

The control portion 36 controls the entire robot control device 30. The control portion 36 includes an image capturing control portion 40, an image acquisition portion 42, an image process portion 44, and a robot control portion 46. The functional portions included in the control portion 36 are realized, for example, by the CPU 31 executing various programs stored in the storage portion 32. A portion or all of these functional portions may be hardware functional portions such as large scale integration (LSI) or application specific integrated circuit (ASIC).

The image capturing control portion 40 causes the third image capturing port ion 23 and the fourth image capturing portion 24 to stereoscopically capture the capture range including the work area.

The image acquisition portion 42 acquires the captured images stereoscopically captured by the third image capturing portion 23 and the fourth image capturing portion 24, from the third image capturing portion 23 and the fourth image capturing portion 24.

The image process portion 44 performs various image processes on the captured image acquired by the image acquisition portion 42. The image process portion 44 includes a first detecting process portion 50, a second detecting process portion 51, a position and posture calculating portion 52, and a code detection portion 53.

The first detecting process portion 50 detects one or more figures (for example, the first figure and the second figure in this example) illustrating the position and the posture of the aforementioned marker which is included in the aforementioned captured image and which the marker has, from the aforementioned captured image, based on the captured image acquired by the image acquisition portion 42.

The second detecting process portion 51 detects one or more code figures included in the data area that the aforementioned marker has from the aforementioned captured image, based on the captured image acquired by the image acquisition portion 42 and one or more figures illustrating the position and the posture of the marker detected by the first detecting process portion 50.

The position and posture calculating portion 52 calculates the position and the posture of the aforementioned marker, as the position and the posture in the robot coordinate system of the target object to which the aforementioned marker is attached, based on the figure illustrating the position and the posture of the marker detected by the first detecting process portion 50.

The code detection portion 53 detects codes from the one or more code figures included in the data area detected by the second detecting process portion 51.

The robot control portion 46 causes the robot 20 to perform a predetermined work, based on the position and the posture of the marker calculated by the position and posture calculating portion 52 and the code detected by the code detection portion 53.

Figure 4:
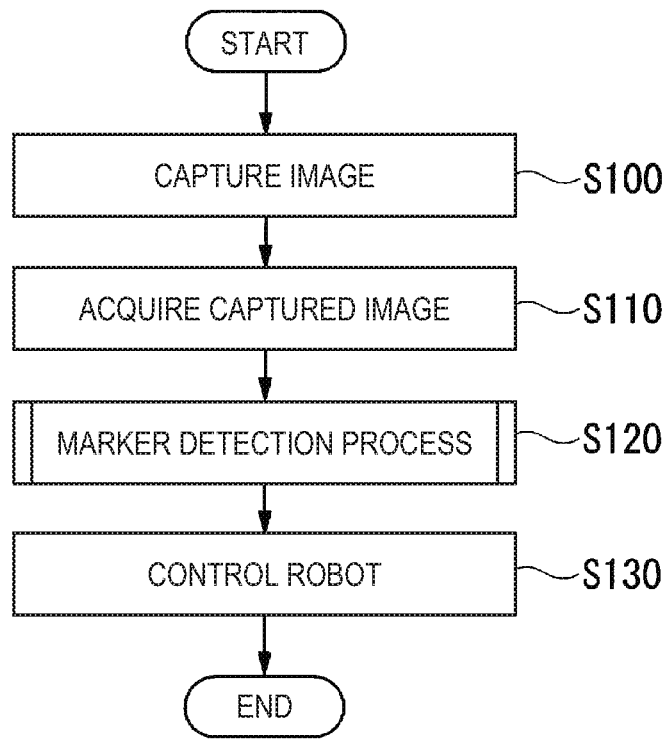
FIG. 4 is a flow chart illustrating an example of a flow of processes of a control portion causing a robot to perform a predetermined work.

Flow of Processes of Control Portion 36 Causing Robot 20 to Perform Predetermined Work Hereinafter, with reference to FIG. 4, the process of the control portion 36 causing the robot 20 to perform a predetermined work is described. FIG. 4 is a flow chart illustrating an example of a flow of processes of the control portion 36 causing the robot 20 to perform a predetermined work. Hereinafter, a case where the control portion 36 reads information illustrating a position of the material supplying area from the storage portion 32 in advance is described. The control portion 36 may have a configuration of reading information illustrating the position of the material supplying area from the storage portion 32 at arbitrary timing in processes from Steps S100 to S130.

The image capturing control portion 40 causes the third image capturing port ion 23 and the fourth image capturing portion 24 to stereoscopically capture the capture range including the work area illustrated in FIG. 1 (Step S100). Subsequently, the image acquisition portion 42 acquires captured images stereoscopically captured by the third image capturing portion 23 and the fourth image capturing portion 24 in Step S100 from the third image capturing portion 23 and the fourth image capturing portion 24 (Step S110). Subsequently, the respective functional portion included in the image process portion 44 executes the marker detection process for detecting the marker Mk included in the captured images based on the captured images acquired by the image acquisition portion 42 in Step S110 (Step S120).

Subsequently, the robot control portion 46 acquires results of the marker detection process in Step S120 from the image process portion 44. The robot control portion 46 causes the target object O to be supplied to the material supplying area (not illustrated) that is gripped by the first arm, based on the results of the marker detection process (Step S130).

Here, a process of Step S130 is described. In a case where the detection of the marker Mk in the marker detection process in Step S120 succeeds, results of the marker detection process include the position and the posture in the robot coordinate system of the target object O calculated based on the position and the posture of the marker Mk and the codes indicated by four code figures included in the data area of the marker Mk. In this case, the robot control portion 46 causes the first arm to grip the target object O based on the aforementioned position, the aforementioned posture, and the aforementioned codes and causes the target object O to be supplied to the material supplying area (not illustrated). Thereafter, the robot control portion 46 ends the process.

Meanwhile, in a case where the detection of the marker Mk in the marker detection process in Step S120 is failed, the results of the marker detection process include the information illustrating the failure of the detection of the marker Mk. In this case, the robot control portion 46 ends the process without controlling the robot 20. At this point, the robot control portion 46 may have a configuration of displaying information illustrating the failure of the detection of the marker Mk on the display portion 35.

Details of Marker

Hereinafter, details of the marker detected by the robot control device 30 from the captured images are described. The marker in this example (for example, the marker Mk) has a data area including the first figure and the second figure which are figures illustrating the position and the posture of the marker and the four code figures indicating the codes. The marker in this example includes the data area disposed between the first figure and the second figure. Here, with reference to FIGS. 5 to 12, the marker in this example is described.

Figure 5:
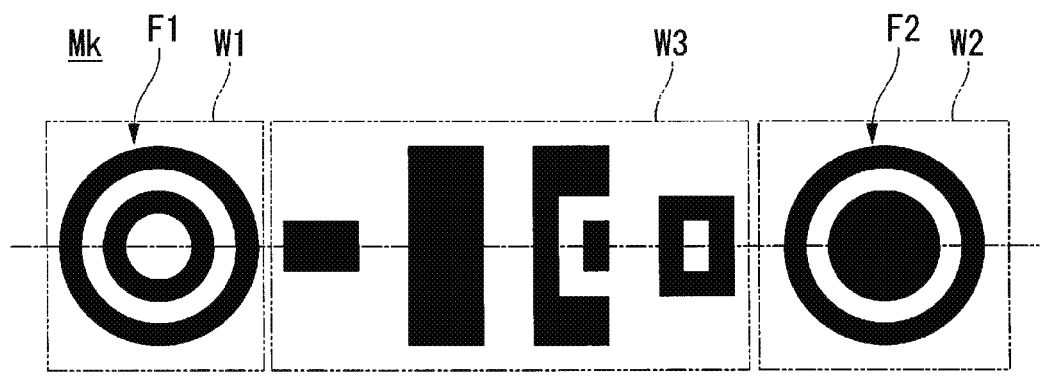
FIG. 5 is a diagram illustrating a specific example of a marker Mk illustrated in FIG. 1.

FIG. 5 is a diagram illustrating a specific example of the marker Mk illustrated in FIG. 1. The marker in this example is configured by being divided into three areas, in the same manner as the marker Mk illustrated in FIG. 5, which is an example of the aforementioned marker. Therefore, here, description is made with reference to the marker Mk, as an example.

The marker Mk is divided into three areas of an area W1 including the first figure F1 which is the first figure of the marker Mk, an area W2 including the second figure F2 which is the second figure of the marker Mk, and a data area W3. The data area W3 includes four code figures indicating the codes. The robot control device 30 detects the first figure F1, the second figure F2, and the four code figures indicating codes, based on figure centers of the respective figures.

Figure 6:
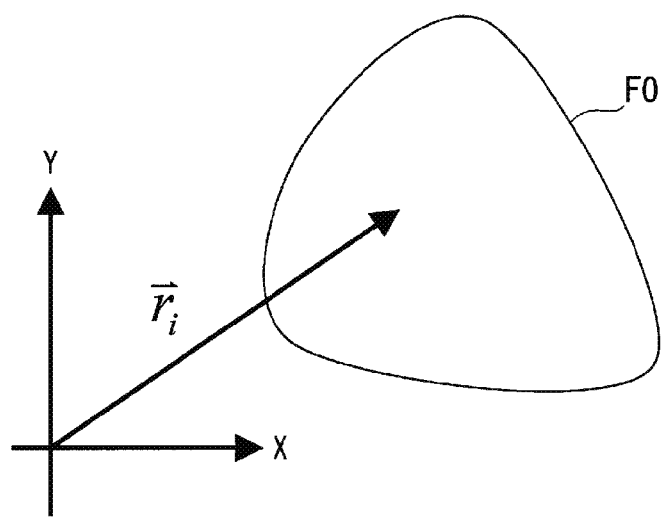
FIG. 6 is a diagram for describing figure centers of a figure.

Here, the figure center of the figure is described in detail. FIG. 6 is a diagram for describing the figure centers of the figure. In FIG. 6, a figure F0 in which an outline is formed with a curve line, a two-dimensional coordinate system indicating positions of respective points that configure the figure F0, and a vector r_i illustrating the positions of the aforementioned respective points. Here, in FIG. 6, a vector r is indicated in association with an arrow on r. "i" followed by "_" of the vector r_i indicates a subscript i of the vector r illustrated by FIG. 6. The subscript i is a label for differentiating respective points (for example, pixels) that configure the figure F0. In FIG. 6, an arrow that extends from an origin of the two-dimensional coordinate system to the figure F0 is an arrow indicating a size and a direction of the vector r_i.

The figure center is a so-called center of the figure. One figure center is uniquely determined with respect to one figure. The position of the figure center of the figure F0 illustrated in FIG. 6 is indicated by a vector c defined by Equation (1) illustrated below, using the vector r_i.

$$\vec{c} = \frac{\sum \vec{r}_i}{N} \quad (1)$$

In Equation (1), the vector c is indicated in association with an arrow on c. N is the number of respective points that configure the figure F0, and is an integer of 1 or greater. That is, the position of the figure center of the figure F0 illustrated in FIG. 6 indicates a sum of vectors indicating positions of the respective points that configure the figure F0 by vectors (average of N vectors) divided by the number of the aforementioned respective points. In FIG. 6, a figure center using the two-dimensional figure F0, the two-dimensional coordinate system, and the two-dimensional vectors is described, but the position of the figure center is indicated by the vector c defined by Equation (1) above with respect to the three-dimensional or greater figures.

Here, in this example, each of the first figure and the second figure is a figure center marker which is a figure configured by the combination of three or more figures. The figure center marker is a marker in which respective figure centers of three or more figures that configure the figure center marker belong to (are included in) a predetermined range.

For example, with respect to the figure center marker that is configured with a combination of a figure A0, a figure B0, and the figure C0 belongs to (are included in), a figure center A1 of the figure A0, a figure center B1 of the figure B0, and the figure center C1 of the figure C0 is in the predetermined range. The predetermined range is, for example, is a circular range in which a radius is about several pixels. However, the predetermined range may be a circular range having a radius of less than 1 pixel, may be a circular range having a radius of several pixels or greater, or may be a range in another shape different from a circular shape, such as a rectangle shape.

Hereinafter, for easier description, the number of figure centers included in the predetermined range is called multiplicity to be described. That is, the figure center marker configured with a combination of the figure A0, the figure B0, and a figure C0 is a figure center marker having multiplicity of 3. Instead of this, any one or both of the first figure and the second figure may be a figure configured with one or more figures.

Figure 7:
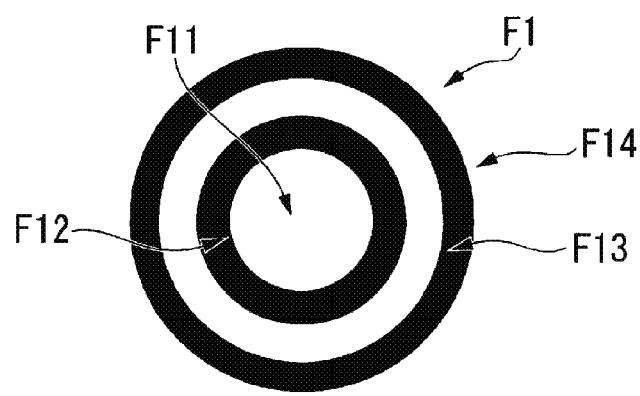
FIG. 7 is a diagram illustrating a first figure F1, as an example of a figure center marker.

FIG. 7 is a diagram illustrating the first figure F1, as an example of the figure center marker. As illustrated in FIG. 7, three or more figures that configure the figure center marker are detected as a partial area of only white or black in the binarized image.

The first figure F1 is configured with four figures of a figure F11 in which an outline is indicated by a white partial area in a circular shape, a figure F12 in which an outline is indicated by a black partial area in a ring shape, a figure F13 in which an outline is indicated by a white partial area in a ring shape, and a figure F14 in which an outline is indicated by a black partial area in a ring shape.

The first figure F1 is formed such that the respective figure centers of the figure F11, the figure F12, the figure F13, and the figure F14 belong to a predetermined range. Therefore, the first figure F1 configured with a combination of the figure F11, the figure F12, the figure F13, and the figure F14 is a figure center marker having multiplicity of 4. The figures F11 to F14 in the first figure F1 are concentric circles and the figure centers are positioned in the center of the aforementioned concentric circles.

Figure 8:
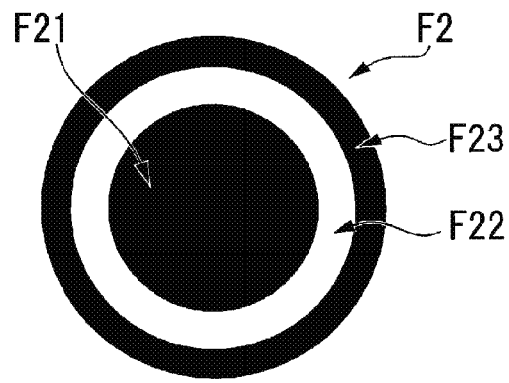
FIG. 8 is a diagram illustrating a second figure F2 as another example of a figure center marker.

FIG. 8 is a diagram illustrating the second figure F2 as another example of the figure center marker. The second figure F2 is configured with three figures of a figure F21 in which an outline is indicated by a black partial area in a circular shape, a figure F22 in which an outline is indicated by a white partial area in a ring shape, and a figure F23 in which an outline is indicated by a black partial area in a ring shape. The second figure F2 is formed such that the respective figure centers of the figure F21, the figure F22, and the figure F23 belong to a predetermined range. Therefore, the second figure F2 configured with a combination of the figure F21, the figure F22, and the figure F23 is a figure center marker of multiplicity of 3. The figures F21 to F23 in the second figure F2 are concentric circles and the figure centers are positioned in the center of the aforementioned concentric circles.

Figure 10:
FIG. 10 is a diagram illustrating an example of a figure center marker having multiplicity of 4 which is configured with four figures that do not configure concentric circles.
Figure 11:
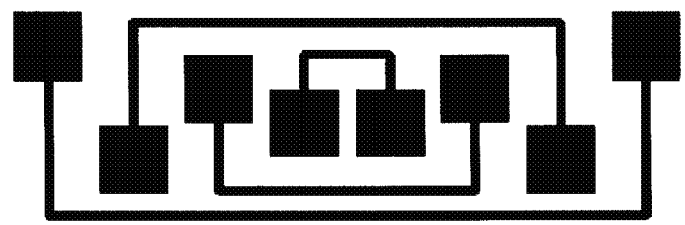
FIG. 11 is a diagram illustrating another example of a figure center marker having multiplicity of 4 that is configured with four figures that do not configure concentric circles.

In the first figure F1 and the second figure F2 illustrated in FIGS. 7 and 8, a combination of three or more figures that configure the figure center marker configure the concentric circles. However, in the figure center marker, a combination of three or more figures that configure the figure center marker configures the concentric circle, but does not limited thereto. The figure center marker illustrated in FIGS. 9 to 11 is an example of a case where a combination of three or more figures that configure the figure center marker does not configure the concentric circle.

Figure 9:
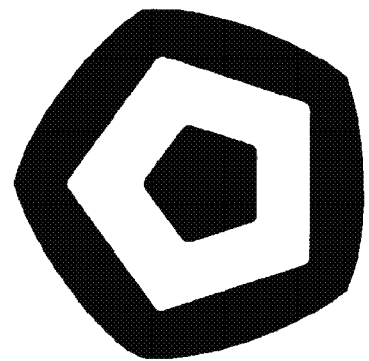
FIG. 9 is a diagram illustrating an example of a figure center marker having multiplicity of 3 that is configured with three figures that do not configure concentric circles.

FIG. 9 is a diagram illustrating an example of a figure center marker having multiplicity of 3 that is configured with three figures that do not configure concentric circles. FIG. 10 is a diagram illustrating an example of a figure center marker having multiplicity of 4 which configures four figures that do not configure concentric circles. FIG. 11 is a diagram illustrating another example of a figure center marker having multiplicity of 4 that is configured with four figures that do not configure concentric circles.

In this example, the position and the posture of the object (for example, the target object O illustrated in FIG. 1) to which the marker having such a figure center marker as the first figure or the second figure is attached is indicated by the position and the posture of the figure center of the first figure of the aforementioned marker. The position of the figure center of the aforementioned first figure is indicated by the vector (average of three or more vectors) obtained by dividing the sum of the vectors illustrating the positions of the three or more figure centers included in the predetermined range by the number of the figure center. Instead of this, the position of the object to which the aforementioned marker is attached may have a configuration of being indicated by another position (offset position) associated with the position of the figure center of the aforementioned first figure. The position and the posture of the object to which the marker having the figure center marker as the first figure or the second figure is attached may have a configuration indicated by the position and the posture of the figure center of the second figure of the aforementioned marker.

The posture of the figure center of the aforementioned first figure is indicated in the direction of the robot coordinate system of respective three coordinate axes having a normal direction with respect to the aforementioned first figure in the position of the aforementioned figure center as a Z axis, a direction determined based on the figure center of the aforementioned first figure and the figure center of the second figure or a direction determined based on the figure center of the aforementioned first figure and the figure included in the data area as an X axis, and a direction intersecting to the aforementioned Z axis and the aforementioned X axis as a Y axis. Instead of this, the posture of the object to which the aforementioned marker is attached may have a configuration indicated by another posture (offset posture) associated with the posture of the figure center of the aforementioned first figure.

Figure 12:
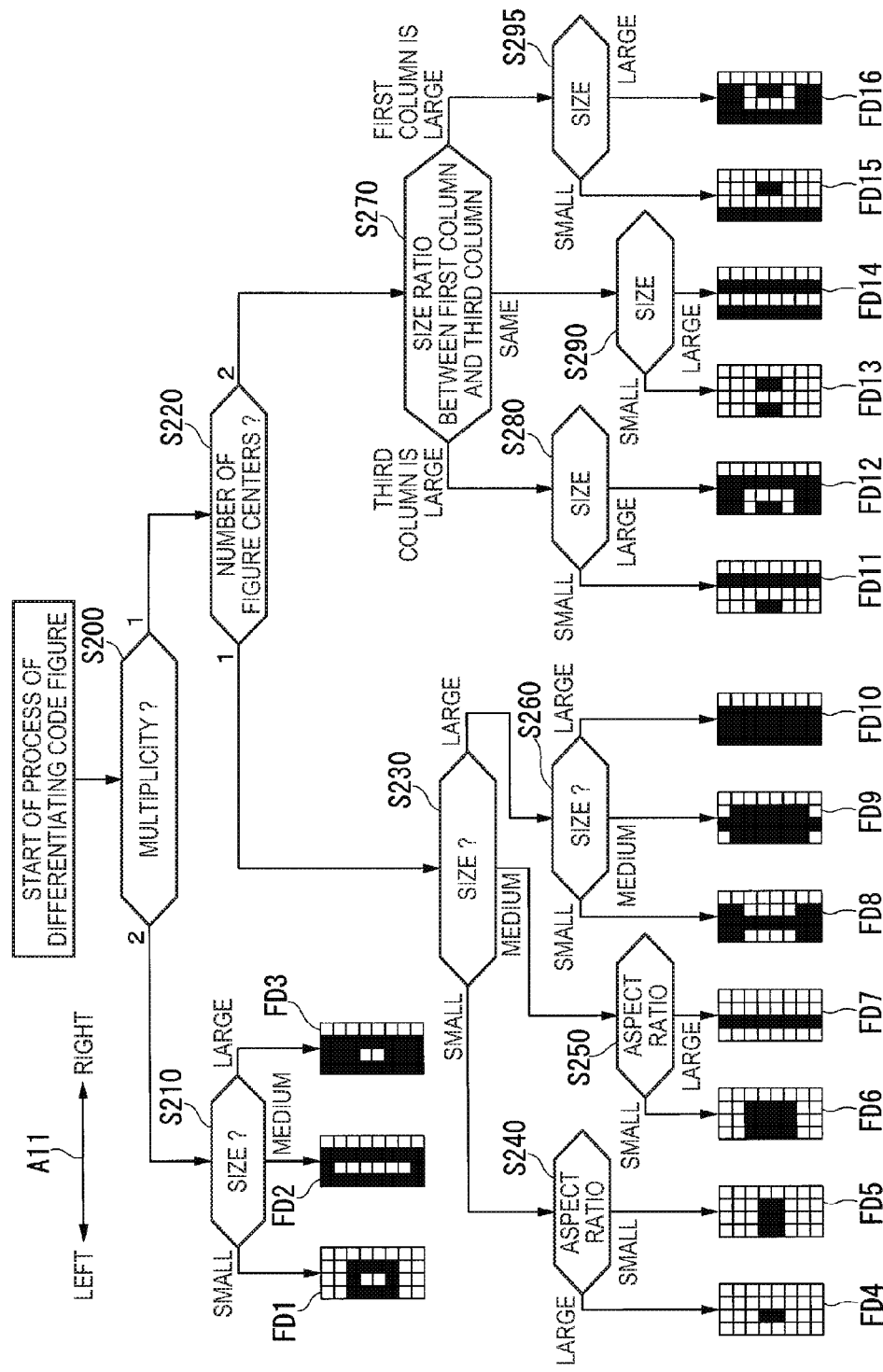
FIG. 12 is a flow chart illustrating a flow of processes of the robot control device specifying whether the respective four code figures detected by the robot control device are any one of 16 types of code figures.

Subsequently, four code figures indicating the codes are described. In this example, as the respective four code figures, any one of figures FD1 to FD16 which are 16 types of code figures illustrated in FIG. 12 is used. FIG. 12 is a flow chart illustrating a flow of processes of the robot control device 30 specifying whether the respective four code figures detected by the robot control device 30 are any one of 16 types of code figures. As long as the robot control device 30 can be differentiated, the code figure may have a configuration in which other code figures are included instead of a part or all of the 16 types of code figures illustrated in FIG. 12. Instead of 16 types, the code figures may be 15 types or less or 17 types or more. The robot control device 30 may have a configuration of specifying whether the detected respective code figures are any one of the 16 types of code figure illustrated in FIG. 12 by another process such as pattern matching, instead of the processes of the flow chart illustrated in FIG. 12.

The 16 types of code figures in this example are respectively configured with a figure indicated by black partial areas and a figure indicated by white partial areas surrounded by the black partial areas in an area in which 32 square shaped cells are arranged in eight rows and four columns as illustrated in FIG. 12. In each of the aforementioned code figures, among the 32 cells arranged in the aforementioned eight rows and four columns, eight cells included in the fourth column from the left side illustrated by an arrow A11 of FIG. 12 are white. In this example, the robot control device 30 does not detect white partial areas including white cells included in the aforementioned fourth column in the code figure as a figure configuring the code figure.

First, after the robot control device 30 detects a target code figure that is a code figure which becomes a target for specifying any one of the figures FD1 to FD16, the robot control device 30 detects the figure centers of the figures for configuring target code figures. The robot control device 30 determines whether multiplicity of the figure center detected in the area of the aforementioned eight rows and four columns is any one of 1 and 2 (Step S200). According to the determination, the robot control device 30 determines whether the target code figure is any one of the figures FD1 to FD3 or the target code figure is the figures FD4 to FD16.

In Step S200, in a case where it is determined that the multiplicity of the figure center is 2 (Step S200-2), the robot control device 30 specifies that the target code figure is any one of the figures FD1 to FD3. The robot control device 30 determines that a size of the black partial area of the target code figure is any one of large, medium, and small (Step S210).

Here, the process of Step S210 is determined. In Step S210, in a case where the number of the black cells indicating the size of the black partial area in the target code figure is less than 18, the robot control device 30 determines that the aforementioned size is small. In a case where the number of black cells indicating the size of the black partial area in the target code figure is 18 or greater and less than 22, the robot control device 30 determines that the aforementioned size is medium. In a case where the number of black cells indicating the size of the black partial area in the target code figure is 22 or greater, the robot control device 30 determines that the aforementioned size is large.

In this example, since the number of the black cells is 10, the figure FD1 determines that the size is small, in Step S210. As illustrated in FIG. 12, since the figure FD1 is configured with two figures and the respective figure centers of the figures belong to the predetermined range, the multiplicity is 2. Since the number of black cells is 18, the figure FD2 determines that the size is medium, in Step S210. As illustrated in FIG. 12, since the figure FD2 is configured with two figures and the respective figure centers of the figures belong to the predetermined range, the multiplicity is 2. Since the number of the black cells is 22, the figure FD3 determines that the size is large, in Step S210. As illustrated in FIG. 12, since the figure FD3 is configured with two figures and the figure centers of the respective figures belong to the predetermined range, the multiplicity is 2.

That is, in a case where it is determined that the size of the black partial area of the target code figure is small (Step S210-Small), the robot control device 30 specifies that the target code figure is the figure FD1. Meanwhile, in a case where it is determined that the size of the black partial area of the target code figure is middle (Step S210-Middle), the robot control device 30 specifies that the target code figure is the figure FD2. Meanwhile, in a case where it is determined that the size of the black partial area of the target code figure is large (Step S210-Large), the robot control device 30 specifies that the target code figure is the figure FD3.

Meanwhile, in a case where it is determined that the multiplicity of the figure center is 1 in Step S200 (Step S200-1), the robot control device 30 specifies that the target code figure is any one of the figures FD4 to FD16. The robot control device 30 determines that the number of the figure centers of the target code figures detected in Step S200 is any one of 1 and 2 (Step S220). According to this determination, the robot control device 30 determines whether the target code figure is any one of the figures FD4 to FD10 or the target code figure is any one of the figures FD11 to FD16.

In a case where it is determined that the number of the figure centers is 1, in Step S220 (Step S220-1), the robot control device 30 specifies that the target code figure is any one of the figures FD4 to FD10. The robot control device 30 determines that the size of the black partial area of the target code figure is any one of large, medium, and small (Step S230).

Here, processes of Step S230 are described. In Step S230, in a case where the number of the black cells indicating the size of the black partial area in the target code figure is less than 8, the robot control device 30 determines that the aforementioned size is small. In a case where the number of the black cell indicating the size of the black partial area in the target code figure is 8 or greater and less than 16, the robot control device 30 determines that the size is medium. In a case where the number of the black cells indicating the aforementioned size of the black partial area in the target code figure is 16 or greater, the robot control device 30 determines that the aforementioned size is large.

In this example, in the figures FD4 and FD5, the number of the black cells are less than 8, it is determined that the size is small, in Step S230. The number of the black cells in the figure FD4 is 2, and the number of the black cells in the figure FD5 is 6. As illustrated in FIG. 12, the figures FD4 and FD5 are configured with one figure, the multiplicity is 1. In the figures FD6 and FD7, the number of the black cells is 8 or greater and less than 16, it is determined that the size is medium, in Step S230. The number of the black cells in the figure FD6 is 12, and the number of the black cells in the figure FD7 is 8. As illustrated in FIG. 12, the figures FD6 and FD7 are configured with one figure, and the multiplicity is 1. In the figures FD8 to FD10, since the number of the black cells is 16 or greater, it is determined that the size is large, in Step S230. The number of the black cells in the figure FD8 is 16, the number of the black cells in the figure FD9 is 20, and the number of the black cells in the figure FD10 is 24. As illustrated in FIG. 12, the figures FD8 to FD10 are configured with one figure, and the multiplicity is 1.

That is, in Step S230, in a case where it is determined that the size of the black partial area of the target code figure is small (Step S230-Small), the robot control device 30 specifies that the target code figure is any one of the figures FD4 and FD5. The robot control device 30 determines whether the aspect ratio of the black partial area of the target code figure is great or small (Step S240).

Here, processes of Step S240 are described. In Step S240, the robot control device 30 calculates an aspect ratio obtained by dividing the number of the black cells configuring the black partial area in the target code figure in the longitudinal direction by the number of the aforementioned black cells arranged in the horizontal direction. In this example, the longitudinal direction is a direction in which eight cells are arranged in respective columns of the 32 cells arranged in eight rows and four columns and the horizontal direction is a direction in which four are arranged in respective rows of the 32 cells arranged in eight rows and four columns. In a case where the calculated aspect ratio is 1 or greater, the robot control device 30 determines that the aforementioned aspect ratio is large. In a case where the calculated aspect ratio is less than 1, the robot control device 30 determines that the aforementioned aspect ratio is small.

In this example, in the figure FD4, the number of the black cells in the longitudinal direction is 2, and the number of the black cells in the horizontal direction is 1. Therefore, it is determined that the aspect ratio is large in Step S240. In the figure FD5, the number of the black cells in the longitudinal direction is 2, and the number of the black cells in the horizontal direction is 3. Therefore, it is determined that the aspect ratio is small, in Step S240.

That is, in Step S240, in a case where it is determined that the aspect ratio of the black partial area of the target code figure is large (Step S240-Large), the robot control device 30 specifies that the target code figure is the figure FD4. Meanwhile, in a case where it is determined that the aspect ratio of the black partial area of the target code figure is small (Step S240-Small), the robot control device 30 specifies that the target code figure is the figure FD5.

Meanwhile, in Step S230, in a case where it is determined that the size of the black partial area of the target code figure is medium (Step S230-Medium), the robot control device 30 specifies that the target code figure is any one of the figures FD6 and FD7. The robot control device 30 determines whether the aspect ratio of the black partial area of the target code figure is great or small (Step S250).

Here, processes of Step S250 are described. In Step S250, the robot control device 30 calculates an aspect ratio obtained by dividing the number of the black cells configuring the black partial area in the target code figure in the longitudinal direction by the number of the aforementioned black cells arranged in the horizontal direction. In a case where the calculated aspect ratio is 8, the robot control device 30 determines that the aforementioned aspect ratio is large. In a case where the calculated aspect ratio is less than 8, the robot control device 30 determines that the aforementioned aspect ratio is small.

In this example, in the figure FD7, the number of the black cells in the longitudinal direction is 4, and the number of the black cells in the horizontal direction is 3. Therefore, it is determined that the aspect ratio in Step S250 is small. In the figure FD8, the number of the black cells in the longitudinal direction is 8, and the number of the black cells in the horizontal direction is 1. Therefore, it is determined that the aspect ratio is large in Step S250.

That is, in Step S250, in a case where it is determined that the aspect ratio of the black partial area of the target code figure is small (Step S250-Small), the robot control device 30 specifies that the target code figure is the figure FD7. Meanwhile, in a case where it is determined that the aspect ratio of the black partial area of the target code figure is large (Step S250-Large), the robot control device 30 specifies that the target code figure is the figure FD8.

Meanwhile, in Step S230, in a case where it is determined that the size of the black partial area of the target code figure is large (Step S230-Large), the robot control device 30 specifies that the target code figure is any one of the figures FD8 to FD10. The robot control device 30 determines that the size of the black partial area of the target code figure is any one of large, medium, and small (Step S260).

Here, processes of Step S260 are described. In Step S260, in a case where the number of the black cells indicating the size of the black partial area in the target code figure is less than 20, the robot control device 30 determines that the aforementioned size is small. In a case where the number of the black cell indicating the size of the black partial area in the target code figure is 20 or greater and less than 24, the robot control device 30 determines that the aforementioned size is medium. In a case where the number of the black cells indicating the size of the black partial area in the target code figure is 24 or greater, the robot control device 30 determines that the aforementioned size is large.

In this example, in the figure FD8, since the number of the black cells is 16, it is determined that the size is small in Step S260. In the figure FD9, since the number of the black cells is 20, it is determined that the size is medium in Step S260. In the figure FD10, since the number of the black cells is 24, it is determined that the size is large in Step S230.

That is, in Step S260, in a case where it is determined that the size of the black partial area of the target code figure is small (Step S260-Small), the robot control device 30 specifies that the target code figure is the figure FD8. Meanwhile, in a case where it is determined that the size of the black partial area of the target code figure (Step S260-Medium), the robot control device 30 specifies that the target code figure is the figure FD9. Meanwhile, in a case where it is determined that the size of the black partial area of the target code figure is large (Step S260-Large), the robot control device 30 specifies that the target code figure is the figure FD10.

Meanwhile, in a case where it is determined that the number of the figure centers is 2 in Step S220 (Step S220-2), the robot control device 30 specifies that the target code figure is any one of the figures FD11 to FD16. The robot control device 30 determines whether the size on the first column from the left side in the 32 cells arranged in eight rows and four columns among the sizes of the black partial area of the target code figure is larger than the size on the third column from the aforementioned left side, the respective sizes of the first and third columns from the aforementioned left side are the same size, or the size of the third column from the aforementioned left side is larger than the size of the first column from the aforementioned left side (Step S270).

Here, processes of Step S270 are described. In Step S270, in a case where the number of the black cells configuring the size of the first column from the left side in the 32 cells arranged in eight rows and four columns among the sizes of the black partial area of the target code figure is greater than the number of the black cells configuring the size of the third column from the aforementioned left side, the robot control device 30 determines that the size of the first column from the left side in the 32 cells arranged in eight rows and four columns among the sizes of the black partial area of the target code figure is larger than the size of the third column from the aforementioned left side.

In a case where the number of the black cells configuring the size of the first column from the left side in the 32 cells arranged in eight rows and four columns among the sizes of the black partial area of the target code figure is the same as the number of the black cells configuring the size of the third column from the aforementioned left side, the robot control device 30 determines that the respective sizes of the first and third columns from the left side in the 32 cells arranged in eight rows and four columns among the sizes of the black partial area of the target code figure are the same with each other.

In a case where the number of the black cells configuring the size of the third column from the left side in the 32 cells arranged in eight rows and four columns among the sizes of the black partial area of the target code figure is greater than the number of the black cells configuring the size of the first column from the aforementioned left side, the robot control device 30 determines that the size of the third column from the left side in the 32 cells arranged in eight rows and four columns among the sizes of the black partial area of the target code figure is larger than the size of the first column from the aforementioned left side.

In this example, in the figures FD11 and FD12, the number of black cells configuring the size of the first column from the left side in the 32 cells arranged in eight rows and four columns among the sizes of the black partial area is greater than the number of black cells configuring the size of the third column from the aforementioned left side, and thus it is determined that the size of the first column from the left side in the 32 cells arranged in eight rows and four columns among the sizes of the black partial area is larger than the size of the third column from the aforementioned left side.

In the figure FD11, the number of the black cells configuring the size of the first column from the left side in the 32 cells arranged in eight rows and four columns among the sizes of the black partial area is 2, and the number of the black cells configuring the size of the third column from the aforementioned left side is 8.

In the figure FD12, the number of the black cells configuring the size of the first column from the left side in the 32 cells arranged in eight rows and four columns among the sizes of the black partial area is 6, and the number of the black cells configuring the size of the third column from the aforementioned left side is 8.

The figures FD11 and FD12 are configured with two figures, and thus the respective figure centers of the figures do not belong to the predetermined range. Therefore, the multiplicity is 1 and the number of the figure centers is 2.

In the figures FD13 and FD14, the number of the black cells configuring the size of the first column from the left side in the 32 cells arranged in eight rows and four columns among the sizes of the black partial area is the same as the number of the black cells configuring the size of the third column from the aforementioned left side, it is determined that the respective sizes of the first and third columns from the left side in the 32 cells arranged in eight rows and four columns among the sizes of the black partial area are the same with each other.

In the figure FD13, the number of the black cells configuring the size of the first column from the left side in the 32 cells arranged in eight rows and four columns among the sizes of the black partial area is 2, and the number of the black cells configuring the size of the third column from the aforementioned left side is 2.

In the figure FD14, the number of the black cells configuring the size of the first column from the left side in the 32 cells arranged in eight rows and four columns among the sizes of the black partial area is 8, and the number of the black cells configuring the size of the third column from the aforementioned left side is 8.

The figures FD13 and FD14 are configured with two figures, and the respective figure centers of the figures do not belong to the predetermined range. Therefore, the multiplicity is 1 and the number of the figure centers is 2.

In the figures FD15 and FD16, the number of the black cells configuring the size of the third column from the left side in the 32 cells arranged in eight rows and four columns among the sizes of the black partial area is greater than the number of the black cells configuring the size of the first column from the aforementioned left side, and thus it is determined that the size of the third column from the left side in the 32 cells arranged in eight rows and four columns among the sizes of the black partial area is larger than the size of the first column from the aforementioned left side.

In the figure FD15, the number of the black cells configuring the size of the first column from the left side in the 32 cells arranged in eight rows and four columns among the sizes of the black partial area is 8, and the number of the black cells configuring the size of the third column from the aforementioned left side is 2.

In the figure FD16, the number of the black cells configuring the size of the first column from the left side in the 32 cells arranged in eight rows and four columns among the sizes of the black partial area is 8, and the number of the black cells configuring the size of the third column from the aforementioned left side is 6.

The figures FD15 and FD16 are configured with two figures, and the respective figure centers of the figures do not belong to the predetermined range. Therefore, the multiplicity is 1 and the number of the figure centers is 2.

That is, in Step S270, in a case where it is determined that the size of the first column from the left side in the 32 cells arranged in eight rows and four columns among the sizes of the black partial area is larger than the size of the third column from the aforementioned left side (Step S270-Third column is large), the robot control device 30 specifies that the target code figure is any one of the figures FD11 and FD12. The robot control device 30 determines whether the size of the black partial area of the target code figure is large or small (Step S280).

Here, processes of Step S280 are described. In Step S280, in a case where the number of the black cells indicating the size of the black partial area in the target code figure is less than 18, the robot control device 30 determines that the aforementioned size is small. In a case where the number of the black cells indicating the size of the black partial area in the target code figure is 18 or greater, the robot control device 30 determines that the aforementioned size is large.

In this example, in the figure FD11, the number of the black cells is 10, and thus it is determined that the size is small in Step S280. In the figure FD12, the number of the black cells is 18, and thus it is determined that the size is large in Step S280.

That is, in Step S280, in a case where it is determined that the size of the black partial area of the target code figure is small (Step S280-Small), the robot control device 30 specifies that the target code figure is the figure FD11. Meanwhile, in a case where it is determined that the size of the black partial area of the target code figure is large (Step S280-Large), the robot control device 30 specifies that the target code figure is the figure FD12.

Meanwhile, in a case where it is determined that the respective sizes of the first and third columns from the left side in the 32 cells arranged in eight rows and four columns among the sizes of the black partial area are the same with each other (Step S270-Same), the robot control device 30 specifies that the target code figure is any one of the figures FD13 and FD14. The robot control device 30 determines whether the size of the black partial area of the target code figure is large or small (Step S290).

Here, processes of Step S290 are described. In Step S290, in a case where the number of the black cells indicating the size of the black partial area in the target code figure is less than 16, the robot control device 30 determines that the aforementioned size is small. In a case where the number of the black cells indicating the size of the black partial area in the target code figure is 16 or greater, the robot control device 30 determines that the aforementioned size is large.

In this example, in the figure FD13, the number of the black cells is 4, and thus it is determined that the size is small in Step S290. In the figure FD14, the number of the black cells is 16, and thus it is determined that the size is large in Step S290.

That is, in Step S290, in a case where it is determined that the size of the black partial area of the target code figure is small (Step S290-Small), the robot control device 30 specifies that the target code figure is the figure FD13. Meanwhile, in a case where it is determined that the size of the black partial area of the target code figure is large (Step S290-Large), the robot control device 30 specifies that the target code figure is the figure FD14.

Meanwhile, in a case where it is determined that the size of the third column from the aforementioned left side in the 32 cells arranged in eight rows and four columns among the sizes of the black partial area are greater than the size of the first column from the left side (Step S270-First column is large), the robot control device 30 specifies that the target code figure is any one of the figures FD15 and FD16. The robot control device 30 determines whether the size of the black partial area of the target code figure is large or small (Step S295).

Here, processes of Step S295 are described. In Step S295, in a case where the number of the black cells indicating the size of the black partial area in the target code figure is less than 18, the robot control device 30 determines that the aforementioned size is small. In a case where the number of black cells indicating that the size of the black partial area in the target code figure is 18 or greater, the robot control device 30 determines that the aforementioned size is large.

In this example, in the figure FD15, the number of black cells is 10, and thus it is determined that the size in Step S295 is small. In the figure FD16, the number of black cells is 18, and thus it is determined that the size in Step S295 is large.

That is, in Step S295, in a case where it is determined that the size of the black partial area of the target code figure is small (Step S295-Small), the robot control device 30 specifies that the target code figure is the figure FD15. Meanwhile, in a case where it is determined that the size of the black partial area of the target code figure is large (Step S295-Large), the robot control device 30 specifies that the target code figure is the figure FD16.

In this manner, the robot control device 30 can specify that the target code figure is any one of 16 types of code figures. Therefore, the figures FD1 to FD16 are sequentially regarded as hexadecimal numbers of 1 to F, one code figure can indicate information of 4 bits. That is, four code figures included in the data area can indicate a code of 16 bits.

In the marker in this example (for example, the marker Mk), respective four code figures included in the data area are disposed such that respective figure centers of the aforementioned code figures are positioned on a straight line that pass through the figure center of the first figure and the figure center of the second figure. In this manner, in a case where plural figures exist between a candidate of the first figure and a candidate of the second figure, the robot control device 30 determines whether these figures are the marker in this example or not. Therefore, it is possible to suppress a combination of figures which are not the aforementioned marker from being erroneously detected as the marker.

As above, the marker in this example has a data area including a first figure, a second figure, and four code figures. In this manner, after the first figure is detected, the aforementioned marker can cause the data area to be detected based on the figure center of the aforementioned first figure, and as a result, the failure of the detection of the marker by the external factor with respect to the marker can be suppressed.

Overview of Detection Method of Figure Center Marker

Hereinafter, a detection method of the figure center marker by the robot control device 30 according to the present embodiment is described.

In this example, in the detection method of the figure center marker by this robot control device 30, when the figure center marker is detected from the captured image, the robot control device 30 converts the captured image into a grayscale image (grayscale process). The robot control device 30 converts the captured image into a 256 gradation grayscale image in the grayscale process of the captured image. The robot control device 30 may have a configuration of converting the captured image into another gradation grayscale image, instead of the configuration of converting the captured image into a 256 gradation grayscale image.

The robot control device 30 converts a grayscale image obtained by converting the captured image in the grayscale process, into a binarized image (monochrome image) (binarization process). The binarization process is a process for converting a grayscale image into a binarized image by converting a color of a pixel having luminance of a predetermined threshold value (binarized threshold value) or greater on a grayscale image into white and converting a pixel having luminance of less than the aforementioned threshold value into black. In this example, a binarized threshold value is determined in advance. The binarized threshold value may be another configuration that can be determined by a method based on the captured image of Otsu's method or the like. The robot control device 30 detects a figure center marker from the binarized image obtained by converting the grayscale image by the binarization process.

With Respect to Flow of Marker Detection Process

Figure 13:
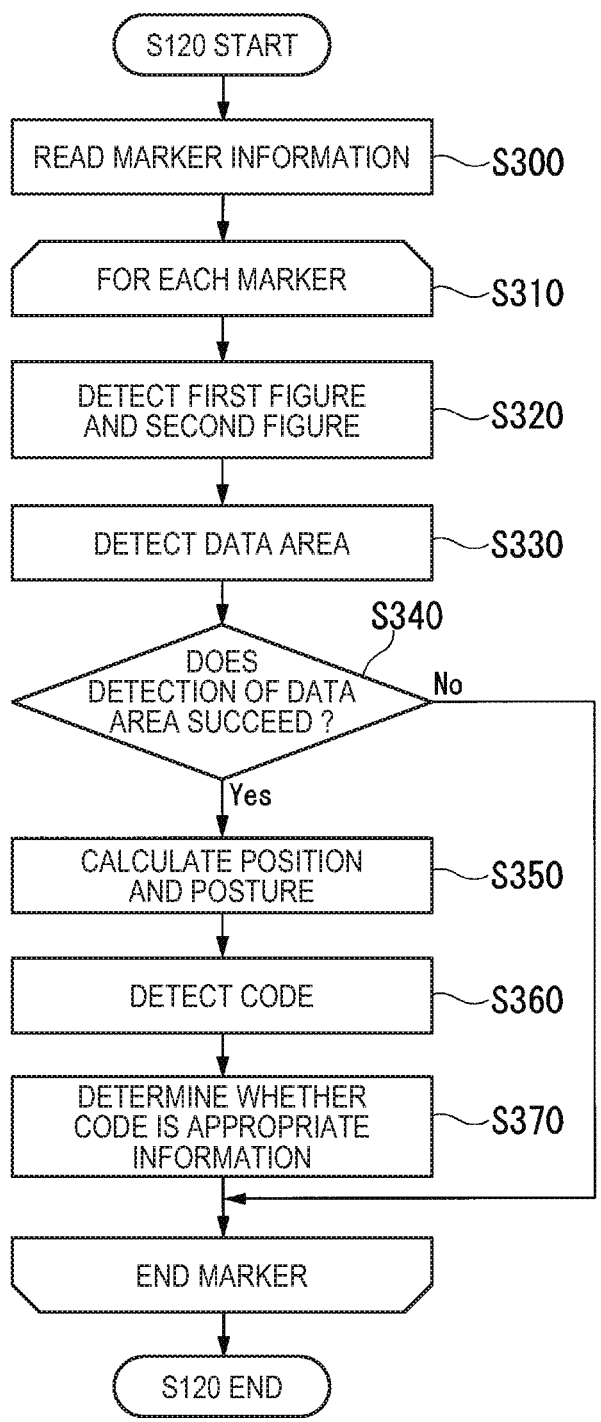
FIG. 13 is a flow chart illustrating an example of a flow of a marker detection process in Step S120 illustrated in FIG. 4.

Hereinafter, with respect to FIG. 13, a marker detection process in Step S120 illustrated in FIG. 4 is described. FIG. 13 is a flow chart illustrating an example of a flow of a marker detection process in Step S120 illustrated in FIG. 4.

The image process portion 44 reads marker information stored in advance in the storage portion 32 from the storage portion 32 (Step S300). In this example, the marker information includes at least information illustrating a marker and information associated with the information illustrating each of the first figure and the second figure that the marker has. For example, the marker information includes information illustrating the marker Mk and information associated with the information illustrating each of the first figure F1 and the second figure F2 that the marker Mk has.

In this example, the information illustrating the marker is the marker ID. Instead of this, the information illustrating the marker may be other information as long as the information is information that can identify a marker such as a marker name. In this example, the information illustrating each of the first figure and the second figure is a model image used for detecting each of the first figure and the second figure by pattern matching. Instead of this, the information illustrating each of the first figure and the second figure may be other information that can be used in the process for detecting each of the first figure and the second figure from the captured image. The process of Step S300 may have a configuration of being performed by any one functional portion of respective functional portions illustrated in FIG. 3 that the image process portion 44 includes or may have a configuration of being performed by a functional portion which is not illustrated in FIG. 3 that the image process portion 44 includes.

Subsequently, the respective functional portions included in the image process portion 44 select the markers ID included in the marker information read from the storage portion 32 in Step S300 one by one, use the markers illustrated by the selected marker ID as a target marker, and repeatedly perform the processes from Steps S320 to S370 for each target marker (Step S310).

Hereinafter, for easier description, a case where a marker ID included in the marker information is only one marker ID illustrating the marker Mk is described. In this case, the image process portion 44 performs processes from Steps S320 to S370 on the marker Mk, one time.

Subsequently, the first detecting process portion 50 extracts information illustrating each of the first figure F1 and the second figure F2 associated with the marker ID illustrating the marker Mk selected as the target marker in Step S310 from the marker information. The first detecting process portion 50 detects each of the aforementioned first figure F1 and the aforementioned second figure F2 from the captured image acquired by the image acquisition portion 42 in Step S110 illustrated in FIG. 4, based on the extracted information illustrating each of the first figure F1 and the second figure F2 and the detection method of the figure center marker described above (Step S320).

Here, processes of Step S320 are described. The first detecting process portion 50 detects a figure center marker having multiplicity of 3 or greater, from the captured image, as candidates of the first figure F1 and the second figure F2. The multiplicity (the number of overlapped figure centers) of four code figures included in the data area is 2 at most, and the multiplicity thereof is smaller than each of the first figure F1 and the second figure F2. Therefore, the first detecting process portion 50 suppresses erroneous detection of these code figures as candidates of the first figure F1 and the second figure F2. The first detecting process portion 50 detects the first figure F1 and the second figure F2 by the pattern matching from the figure center markers having the multiplicity of 3 or greater which are detected as the candidates of the first figure F1 and the second figure F2, based on model images of the respective first figure F1 and the second figure F2 extracted from the marker information. As the processes of the pattern matching, methods known in the related art are used, and thus description thereof is omitted.

Figure 14:
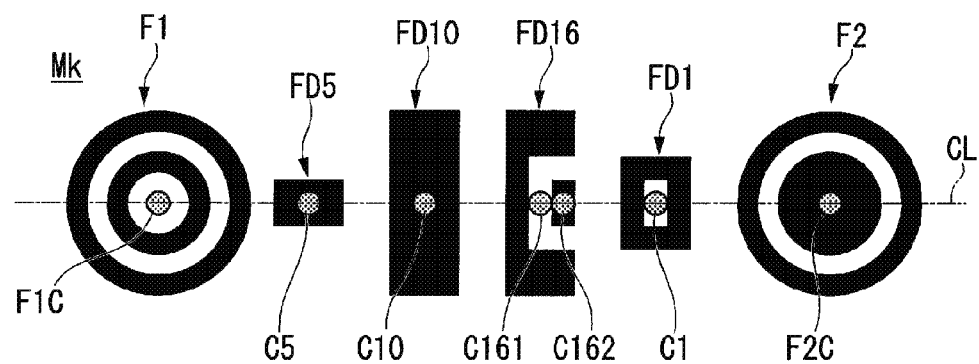
FIG. 14 is a diagram exemplifying the figure center of the first figure F1 and the figure center of the second figure F2 that the marker Mk has, and respective figure centers of the four code figures included in the data area.

Subsequently, the second detecting process portion 51 detects the data area that the marker Mk has, based on the first figure F1 and the second figure F2 detected by the first detecting process portion 50 from the captured image in Step S320 (Step S330). Here, processes of Step S330 are described with reference to FIGS. 14 and 15. FIG. 14 is a diagram exemplifying the figure center of the first figure F1 and the figure center of the second figure F2 that the marker Mk has, and respective figure centers of the four code figures included in the data area. In FIG. 14, the aforementioned four code figures are arranged from the first figure F1 toward the second figure F2 in an order of the figure FD5, the figure FD10, the figure FD16, and the figure FD1.

As described above, in the marker Mk illustrated in FIG. 14, the figure FD5, the figure FD10, the figure FD16, and the figure FD1 are disposed, such that a figure center C5 of the figure FD5, a figure center C10 of the figure FD10, a figure center C161 and a figure center C162 of the figure FD16 (having two figure centers), and a figure center C1 of the figure FD1, which are the four code figures, are positioned on a straight line CL connecting a figure center F1C of the first figure F1 and a figure center F2C of the second figure F2.

The second detecting process portion 51 executes a process for detecting plural figures included between the first figure F1 and the second figure F2 detected as the data area that the marker Mk has in Step S330, as candidates of the four code figures. In this process, the second detecting process portion 51 calculates figure centers of the plural figures included between the first figure F1 and the second figure F2. In a case where four figures having figure centers positioned on the straight line (that is, in the direction connecting the figure center of the first figure F1 and the figure center of the second figure F2) CL passing through the figure center F1C of the first figure F1 and the figure center F2C of the second figure F2 are detected, the second detecting process portion 51 detects these four figures as the four code figures included in the data area that the marker Mk has.

After the process for detecting the data area in Step S330 is executed, the second detecting process portion 51 determines whether the detection of the data area in Step S330 succeeds or not (Step S340). In a case where it is determined that the detection of the data area does not succeed (failed) (Step S340-No), the second detecting process portion 51 proceeds to Step S310 and selects a next marker. In this example, the marker that can be selected in Step S310 is only the marker Mk. Therefore, in a case where the second detecting process portion 51 determines that the detection of the data area does not succeed, the information illustrating failure in the detection of the marker is generated as the results of the marker detection process and ends the process. Meanwhile, in a case where the second detecting process portion 51 determines that the detection of the data area succeeds (Step S340-Yes), the position and posture calculating portion 52 calculates the position and the posture of the marker Mk as the position and the posture in the robot coordinate system of the target object O based on the first figure F1 and the second figure F2 detected in Step S320 (Step S350). The position of the captured image and the position in the robot coordinate system are associated with each other by calibration in advance.

Here, the process for calculating the posture of the marker Mk in the process of Step S350 is described. In this example, the position and posture calculating portion 52 calculates the posture of the first figure F1 as the posture (in this example, the posture of the target object O) of the marker Mk by setting the normal direction with respect to the first figure F1 in the figure center F1C of the first figure F1 as the Z axis, the direction from the figure center F2C of the second figure F2 toward the figure center F1C of the first figure F1 as the X axis, and the direction intersecting to the aforementioned Z axis and the aforementioned X axis as the Y axis. Instead of this, the position and posture calculating portion 52 may have a configuration of calculating the posture of the marker Mk by another method based on the figure center F1C of the first figure F1.

After the position and the posture of the target object O in the robot coordinate system in Step S350 are calculated, the code detection portion 53 specifies that each of these four code figures is any one of the figures FD1 to FD16, based on the data area detected by the second detecting process portion 51 in Step S330, that is, the four code figures included in the aforementioned data area and the process of the flow chart illustrated in FIG. 12. The code detection portion 53 detects the code that the specified four code figures indicate (Step S360).

Subsequently, the code detection portion 53 determines whether the code detected in Step S360 is appropriate information or not (Step S370). In this example, the appropriate information is robot operation information with which the robot control device 30 is operated in the robot 20 without an error.

In a case where it is determined that the aforementioned code is not the appropriate information, the code detection portion 53 generates the information illustrating the failure in the detection of the marker Mk as the results of the marker detection process. The image process portion 44 proceeds to Step S310 and selects a next marker. In this example, the marker that can be selected in Step S310 is only the marker Mk. Therefore, the image process portion 44 generates the results of the aforementioned marker detection process and ends the process.

Meanwhile, in a case where it is determined that the aforementioned code is appropriate information, the code detection portion 53 generates information including the position and the posture of the marker Mk calculated by the position and posture calculating portion 52 in Step S350 and the code detected in Step S360 as the results of marker detection process. The image process portion 44 proceeds to Step S310 and selects a next marker. In this example, the image process portion 44 generates the results of the aforementioned marker detection process and ends the process.

In this manner, the robot control device 30 detects the first figure F1 and detects the data area based on the figure center F1C of the first figure F1. Accordingly, the robot control device 30 can suppress the failure of the detection of the marker Mk by the external factor with respect to the marker Mk.

In the process of the flow chart illustrated in FIG. 13, the description has been made in an assumption that the resolution of the captured image including the marker Mk is in a range in which 32 cells configuring the respective four code figures included in the data area are differentiated by the second detecting process portion 51. In order to guarantee this assumption, the first detecting process portion 50 may have a configuration of determining whether the size of any one or both of the detected first figure F1 and the detected second figure F2 in the process of Step S320 of the flow chart illustrated in FIG. 13 is the predetermined size or greater or not.

In a case where the first detecting process portion 50 determines that the size of any one or both of the detected first figure F1 and the detected second figure F2 is not the predetermined size or greater, the image process portion 44 generates the information illustrating the failure in the detection of the marker Mk as the results of the marker detection process and ends the process.

Meanwhile, in a case where the first detecting process portion 50 determines that the size of any one or the both of the detected first figure F1 and the detected second figure F2 is predetermined size or greater, the second detecting process portion 51 executes the process of Step S330 of the flow chart illustrated in FIG. 13. The predetermined size is indicated by, for example, the number of pixels configuring any one or the both of the detected first figure F1 and the detected second figure F2 and is a value determined according to the resolution of the image capturing portion that captures the captured image.

Modified Example 1 of First Embodiment

Hereinafter, Modified Example 1 according to the first embodiment of the invention is described with respect to the drawings. The marker attached to the target object O described in the first embodiment may be a marker Mk1 described in this example, instead of the marker Mk. That is, in Modified Example 1 according to the first embodiment, the robot control device 30 detects the marker Mk1, instead of the marker Mk. The marker Mk1 is a marker in a configuration in which only the second figure F2 is omitted (deleted) from the marker Mk.

Details of Marker According to Modified Example 1 of First Embodiment

Figure 15:
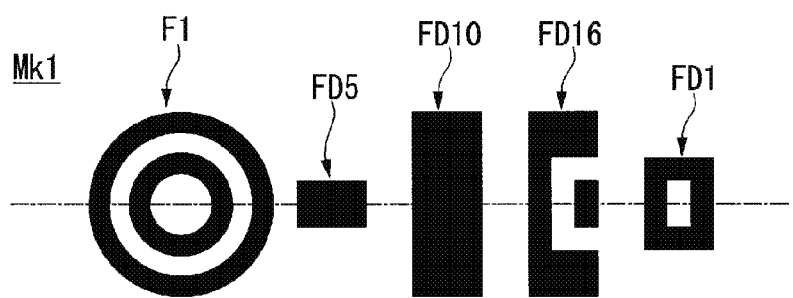
FIG. 15 is a diagram illustrating an example of a marker according to Modified Example 1 of the first embodiment.

FIG. 15 is a diagram illustrating an example of the marker according to Modified Example 1 of the first embodiment. As illustrated in FIG. 15, differently from the marker Mk, the marker Mk1 has only the first figure F1, without having the second figure F2. That is, the marker Mk1 has the same characteristics as the marker Mk, except for not having the second figure F2. In the example illustrated in FIG. 15, the marker Mk1 includes the figure FD5, the figure FD10, the figure FD16, and the figure FD1 in the data area, as the aforementioned code figure.

Figure 16:
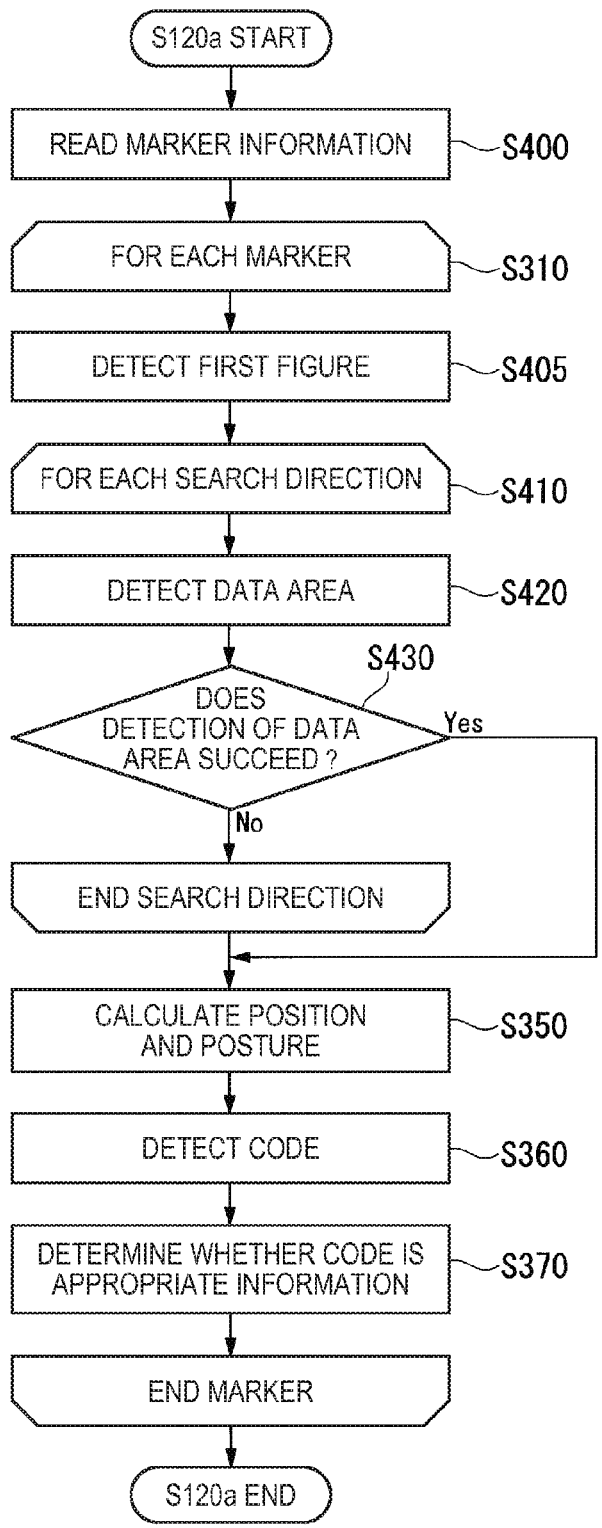
FIG. 16 is a flow chart illustrating an example of the flow of the marker detection process executed by an image process portion in Modified Example 1 according to the first embodiment.

With Respect to Flow of Marker Detection Process in Modified Example 1 According to First Embodiment Hereinafter, the flow of the marker detection process in Modified Example 1 according to the first embodiment is described. In Modified Example 1 according to the first embodiment, in the flow chart illustrated in FIG. 4, the image process portion 44 performs a process of Step S120a described below, instead of the process of Step S120. FIG. 16 is a flow chart illustrating an example of the flow of the marker detection process executed by the image process portion 44 in Modified Example 1 according to the first embodiment. In FIG. 16, the process of Step S310 and the processes of Steps S350 to S370 are the same processes as the process of Step S310 and the processes of Steps S350 to S370 illustrated in FIG. 13, and thus descriptions thereof are omitted.

The image process portion 44 reads marker information including the information illustrating the first figure that each of one or more markers stored in the storage portion 32 in advance has from the storage portion 32 (Step S400). In this example, at least the information in which the information illustrating the marker and the information illustrating the first figure that the marker has are associated with each other is included in the marker information. For example, the information in which the information illustrating the marker Mk1 and the information illustrating the first figure F1 that the marker Mk1 has are associated with each other is included in the marker information. Hereinafter, for easier description, a case where only the aforementioned information is included in the marker information is described.

Subsequently, the first detecting process portion 50 extracts the information illustrating the first figure F1 associated with the marker ID illustrating the selected marker Mk1 as the target marker in Step S310 from the marker information. The first detecting process portion 50 detects the first figure F1 from the captured image acquired by the image acquisition portion 42 in Step S110 illustrated in FIG. 4, based on the information illustrating the extracted first figure F1 and the detection method of the marker described above (Step S405). The process for detecting the first figure F1 from the captured image in Step S405 is the same as the process for detecting the first figure F1 among the first figure F1 and the second figure F2 in Step S320, and thus descriptions thereof are omitted.

Subsequently, the second detecting process portion 51 selects the search direction with the figure center F1C of the first figure F1 detected in Step S405 as a starting point, in a range from 0° to 360° in a counterclockwise direction with a predetermined direction as 0° and repeatedly performs processes of Steps S420 to S430 for each selected search direction (Step S410). For example, the predetermined direction is a positive direction in the X axis of the image capturing element used in the capturing of the captured image. Instead of this, the predetermined direction may be another direction such as a randomly determined direction. The search direction is an example of the direction passing through the figure center of the first figure.

Specifically, the second detecting process portion 51 performs the processes of Steps S420 to S430 by selecting 0° which is a predetermined direction as a search direction, selects a direction (0°+the angle AG) obtained by adding a predetermined angle AG to 0° as a next search direction, and performs processes of Steps S420 to S430. The second detecting process portion 51 performs the processes Step S420 to S430 with (0°+angle AG) as the search direction and selects a direction (0°+2AG) obtained by adding the predetermined angle AG to (0°+angle AG) as the search direction in the next processes of Steps S420 to S430. By repeating this, the second detecting process portion 51 repeatedly performs the processes of Steps S420 to S430 for each search direction selected in the range of 0° to 360°. The predetermined angle is, for example, 0.1°. Instead of this, the predetermined angle may be another angle.

After the search direction is selected in Step S410, the second detecting process portion 51 detects the four code figures included in the data area from the figure center F1C of the first figure F1 detected in Step S405 in the search direction selected in Step S410 (Step S420). Specifically, the second detecting process portion 51 detects the candidate of the four code figures included in the data area from the figure center F1C of the first figure F1 detected in Step S405 in the search direction selected in Step S410. In a case where the four figures which become the aforementioned candidates in the aforementioned search direction are detected, the second detecting process portion 51 calculates respective figure centers of the aforementioned four figures. In a case where all of the calculated figure centers are positioned on the straight line extending from the figure center F1C of the first figure F1 in the aforementioned search direction, the second detecting process portion 51 specifies that the detected four figures are the four code figures included in the data area.

Subsequently, the second detecting process portion 51 determines whether the detection of the four code figures included in the data area that the marker Mk1 has in Step S420, that is, the aforementioned data area succeeds or not (Step S430). In a case where the second detecting process portion 51 determines that the detection of the four code figures succeeds (Step S430-Yes), the position and posture calculating portion 52 proceeds to Step S350 and calculates the position and the posture of the marker Mk1 as the position and the posture in the robot coordinate system of the target object O. Meanwhile, in a case where it is determined that the detection of the four code figures does not succeed (fails) (Step S430-No), the second detecting process portion 51 proceeds to Step S410 and selects a next search direction from unselected search directions.

Figure 17:
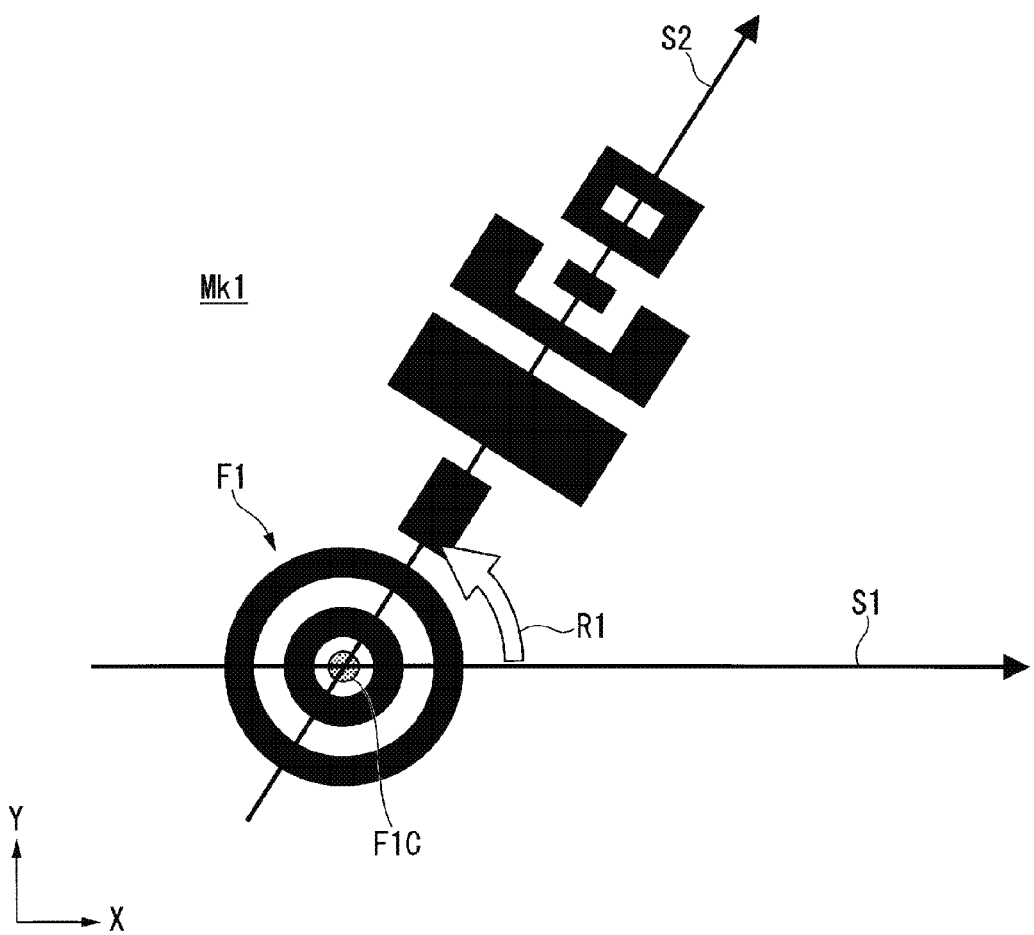
FIG. 17 is a diagram visually describing an overview of processes of Steps S410 to S430 in the flow chart illustrated in FIG. 16.

FIG. 17 is a diagram visually describing an overview of processes of Steps S410 to S430 in the flow chart illustrated in FIG. 16. Two arrows are illustrated from the figure center F1C of the marker Mk1 illustrated in FIG. 17 in directions different from each other. An arrow S1 which is one of the aforementioned two arrows extends from the figure center F1C in the positive direction of the X axis in the coordinate system illustrated in FIG. 17. Meanwhile, an arrow S2 which is one of the aforementioned two arrows extends in a direction obtained by counterclockwisely rotating the arrow S1 about the figure center F1C as a center by an angle R1.

In FIG. 17, the arrow S1 indicates a predetermined direction initially selected as a search direction in Step S410 illustrated in FIG. 16. As illustrated in FIG. 17, the four code figures included in the data area that the marker Mk1 has do not exist in the direction illustrated by the arrow S1. Therefore, the second detecting process portion 51 counterclockwisely changes the search direction from the direction of the arrow S1 and detects the aforementioned code figure for each changed search direction. In a case where the direction of the arrow S2 in Step S410 is selected, the second detecting process portion 51 can detect the aforementioned code figure.

In this manner, even in a case where the marker attached to the target object O does not have the second figure, the robot control device 30 can detect the position and the posture of the marker and the code illustrated by one or more code figures included in the data area that the marker has and thus the same effect as in the first embodiment can be obtained.

Modified Example 2 of First Embodiment

Hereinafter, Modified Example 2 according to the first embodiment of the invention is described with reference to the drawings. Instead of the marker Mk and the marker Mk1, the marker attached the target object O described in the first embodiment above may be the marker Mk2 described in this example. That is, in Modified Example 2 according to the first embodiment, instead of the marker Mk and the marker Mk1, the robot control device 30 detects the marker Mk2. The marker Mk2 is a marker having a configuration including only one code figure FC described below in the data area that the marker Mk has, instead of the four code figures.

Details of Marker According to Modified Example 2 of First Embodiment

Figure 18:
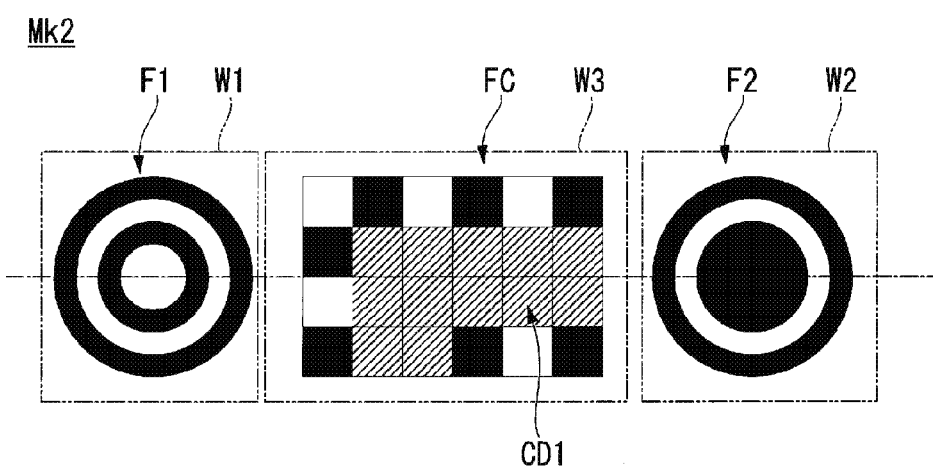
FIG. 18 is a diagram illustrating an example of the marker according to Modified Example 2 of the first embodiment.

FIG. 18 is a diagram illustrating an example of the marker according to Modified Example 2 of the first embodiment. As illustrated in FIG. 18, differently from the marker Mk, the marker Mk2 has only one code figure FC in the data area W3. That is, the marker Mk2 has the same characteristics as the marker Mk, except for the code figure included in the data area W3. The code figure FC indicates one code, differently from the four code figures included in the data area that the marker Mk has.

In the example illustrated in FIG. 18, the code figure FC is a two-dimensional code in which 24 square-shaped cells are arranged in four rows and six columns. Each of the aforementioned cells is any one of a white cell or a black cell. The code figure FC includes a fixed code used as a sign for detecting the code figure FC. The fixed code is configured with cells of which colors are fixed (colors are not changed) among the cells that configure the code figure FC. That is, in this example, the fixed code is not a portion of the codes that the code figure FC indicates.

In the example illustrated in FIG. 18, among the cells indicating the fixed codes, there are five white cells on the first row and the first column, on the first row and the third column, on the first row and the fifth column, on the third row and the first column, and on the fourth row and the fifth column in the aforementioned four rows and six columns. Among the cells indicating the aforementioned fixed code, there are five black cells on the first row and the second column, on the first row and the third column, on the first row and the fifth column, on the second row and the first column, on the fourth row and the first column in the aforementioned four rows and six columns. Instead of this, the white cells or the black cells indicating the fixed codes may be at any positions in the aforementioned four rows and six columns.

The code figure FC indicates a code of 12 bits with the remained 12 cells except for the cells indicating the fixed codes among the aforementioned four rows and six columns, by causing white and black to be considered as binary numbers of 0 and 1. That is, all the code indicated by the code figure FC is indicated with these 12 cells (a portion of the code is not indicated by fixed codes as described above). In FIG. 18, all of these 12 cells are included in a hatched area CD1. In the hatched area CD1 illustrated in FIG. 18, colors of all of these 12 cell are omitted.

With Respect to Flows of Marker Detection Process According to Modified Example 2 of First Embodiment Hereinafter, the flow of the marker detection process according to Modified Example 2 of the first embodiment is described. According to Modified Example 2 of the first embodiment, in the flow chart illustrated in FIG. 4, the image process portion 44 performs a process of Step S120b described below, instead of the process of Step S120.

Figure 19:
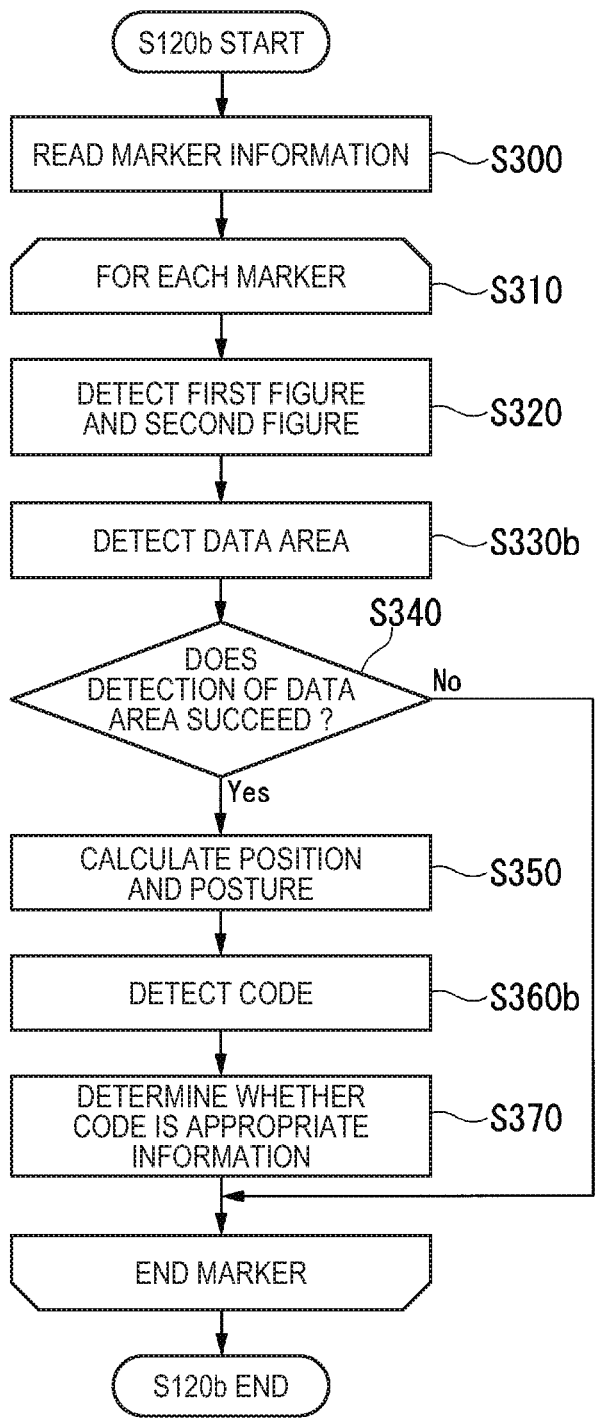
FIG. 19 is a flow chart illustrating an example of a flow of a marker detection process executed by an image process portion according to Modified Example 2 of the first embodiment.

FIG. 19 is a flow chart illustrating an example of the flow of the marker detection process executed by the image process portion 44 according to Modified Example 2 of the first embodiment. In FIG. 19, processes of Steps S300 to S320, processes of Steps S340 to S350, and a process of Step S370 are the same processes as the processes of Steps S300 to S320, the processes of Steps S340 to S350, and the process of Step S370 illustrated in FIG. 13. Therefore, descriptions thereof are omitted.

After the first figure F1 and the second figure F2 are detected in Step S320, the second detecting process portion 51 detects the data area that the marker Mk2 has, based on the aforementioned first figure F1 and the aforementioned second figure F2 (Step S330b). Here, the process of Step S330b is described. The second detecting process portion 51 executes the process for detecting a figure included between the first figure F1 and the second figure F2 as the data area that the marker Mk2 has, as a candidate of the code figure FC. In this process, the second detecting process portion 51 searches for (detects) a fixed code from the figure included between the first figure F1 and the second figure F2. In a case where the fixed code is detected from the aforementioned figure, the second detecting process portion 51 detects this figure as the code figure FC included in the data area that the marker Mk2 has. When the fixed code is detected, the second detecting process portion 51 detects the fixed code by the method well-known in the related art, such as reading a model figure of the fixed code from the storage portion 32 in advance and detecting the fixed code by pattern matching using the read aforementioned model figure.

After the position and the posture of the marker Mk2 in Step S350 are calculated as the position and the posture in the robot coordinate system of the target object O, the code detection portion 53 detects the code indicated by the code figure FC, by detecting respective positions and colors of 12 cells except for 12 cells which are the fixed code from the code figure FC detected in Step S330b (Step S360b). The detection method of the code in Step S360b is the same as the detection method of the two-dimensional code well-known in the art, and thus descriptions thereof are omitted.

In this manner, even in a case where the marker attached to the target object O is a marker having the same characteristics as the marker Mk2, the robot control device 30 can detect the position and the posture of the marker and the code illustrated by the code figure included in the data area that the marker has. Therefore, the same effect as the first embodiment can be obtained.

The process of the flow chart illustrated in FIG. 19 is described in an assumption that the resolution of the captured image including the marker Mk2 is in a range in which respective cells of the code figure FC included in the data area can be differentiated by the second detecting process portion 51. Since this assumption is guaranteed, the first detecting process portion 50 has a configuration of determining whether the size of any one or both of the detected first figure F1 and the detected second figure F2 is the predetermined size or greater in the process of Step S320 in the flow chart illustrated in FIG. 19. In a case where the first detecting process portion 50 determines that the size of any one or the both of the detected first figure F1 and the detected second figure F2 is not the predetermined size or greater, the image process portion 44 generates the information illustrating that the detection of the marker Mk2 fails as a result of the marker detection process and ends the process. Meanwhile, in a case where the first detecting process portion 50 determines that the size of any one or the both of the detected first figure F1 and the detected second figure F2 is the predetermined size or greater, the second detecting process portion 51 executes a process of Step S330b of the flow chart illustrated in FIG. 19.

Modified Example 3 of First Embodiment

Hereinafter, Modified Example 3 according to the first embodiment of the invention is described with reference to the drawings. The marker attached to the target object O described in the first embodiment may be a marker Mk3 described in this example instead of the marker Mk, the marker Mk1, and the marker Mk2. That is, in Modified Example 3 of the first embodiment, the robot control device 30 detects the marker Mk3, instead of the marker Mk, the marker Mk1, and the marker Mk2. The marker Mk3 is a marker having a configuration including only one code figure FC described in Modified Example 2 according to the first embodiment in the data area that the marker Mk1 has, instead of the four code figures.

Details of Marker in Modified Example 3 According to First Embodiment

Figure 20:
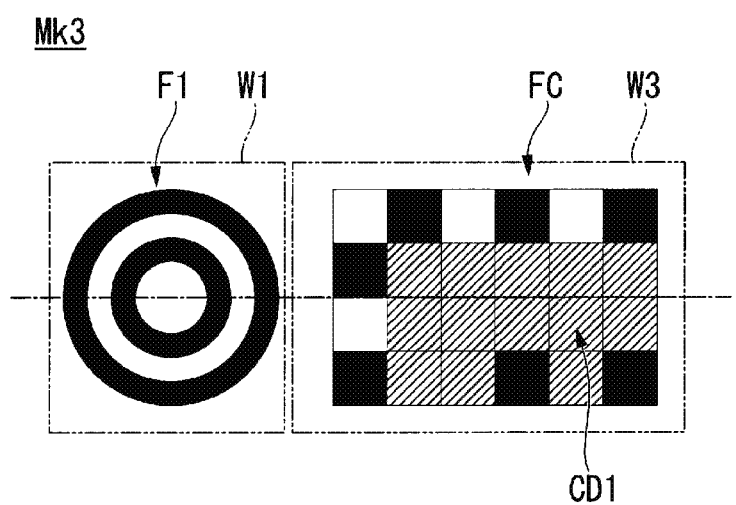
FIG. 20 is a diagram illustrating an example of a marker according to Modified Example 3 of the first embodiment.

FIG. 20 is a diagram illustrating an example of the marker according to Modified Example 3 of the first embodiment. As illustrated in FIG. 20, the marker Mk3 has only one code figure FC in the data area W3, differently from the marker Mk1. That is, the marker Mk3 has the same characteristics as the marker Mk1, except for the code figure included in the data area W3.

With Respect to Flow of Marker Detection Process According to Modified Example 3 of First Embodiment Hereinafter, the flow of the marker detection process according to Modified Example 3 of the first embodiment is described. In Modified Example 3 of the first embodiment, in the flow chart illustrated in FIG. 4, the image process portion 44 performs a process of Step S120c described below, instead of the process of Step S120.

Figure 21:
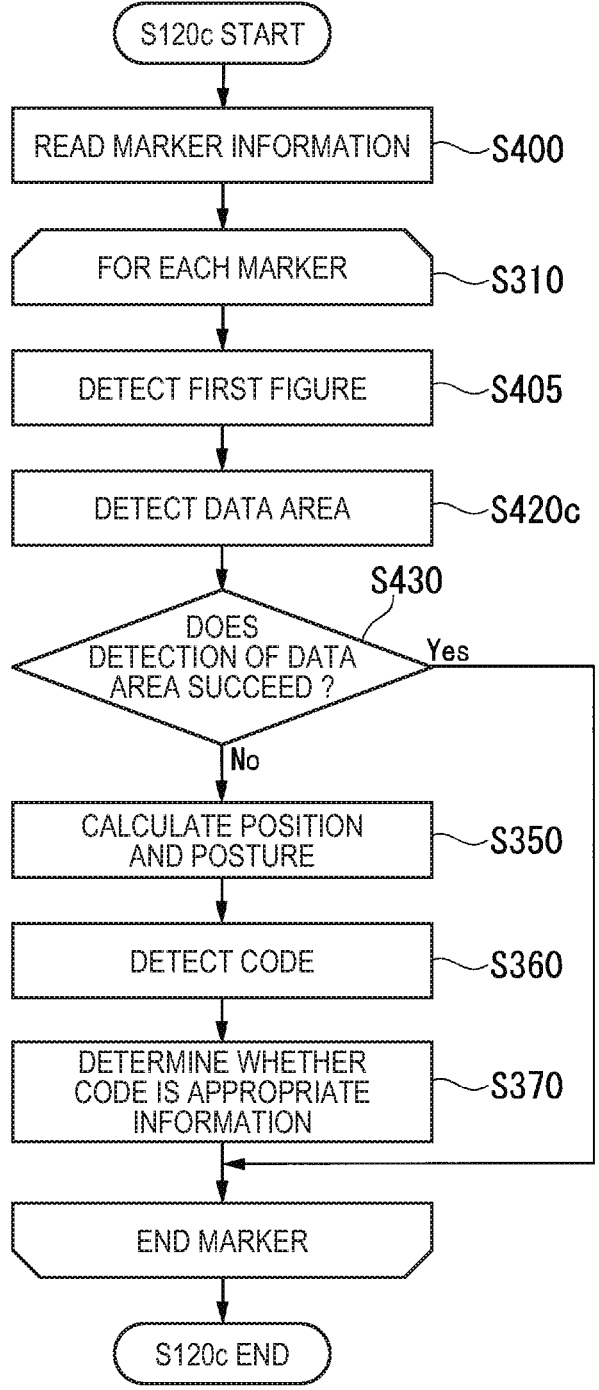
FIG. 21 is a flow chart illustrating an example of a flow of a marker detection process executed by the image process portion according to Modified Example 3 of the first embodiment.

FIG. 21 is a flow chart illustrating an example of the flow of the marker detection process executed by the image process portion 44 according to Modified Example 3 of the first embodiment. In FIG. 21, the process of Step S310, the processes of Steps S350 to S370, the process of Step S400, the process of Step S405, and the process of Step S430 are the same as the process of Step S310, the processes of Steps S350 to S370, the process of Step S400, the process of Step S405, and the process of Step S430 illustrated in FIG. 17, and thus descriptions thereof are omitted.

After the first figure F1 is detected in Step S405, the second detecting process portion 51 detects a data area that the marker Mk3 has, based on the first figure F1 (Step S420c). Here, the processes of Step S420c are described. First, the second detecting process portion 51 executes a process for searching (detecting) a portion of the code figure FC as a sign of illustrating the data area, in order to detect the data area that the marker Mk3 has, from the periphery of the first figure F1. In this example, the aforementioned sign is a portion of a fixed code that the code figure FC has. Instead of a portion of the fixed code, the aforementioned sign may be all of the fixed code or may be a portion of the code figure FC different from the fixed code.

Figure 22:
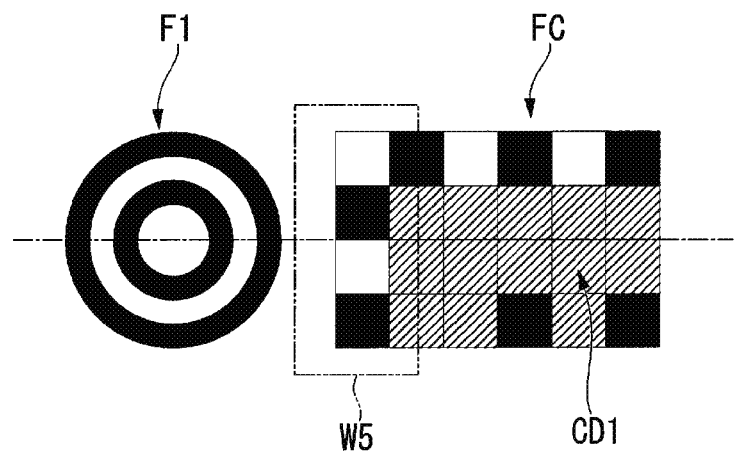
FIG. 22 is a diagram illustrating an example of a sign illustrating a data area for which a second detecting process portion searches a periphery of the first figure F1 in Step S420c.

In this example, the sign illustrating the data area is cells included in a column closest to the first figure F1 among the cells that configure the code figure FC and arranged in four rows and six columns, that is, four cells (a portion of the fixed code) on the first row and the first column, on the second row and the first column, on the third row and the first column, and on the fourth row and the first column among the cells included in the fixed code. FIG. 22 is a diagram illustrating an example of a sign illustrating a data area for which the second detecting process portion 51 searches a periphery of the first figure F1 in Step S420c. As illustrated in FIG. 22, the aforementioned sign is a portion of the fixed code included in a column closest to the first figure F1, that is, a column in an area W5 illustrated in FIG. 22, among cells that configure the code figure FC and arranged in four rows and six columns.

For example, in a case where the size of the first figure F1 detected in Step S405 is expanded by times of a predetermined value, the periphery of the first figure F1 searched by the second detecting process portion 51 is an area in a range included the expanded aforementioned size. The predetermined value is, for example, about 4 times. The predetermined value is a value corresponding to the first figure F1 detected from the captured image and may be another value, as long as the predetermined value is a value that can detect a sign (a portion of the fixed code) illustrating the data area in this example. When the aforementioned sign is detected, the second detecting process portion 51 detects the aforementioned sign by the method known in the related art of reading the model figure of a portion of the fixed code that becomes the aforementioned sign from the storage portion 32 in advance and detecting the aforementioned sign by pattern matching using the read aforementioned model figure.

After the sign illustrating the data area is detected, the second detecting process portion 51 performs a process for searching for (detecting) the entire fixed code that the code figure FC has, from the predetermined search range in a direction from the figure center F1C of the first figure F1 toward the aforementioned sign. In a case where the fixed code is detected from the aforementioned search range, the second detecting process portion 51 detects a figure including the detected fixed code as the code figure FC.

In this manner, in a case where the marker attached to the target object O is a marker having the same characteristics as the marker Mk3, the robot control device 30 can detect the position and the posture of the marker and the code illustrated by the code figure included in the data area that the marker has. Therefore, it is possible to obtain the same effect of the first embodiment.

Modified Example 4 of the First Embodiment

Hereinafter, Modified Example 4 according to the first embodiment according to the invention is described with reference to the drawings. The marker attached to the target object O described in the first embodiment may be a marker Mk4 described in this example, instead of the marker Mk, the marker Mk1, the marker Mk2, and the marker Mk3. That is, in Modified Example 4 according to the first embodiment, the robot control device 30 detects the marker Mk4, instead of the marker Mk, the marker Mk1, the marker Mk2, and the marker Mk3.

Details of Marker According to Modified Example 4 of First Embodiment

Figure 23:
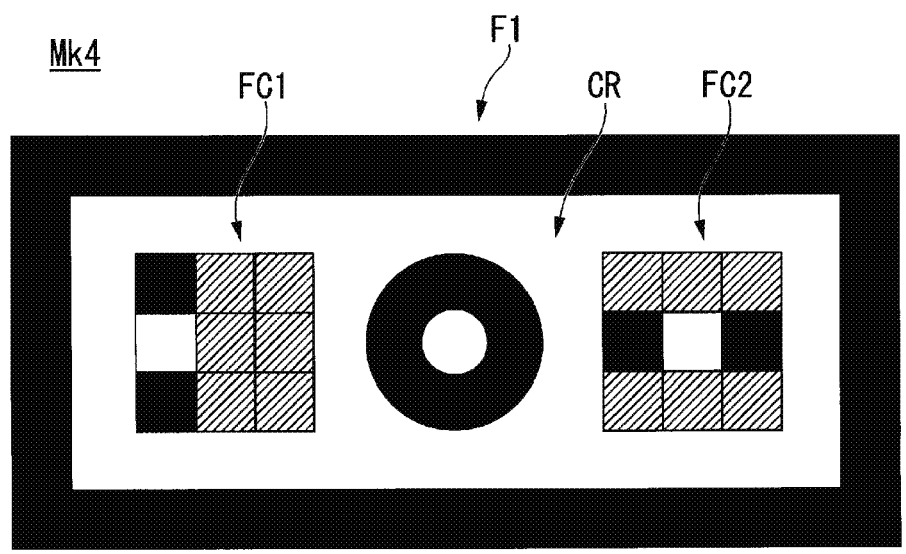
FIG. 23 is a diagram illustrating an example of a marker according to Modified Example 4 of the first embodiment.

FIG. 23 is a diagram illustrating an example of a marker according to Modified Example 4 of the first embodiment. As illustrated in FIG. 23, the marker Mk4 has the first figure F1 and a data area CR disposed in the first figure F1, differently from each of the marker Mk, the marker Mk1, the marker Mk2, and the marker Mk3. In the example illustrated in FIG. 23, the first figure F1 is a figure center marker in which multiplicity of the figure center is 4.

In the example illustrated in FIG. 23, the data area CR is an area on a white figure between a figure in a frame shape of a black square disposed on the most exterior side illustrated in FIG. 23 among the four figures configuring the first figure F1 and a figure in a black ring shape disposed on an inner side of the aforementioned figure illustrated in FIG. 23. Two code figures are disposed in the data area CR. In the example illustrated in FIG. 23, these code figures are two figures of a code figure FC1 and a code figure FC2.

Each of the code figure FC1 and the code figure FC2 is a two-dimensional code in which nine cells in a square shape are arranged in three rows and three columns. Therefore, each of the code figure FC1 and the code figure FC2 can indicate a code of nine bits by aforementioned colors (white and black) of respective cells arranged on three rows and three columns. The code figure FC1 and the code figure FC2 respectively have fixed codes which are different from each other. These fixed codes are signs for detecting the code figure FC1 and the code figure FC2, respectively. The robot control device 30 can detect and differentiate each of the code figure FC1 and the code figure FC2, based on the aforementioned fixed codes. The fixed code that the code figure FC1 has is three cells of a black cell on the first row and the first column, a white cell on the second row and the first column, and a black cell on the third row and the first column among the cells arranged on three rows and three columns, and the fixed code that the code figure FC2 has is three cells of a black cell on the second row and the first column, a white cell on the second row and the second column, and a black cell on the second row and the third column among the cells arranged on three rows and three columns. Instead of these, positions of the cells of the fixed codes that the code figure FC1 and the code figure FC2 respectively have may be other positions. Instead of these, the numbers of the cells of the fixed codes that the code figure FC1 and the code figure FC2 respectively have may be other numbers. In order to simplifying the drawing, in FIG. 23, the cells (cells indicating codes) other than the fixed codes respectively in the code figure FC1 and the code figure FC2 are illustrated to be hatched, and respective colors of the aforementioned cells are omitted.

With Respect to Flow of Marker Detection Process According to Modified Example 4 of First Embodiment Hereinafter, the flow of the marker detection process according to Modified Example 4 of the first embodiment is described. According to Modified Example 4 of the first embodiment, in the flow chart illustrated in FIG. 4, the image process portion 44 performs a process of Step S120$d$ described below, instead of the process of Step S120.

Figure 24:
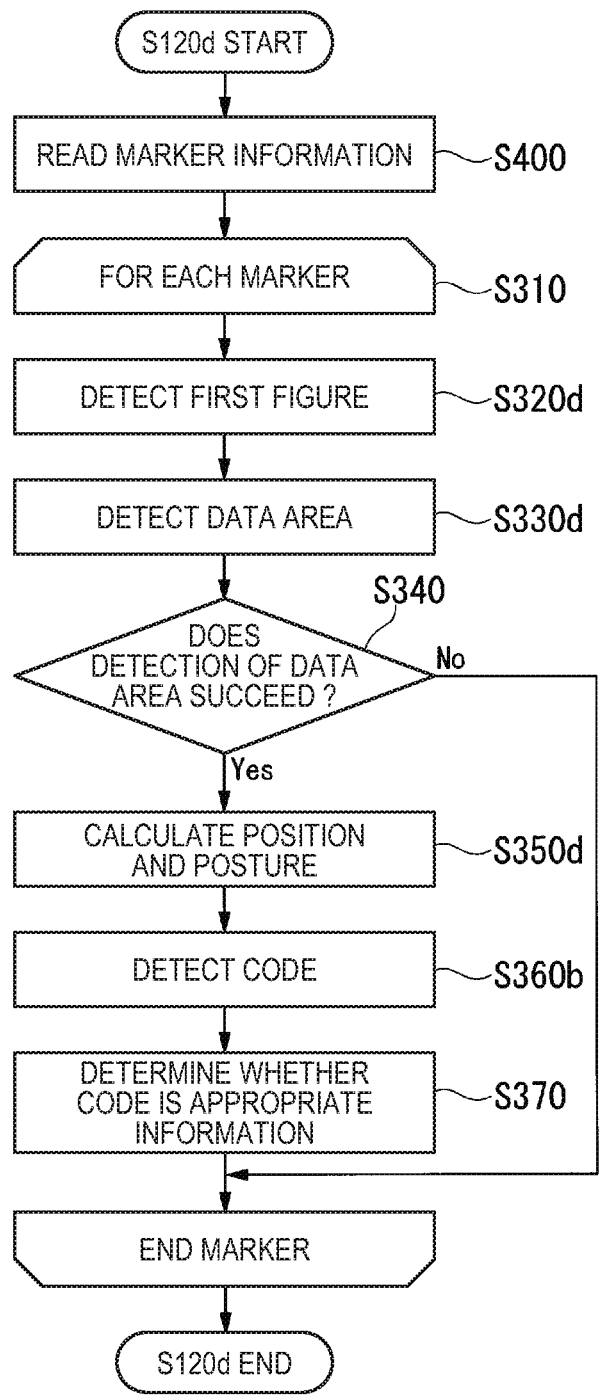
FIG. 24 is flow chart illustrating an example of a flow of a marker detection process that the image process portion executes, according to Modified Example 4 of the first embodiment.

FIG. 24 is flowchart illustrating an example of a flow of a marker detection process that the image process portion 44 executes, according to Modified Example 4 of the first embodiment. In FIG. 24, the process of Step S310, the process of Step S340, the process of Step S360$b$, the process of Step S370, and the process of Step S400 are the same processes as the process of Step S310, the process of Step S340, the process of Step S360$b$, and the process of Step S370 illustrated in FIG. 19 and the process of Step S400 illustrated in FIG. 16, and thus descriptions thereof are omitted.

After the marker Mk4 is selected as a target marker in Step S310, the first detecting process portion 50 extracts information illustrating the first figure F1 associated with the marker ID illustrating the marker Mk4, from marker information. The first detecting process portion 50 detects the first figure F1 from the captured image acquired by the image acquisition portion 42 in Step S110 illustrated in FIG. 4, based on information illustrating the extracted first figure F1 and the detection method of the figure center marker described above (Step S320$d$).

Here, the process of Step S320$d$ is described. The first detecting process portion 50 detects the figure center marker having multiplicity of 3 or greater from the captured image, as the first figure F1. Since not only the positions of the figure centers of the code figure FC1 and the code figure FC2 included in the data area but also the positions of the figure centers of the respective four figures that the first figure F1 configures do not belong to the predetermined range, the second detecting process portion 51 can ignore the code figure FC1 and the code figure FC2 when detecting the first figure F1. Since the multiplicity of a figure center of each of the code figure FC1 and the code figure FC2 is 1, the first detecting process portion 50 does not erroneously detect the code figure FC1 and the code figure FC2 as the first figure F1.

Subsequently, the second detecting process portion 51 detects each of the code figure FC1 and the code figure FC2 that the data area that the marker Mk4 has, that is, the aforementioned data area has, based on the first figure F1 detected in Step S320$d$ (Step S330$d$). Here, the process of Step S330$d$ is described. The second detecting process portion 51 searches an inner side of the first figure F1 detected in Step S320$d$ and detects the fixed code that the code figure FC1 has. The second detecting process portion 51 searches another code which is a code that the code figure FC1 has, from the figure center F1C of the first figure F1 in the direction of the aforementioned fixed code and which is different from the fixed code, and detects the entire code figure FC1. The second detecting process portion 51 searches the inner side of the first figure F1 detected in Step S320$d$ and detects the fixed code that the code figure FC2 has. The second detecting process portion 51 searches another code which is a code that the code figure FC2 has and that is different from the fixed code, from the figure center F1C of the first figure F1 in the direction of the aforementioned fixed code and detects the entire code figure FC2.

After it is determined that the detection of the data area in Step S340 succeeds, the position and posture calculating portion 52 calculates the position and the posture of the marker Mk4 based on the figure center F1C of the first figure F1 (Step S350$d$). Here, the process for calculating the posture of the marker Mk4 in the process of Step S350$d$ is described. In this example, the position and posture calculating portion 52 calculates the posture of the first figure F1 as the posture of the marker Mk4 (in this example, the posture of the target object O), by setting the normal direction with respect to the first figure F1 in the figure center F1C of the first figure F1 as an Z axis, a direction from the code figure FC2 detected from the inner side of the first figure F1 in Step S330$d$ toward the code figure FC1 as an X axis, and a direction intersecting to the aforementioned Z axis and the aforementioned X axis as an Y axis.

In this manner, even in a case where the marker attached to the target object O is a marker having the same characteristics as the marker Mk4, the robot control device 30 can detect the position and the posture of the marker and the code illustrated by the code figure included in the data area that the marker has. Therefore, the same effect as the first embodiment can be obtained.

In this example, the code detection portion 53 may have a configuration such as a configuration of integrating the sizes of the corresponding cells respectively in the code figure FC1 and the code figure FC2 and detecting the integrated values as codes.

With Respect to Correction of Distortion in First Embodiment and Modified Examples 1 to 3 of First Embodiment In the first embodiment and Modified Examples 1 to 3 of the first embodiment, there is a case where the first figure F1 detected by the first detecting process portion 50 from the captured image or each of the first figure F1 and the second figure F2 is distorted, that is, a case where the marker to be detected from the captured image may be distorted in the captured image.

For example, in a case where a surface of the marker Mk2 is captured by the aforementioned image capturing portion in a state of being inclined to an optical axis of the image capturing portion, the marker Mk2 is distorted in the captured image. That is, the surface of the marker Mk2 is captured to be oblique to the aforementioned optical axis. The surface of the marker Mk2 is a surface on a side on which the first figure F1 is drawn. There is a case where the captured image in which the marker Mk2 is captured in a distorted manner is corrected (converted) to an image in which the marker Mk2 is not distorted by affine transformation (affine warp).

For example, in a case where the marker Mk2 in the captured image described above is sufficiently smaller than the size of the entire captured image, the captured image in which the marker Mk2 is captured in a distorted manner can be corrected to an image in which the marker Mk2 is not approximately distorted by affine transformation. The captured image in which the marker Mk2 is captured in a distorted manner may be the entire captured image or may be a portion of the captured image including the marker Mk2. In this case, when the second detecting process portion 51 detects the data area that the marker Mk2 has, the captured image in which the marker Mk2 is captured in a distorted manner is corrected to an image in which the marker Mk2 is not distorted by affine transformation.

Figure 25:
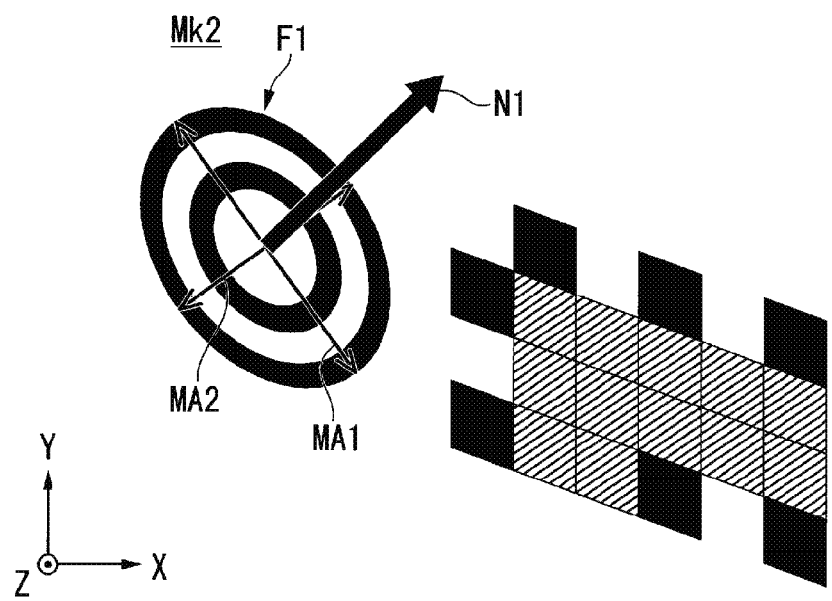
FIG. 25 is a diagram illustrating an example of a marker Mk2 that is distorted in a degree capable of being corrected by affine transformation in the captured image.

Here, the respective images of the first figure F1 and the second figure F2 that the marker Mk2 has which are distorted in a degree capable of being corrected by affine transformation has in the captured image do not have a circular shape but an elliptical shape. FIG. 25 is a diagram illustrating an example of the marker Mk2 that is distorted in a degree capable of being corrected by affine transformation in the captured image. In FIG. 25, the second figure F2 that the marker Mk2 has is omitted. In order to correct a captured image in which the marker Mk2 illustrated in FIG. 25 is captured in a distorted manner, the second detecting process portion 51 calculates respective directions of a major axis MA1 and a minor axis MA2 of the first figure F1 distorted from a circular shape to an elliptical shape in the captured image as main axis directions and calculates a ratio of lengths of the aforementioned major axis and the aforementioned minor axis as a main axis ratio. The first detecting process portion 50 calculates a normal direction N1 with respect to the first figure F1 in the figure center F1C of the first figure F1, based on the aforementioned main axis direction, the aforementioned main axis ratio, and geometry.

Figure 26:
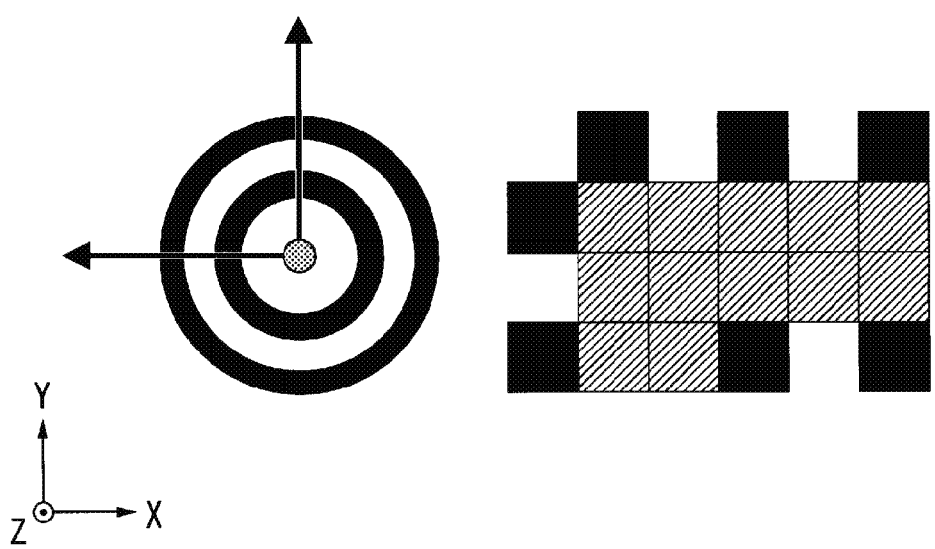
FIG. 26 is a diagram illustrating an example of a normal direction N1 of the marker Mk2 that is not distorted.

The normal direction N1 is a direction of the virtual three-dimensional space indicated by the position and the posture by the three-dimensional coordinate system illustrated in FIG. 25. In FIG. 25, the Z axis direction of the aforementioned three-dimensional coordinate system coincides with the direction in which the normal direction N1 extends in a case where the marker Mk2 is not distorted in the captured image. The second detecting process portion 51 performs affine transformation based on the normal direction N1 such that the normal direction N1 coincides with the Z axis direction of the aforementioned three-dimensional coordinate system as illustrated with FIG. 26 and causes the first figure F1 in the captured image in which the marker Mk2 is captured in a distorted manner to approximately coincide with a model image of the first figure F1 which is the information illustrating the first figure F1 in this example described above. FIG. 26 is a diagram illustrating an example of the normal direction N1 of the marker Mk2 that is not distorted. Accordingly, the aforementioned captured image is corrected to an image in which the marker Mk2 is not substantially distorted (not approximately distorted). As a result, the second detecting process portion 51 can detect a data area from the corrected aforementioned image accurately.

However, the captured image in which the marker Mk2 is captured in a distorted manner cannot be corrected by affine transformation in some cases. In this case, the second detecting process portion 51 performs homography conversion (homography warp) on the aforementioned captured image, instead of the affine transformation, and corrects the aforementioned captured image to an image in which the marker Mk2 is not distorted.

In this case, the second detecting process portion 51 calculates the normal direction N1 in the figure center F1C of the first figure F1, in the same manner as in the case of performing affine transformation described above. The second detecting process portion 51 detects a sign of the code figure FC and detects the entire code figure FC, as described in Step S330b in the flow chart illustrated in FIG. 19. The second detecting process portion 51 sets an initial value of homography conversion.

After the initial value of the homography conversion is set, the second detecting process portion 51 normalizes the aforementioned captured image, by performing bilinear interpolation process on the captured image in which the marker Mk2 is captured in a distorted manner. The second detecting process portion 51 derives a coefficient of homography conversion based on the normalized aforementioned captured image, a nonlinear optimization method (ESM), and the model image of the first figure F1 described above, such that a matching error between the first figure F1 in the captured image in which the marker Mk2 is captured in a distorted manner and the model image the first figure F1 which is the information illustrating the first figure F1 in this example described above becomes minimum. In a case where the aforementioned matching error is the predetermined error value or less, the second detecting process portion 51 determines that the image of the marker Mk2 that is not distorted is obtained. In a case where the aforementioned matching error is not the predetermined error value or less, the second detecting process portion 51 determines that the image of the marker Mk2 that is not distorted is not obtained and repeatedly performs processes from the bilinear interpolation process to the derivation of the coefficient of the homography conversion in which the matching error becomes minimum.

The code detection portion 53 can detect a code having high accuracy based on the code figure FC included in the data area that the marker Mk2 has, using an image which is obtained by such homography conversion and in which the marker Mk2 is not distorted.

In a case where homography conversion is performed on the captured image in which the marker Mk2 is captured in a distorted manner to an image in which the marker Mk2 is not distorted, a repetitive process using ESM is required compared with a case where the affine transformation is performed. Therefore, the time required by the marker Mk2 for detection becomes longer. Since the homography conversion has a small error when a distorted image is corrected to an image which is not distorted, compared with a case where affine transformation is performed, detection accuracy of the marker Mk2 increases. The affine transformation or the homography conversion is not limited to an application to the marker Mk2, and can be applied to any one of the marker Mk, the marker Mk1, and the marker Mk3.

Figure 27:
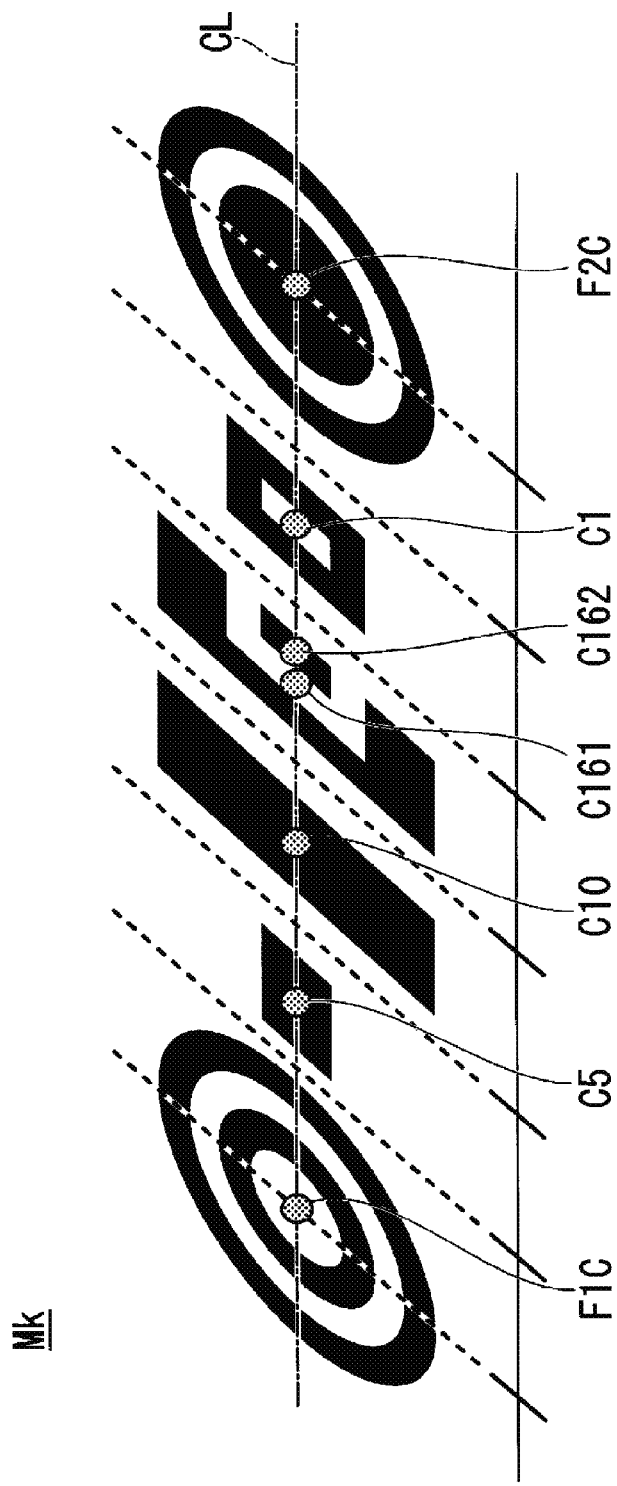
FIG. 27 is a diagram illustrating an example of the marker Mk in a captured image in a case where the marker Mk is captured in a distorted manner in a degree capable of being corrected by the affine transformation.

In a case where the detected marker is the marker Mk or the marker Mk1, even if the aforementioned marker in the captured image is distorted to a degree capable of being corrected by affine transformation, the second detecting process portion 51 can detect the data area that the aforementioned marker has, without using the affine transformation. FIG. 27 is a diagram illustrating an example of the marker Mk in the captured image in a case where the marker Mk is captured in a distorted manner in a degree capable of being corrected by the affine transformation.

As illustrated FIG. 27, even in a case where the marker Mk is captured in a distorted manner, respective figure centers (the figure center C5, the figure center C10, the figure center C161 and the figure center C162, and the figure center C1) of the four code figures that the marker Mk has are not deviated from the straight line CL passing through the figure center F1C of the first figure F1 and the figure center F2C of the second figure F2.

According to this, even in a case where the marker Mk in the captured image is distorted in a degree capable of being corrected by the affine transformation, the second detecting process portion 51 determines whether plural images included between the first figure F1 and the second figure F2 are each of the four code figures included in the data area of the marker Mk or not, according to the method illustrated in FIG. 14.

With Respect to Correction of Distortion According to Modified Example 4 of First Embodiment According to Modified Example 4 of the first embodiment described above, there is a case where the first figure F1 detected by the first detecting process portion 50 from the captured image is distorted, that is, a case where the marker detected from the captured image is distorted in the captured image.

For example, in a case where the surface of the marker Mk4 is captured by the aforementioned image capturing portion in a state of being inclined to the optical axis of the image capturing portion, the marker Mk4 is distorted in the captured image. That is, the surface of the marker Mk4 is captured in a manner of being oblique to the aforementioned optical axis. The surface of the marker Mk4 is a surface on which the first figure F1 is drawn. There is a case where the captured image in which the marker Mk4 is captured in a distorted manner is corrected (converted) to an image in which the marker Mk4 is not distorted by affine transformation (affine warp).

For example, in a case where the marker Mk4 in the captured image described above is sufficiently smaller than the size of the entire captured image, the captured image in which the marker Mk4 is captured in a distorted manner can be corrected to an image in which the marker Mk4 is approximately not distorted by affine transformation in the same manner as the captured image in which the marker Mk2 described above is captured in a distorted manner is corrected to an image in which the marker Mk2 is not distorted by the affine transformation. The captured image in which the marker Mk4 is captured in a distorted manner may be the entire captured image or may be a portion of the captured image including the marker Mk4. In this case, when the second detecting process portion 51 detects the data area that the marker Mk4 has, captured image in which the marker Mk4 is captured in a distorted manner is corrected to an image in which the marker Mk4 is not distorted ion by affine transformation.

However, in order to correct the captured image in which the marker Mk4 is captured in a distorted manner to the image in which the marker Mk4 is not distorted, there is a case where radon transform has to be further performed. Here, a flow of processes in which the second detecting process portion 51 performs radon transform is described. A process with respect to a case where the affine transformation is performed on the captured image in which the marker Mk4 is captured in a distorted manner is the same process as the process with respect to a case where affine transformation is performed on the captured image in which the marker Mk2 is captured in a distorted manner, and thus descriptions thereof are omitted.

After the image in which the marker Mk4 is not approximately distorted by affine transformation, the second detecting process portion 51 executes the detection of the peak indicating a degree (similarity) in which the aforementioned image and the model image of the first figure F1 described above coincide with each other. In a case where the aforementioned peak is not detected, the second detecting process portion 51 determines that it is difficult to correct the captured image in which the marker Mk4 is captured in a distorted manner to the image in which the marker Mk4 is not distorted and ends the process for correcting the distortion. In this case, the second detecting process portion 51 generates the information illustrating that detection of the marker Mk4 fails.

Meanwhile, in a case where the aforementioned peak is detected, the second detecting process portion 51 performs radon transform of the predetermined angle range in the direction from the code figure FC2 of the marker Mk4 toward the code figure FC1 based on the aforementioned peak and corrects the angle and the size (scale) such that a peak which is similarity between the image obtained by affine transformation in which the marker Mk4 is not approximately distorted and the model image of the first figure F1 described above becomes maximum. The second detecting process portion 51 performs radon transform of the predetermined angle range in the direction intersecting to the direction from the code figure FC2 of the marker Mk4 toward the code figure FC1 based on the aforementioned peak and performs the correction of the angle and the size (scale) such that a peak which is similarity between the image obtained by affine transformation in which the marker Mk4 is not approximately distorted and the model image of the first figure F1 described above becomes maximum.

The code detection portion 53 can detect the code with high accuracy based on the code figure FC1 and the code figure FC2 that are included in the data area that the marker Mk4 has, using an image that is obtained by such radon transform and in which the marker Mk4 is not distorted.

With Respect to Erroneous Correction of Code Illustrated by Code Figure

The code figure (the code figure FC, the code figure FC1 and the code figure FC2) that the marker (each of the marker Mk1 to the marker Mk4) according to Modified Examples 2 to 4 the first embodiment described above has may have a configuration of including a check bit or a humming code in addition to a fixed code. For example, among the information of 16 bits indicated by the aforementioned code figure, the code is illustrated by the information of 11 bits and the rest 5 bits are used for a humming code, such that an error of one bit can be corrected or an error of two bits can be detected. Here, the marker Mk3 and the marker Mk4 are described as an example. The content described below can be applied to the marker Mk2.

FIG. 28 is a table illustrating an example of information relating to the marker Mk3 and the marker Mk4. As illustrated in FIG. 28, the marker Mk3 is created, for example, in the size of 10 mm×28 mm, 7 mm×20 mm, or 5 mm×14 mm. The size of the marker Mk3 may be other sizes. In a case where the number of bits indicating the code of the code figure FC that the marker Mk3 has is set to be 12 bits without using a check bit, the number of bits that can correct an error is 0. Meanwhile, in a case where the number of bits indicating the code of the code figure FC that the aforementioned marker Mk3 has is set to be 11 bits using one check bit, the number of bits that can correct an error is 1.

As illustrated in FIG. 28, the marker Mk4 is created, for example, in the size of 10 mm×21 mm, 7 mm×15 mm, or 5 mm×11 mm. The size of the marker Mk4 may be other sizes. In a case where the number of bits indicating the codes of the code figure FC1 and the code figure FC2 that the marker Mk4 has is set to be 18 bits without using a check bit or a humming code, the number of bits that can correct an error is 0. Meanwhile, in a case where the number of bits indicating the codes of the code figure FC1 and the code figure FC2 that the aforementioned marker Mk4 has is set to be 16 bits using two check bits, the number of bits that can correct an error is 2. Meanwhile, in a case where the number of bits indicating the codes of the code figure FC1 and the code figure FC2 that the aforementioned marker Mk4 has is set to be the code figure FC1 and the code figure FC2 is set to be 11 bits using humming codes of 5 bits, the number of bits that can correct an error is 7.

As described above, the robot control device 30 (or an image processing device independent from the robot control device 30) of the robot 20 according to first embodiment detects the first figure (in this example, the first figure F1) and detects a data area based on the figure center (in this example, the figure center F1C) of the aforementioned first figure. Accordingly, the robot control device 30 can suppress the failure of the detection of the marker by an external factor with respect to the marker (for example, each of the marker Mk, and the marker Mk1 to the marker Mk4 according to the first embodiment).

The robot control device 30 detects the data area based on the direction (in this example, search direction) that pass though the figure center of the first figure. According to this, the robot control device 30 can perform a process based on the information indicated by the data area.

The robot control device 30 changes a direction for passing through the figure center the aforementioned first figure with the figure center of the first figure, as a center, and detects the data area. Accordingly, even in a case where the first figure does not illustrate the direction for passing through the figure center of the aforementioned first figure, the robot control device 30 can detect the data area.

The robot control device 30 detects the first figure and detects the data area that has the figure (in this example, the figure FD1 to the figure FD16, the code figure FC, the code figure FC1, and the code figure FC2) in which the number of overlapped figure centers is smaller than the aforementioned first figure. Accordingly, the robot control device 30 suppresses a figure that the data area has from being erroneously detected as the first figure.

The robot control device 30 detects the first figure and the second figure (in this example, the second figure F2) and detects the data area based on the figure center of the aforementioned first figure and the figure center of the aforementioned second figure (in this example, the figure center F2C). Accordingly, the robot control device 30 can more reliably detect the data area, based on the direction for passing through the figure center of the first figure.

The robot control device 30 detects the data area based on the direction in which the figure center of the first figure and the figure center of the second figure are connected to each other. Accordingly, the robot control device 30 can more quickly detect the data area, based on the direction in which the figure center of the first figure and the figure center of the second figure are connected to each other.

The marker (for example, each of the marker Mk and the marker Mk1 to the marker Mk4) according to the first embodiment causes the first figure to be detected and causes the data area to be detected based on the figure center of the aforementioned first figure. Accordingly, the marker can suppress the failure of the detection of the marker by the external factor with respect to the marker.

The marker causes the first figure and the second figure to be detected and causes the data area to be detected based on the figure center of the aforementioned first figure and the figure center of the aforementioned second figure. Accordingly, the marker can more reliably cause the data area to be detected.

The image process portion 44 in the control portion 36 may be independent from the robot control device 30 as the image processing device. In this case, the robot 20, the robot control device 30, and the aforementioned image processing device configure the robot system. In this case, the image processing device may have a configuration of outputting the information based on the detected marker to another device different from the robot control device 30 and displaying the aforementioned information to the aforementioned another device, such as the augmented reality (AR). The information based on the detected marker is, for example, information associated with the aforementioned marker.

The data area that the robot control device 30 detects and the marker (the marker Mk or each of the marker Mk1 to the marker Mk4) has may have a configuration of including other markers such as a color marker, a barcode, a QR code (Registered trademark) as the code figure.

A portion or all of the first image capturing portion 21, the second image capturing portion 22, the third image capturing portion 23, and the fourth image capturing portion 24 may be image capturing portions independent from the robot 20. In this case, the robot 20, the image capturing portions independent from the robot 20, the robot control device 30, and the image processing device configure the robot system.

Second Embodiment

Hereinafter, a second embodiment is described with reference to drawings. According to the present embodiment, differences from the first embodiment are mainly described, the same components are denoted by the same reference numerals, and descriptions thereof may be omitted or simplified.

Figure 29:
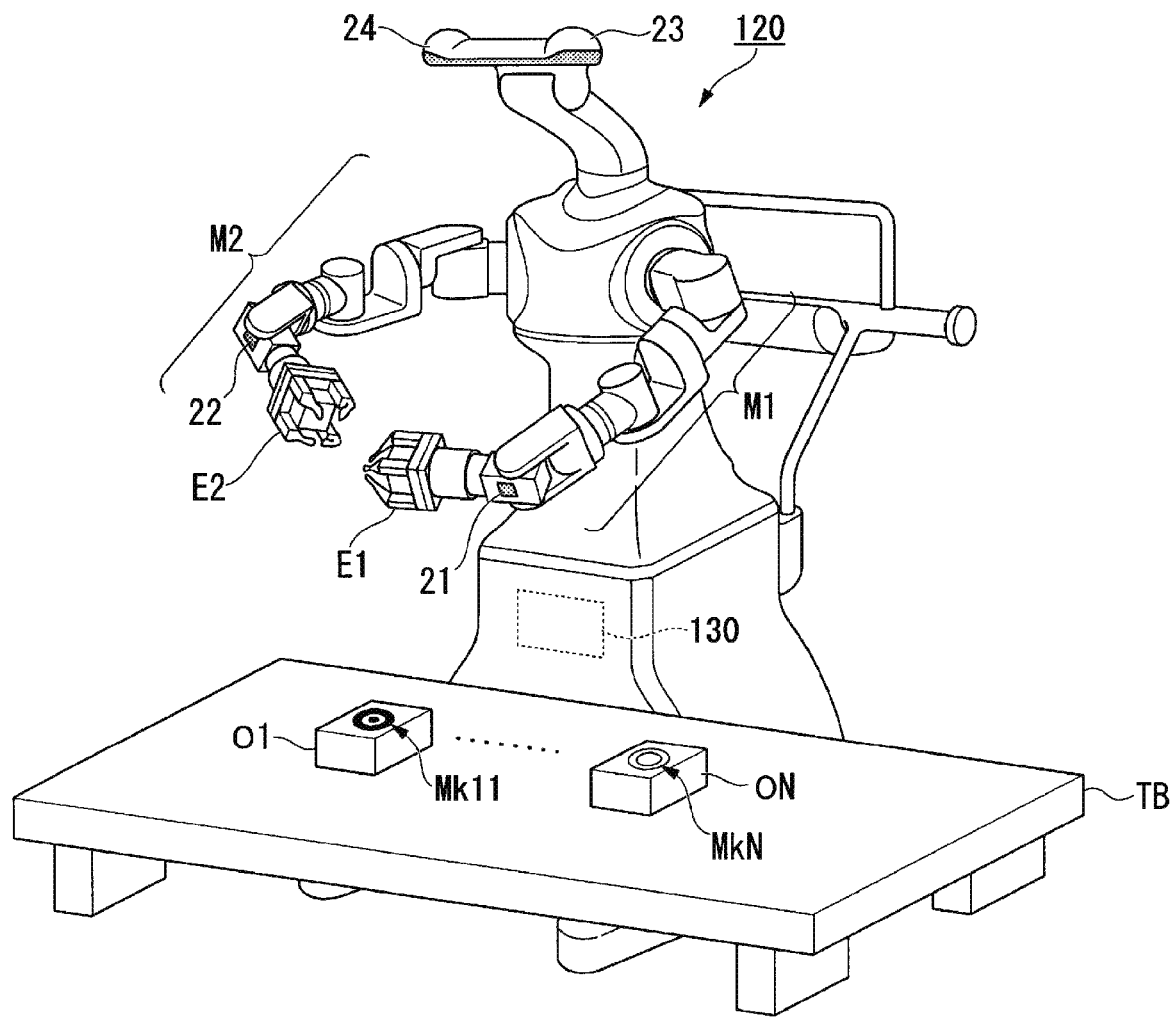
FIG. 29 is a configuration diagram illustrating an example of a robot according to the second embodiment.

FIG. 29 is a configuration diagram illustrating an example of a robot 120 according to the second embodiment.

Configuration of Robot 120

First, a configuration of the robot 120 is described.

The robot 120 is a double arm robot including a first arm, a second arm, a support supporting the first arm and the second arm, and a robot control device 130. The double arm robot is a robot including two arms such as a first arm and a second arm in this example. The robot 120 is a single arm robot, instead of a double arm robot. The single arm robot is a robot including one arm. For example, the single arm robot includes any one of a first arm and a second arm. The robot 120 may be a duplex arm robot including three or more arms, instead of a double arm robot.

The first arm includes the first end effector E1 and the first manipulator M1. The first arm according to the present embodiment is the same as that according to the first embodiment, and thus descriptions thereof are omitted.

The first end effector E1 is communicably connected to the robot control device 130 via cables. Accordingly, the first end effector E1 performs an operation based on a control signal acquired from the robot control device 130. For example, cable communication via cables is performed by standards such as Ethernet (Registered trademark) or universal serial bus (USB). The first end effector E1 may have a configuration connected to the robot control device 130 via wireless communication performed by communication standard such as Wi-Fi (Registered trademark).

The seven actuators (included in the joints) included in the first manipulator M1 are respectively communicably connected to the robot control device 130 via cables. Accordingly, the aforementioned actuators operates the first manipulator M1 based on a control signal acquired from the robot control device 130. The cable communication via the cables is performed, for example, by standards such as Ethernet (Registered trademark) or USB. A portion or all of the seven actuators included in the first manipulator M1 may have a configuration of being connected to the robot control device 130 via wireless communication performed by communication standard such as Wi-Fi (Registered trademark).

The first image capturing portion 21 is the same as that according to the first embodiment, and thus descriptions thereof are omitted.

The first image capturing portion 21 is communicably connected to the robot control device 130 via cables. The cable communication via the cables is performed, for example, by standards such as Ethernet (Registered trademark) or USB. The first image capturing portion 21 may have a configuration of being connected to the robot control device 130 by wireless communication performed by communication standards such as Wi-Fi (Registered trademark).

The second arm includes the second end effector E2 and the second manipulator M2. The second arm according to the present embodiment is the same as that according to the first embodiment, and thus descriptions thereof are omitted.

The second end effector E2 is communicably connected to the robot control device 130 via the cables. Accordingly, the second end effector E2 performs an operation based on a control signal acquired from the robot control device 130. The cable communication via the cables is performed, for example, by standard such as Ethernet (Registered trademark) or USB. The second end effector E2 may have a configuration of being connected to the robot control device 130 by wireless communication performed by communication standard such as Wi-Fi (Registered trademark).

The seven actuators (included in the joints) included in the second manipulator M2 are respectively communicably connected to the robot control device 130 via cables. Accordingly, the aforementioned actuators operates the second manipulator M2 based on a control signal acquired from the robot control device 130. The cable communication via the cables is performed, for example, by standards such as Ethernet (Registered trademark) or USB. A portion or all of the seven actuators included in the second manipulator M2 may have a configuration of being connected to the robot control device 130 via wireless communication performed by communication standard such as Wi-Fi (Registered trademark).

The second image capturing portion 22 is the same as that according to the first embodiment, and thus descriptions thereof are omitted.

The second image capturing portion 22 is communicably connected to the robot control device 130 via cables. The cable communication via the cables is performed, for example, by standards such as Ethernet (Registered trademark) or USB. The second image capturing portion 22 may have a configuration of being connected to the robot control device 130 by wireless communication performed by communication standards such as Wi-Fi (Registered trademark).

The robot 120 includes a third image capturing portion 23 and a fourth image capturing portion 24. The third image capturing portion 23 and the fourth image capturing portion 24 according to the present embodiment are the same as those according to the first embodiment, and thus descriptions thereof are omitted.

The third image capturing portion 23 is communicably connected to the robot control device 130 via the cables. The cable communication via the cables is performed, for example, by standards such as Ethernet (Registered trademark) or USB. The third image capturing portion 23 may have a configuration of being connected to the robot control device 130 by wireless communication performed by communication standards such as Wi-Fi (Registered trademark).

The fourth image capturing portion 24 is communicably connected to the robot control device 130 via the cables. The cable communication via the cables is performed, for example, by standards such as Ethernet (Registered trademark) or USB. The fourth image capturing portion 24 may have a configuration of being connected to the robot control device 130 by wireless communication performed by communication standards such as Wi-Fi (Registered trademark).

The respective functional portions that the robot 120 include, for example, acquires control signals from the robot control device 130 built in the robot 120. The aforementioned respective functional portions perform operations based on the acquired control signals. The robot 120 may have a configuration of being controlled the robot control device 130 installed on an external portion, instead of the configuration in which the robot control device 130 is built. In this case, the robot 120 and the robot control device 130 configure a robot system. The robot 120 may have a configuration of not including at least a portion of the first image capturing portion 21, the second image capturing portion 22, the third image capturing portion 23, or the fourth image capturing portion 24.

The robot control device 130 operates the robot 120 by transmitting a control signal to the robot 120. Accordingly, the robot control device 130 causes the robot 120 to perform a predetermined work.

Overview of Predetermined Work Performed by the Robot 120

Hereinafter, an overview of the predetermined work performed by the robot 120 is described.

In this example, the robot 120 grips an object disposed a work area which is an area in which a work can be performed by both of the first arm and the second arm and performs a work of supplying (disposing) the gripped object to a material supplying area (not illustrated), as a predetermined work. The robot 120 may have a configuration of performing other works instead of this, as the predetermined work. The work area may be an area in which a work can be performed by any one of the first arm and the second arm.

In this example illustrated in FIG. 29, the work area is an area including an upper surface of a workbench TB. The workbench TB is, for example, a table. The workbench TB may be another object such as a floor or a shelf, instead of the table. Target objects O1 to ON which are N target objects are disposed as the object that the robot 120 grips, on an upper surface of the workbench TB. N is an integer of 1 or greater.

Each of the target objects O1 to ON is an industrial component or an industrial member such as a plate, a screw, or a bolt mounted in a product. In FIG. 29, in order to simplify drawings, the target objects O1 to ON are illustrated as objects in a rectangular shape. The target objects O1 to ON may be other objects such as a commodity or an organism instead of an industrial component or an industrial member. The respective shapes of the target objects O1 to ON may be other shapes instead of the rectangular shape. A portion or all of respective shapes of the target objects O1 to ON may be identical to each other or may be different from each other.

Overview of Process Performed by the Robot Control Device 130

Hereinafter, an overview of a process performed by the robot control device 130 is described, in order to cause the robot 120 to perform a predetermined work.

The robot control device 130 causes the robot 120 to capture a range including a work area as a capture range. The robot control device 130 acquires captured images that the robot 120 capture. The robot control device 130 detects a marker attached in the work area based on the acquired captured images. The robot control device 130 causes the robot 120 to perform a predetermined work according to the detected marker.

In this example, the marker attached in the work area is attached to each of the target objects O1 to ON disposed on the upper surface of the workbench TB in the work area. Instead of this, a portion or all of the marker attached to the work area may have a configuration of being attached to other objects of the target objects O1 to ON in the work area, the upper surface of the workbench TB, or the like.

The target objects O1 to ON are attached respectively to markers different from each other. These markers respectively illustrate positions of the target objects O1 to the ON in the robot coordinate system. For example, the marker Mk11 attached to the target object O1 illustrates a position of the target object O1 in the robot coordinate system. A marker MkN attached to the target object ON illustrates a position of the target object ON in the robot coordinate system. A portion or all of the markers attached to the target objects O1 to ON are the same marker. Respective markers may have a configuration of illustrating other information such as a configuration of illustrating an operation of the robot 120, instead of the configuration of illustrating the positions of the target objects O1 to ON in the robot coordinate system.

The robot control device 130 in this example causes the third image capturing portion 23 and the fourth image capturing portion 24 to stereoscopically capture the capture range. The robot control device 130 acquires captured images that the third image capturing portion 23 and the fourth image capturing portion 24 stereoscopically capture. The robot control device 130 detects each of the markers Mk11 to MkN, which are N markers based on the acquired captured images.

The robot control device 130 can detect markers (for example, each of the markers Mk11 to MkN) by plural marker detection methods and detects markers by one marker detection method among the plural aforementioned marker detection methods. The marker detection method is a detection method of the marker.

Specifically, when each of the markers Mk11 to MkN is detected, the robot control device 130 detects each of the markers Mk11 to MkN by the marker detection method associated with each of the markers Mk11 to MkN. More specifically, the robot control device 130 detects each of the markers Mk11 to MkN by the marker detection method associated with each of the markers Mk11 to MkN, based on the corresponding information including the information in which the information illustrating each of the markers Mk11 to MkN and the marker detection method are associated with each other. Accordingly, the robot control device 130 can make the improvement in the detection accuracy of the marker and shortening of the detection time of the marker be compatible with each other.

According to the present embodiment, the process in which the robot control device 130 detects each of the markers Mk11 to MkN by the marker detection method associated with each of the markers Mk11 to MkN is described. According to the present embodiment, a process in which the robot control device 130 generates the corresponding information and a process in which the robot control device 130 edits the corresponding information are described. According to the present embodiment, a method in which a user or the robot control device 130 causes the marker detection method to associated with each of the markers Mk11 to MkN is described.

The robot control device 130 detects each of the markers Mk11 to MkN and calculates positions of each of the detected markers Mk11 to MkN illustrate in the robot coordinate system. The robot control device 130 causes the robot 120 to grip each of the target objects O1 to ON one by one, based on the calculated positions and supplies the target objects O1 to ON to the material supplying area (not illustrated). In this example, the robot control device 130 causes the first arm to grip the target objects O1 to ON one by one and supplies the target objects O1 to ON to the material supplying area (not illustrated). Instead of this, the robot control device 130 may have a configuration of causing the second arm to grip each of the target objects O1 to ON one by one or may have another configuration such as a configuration of causing both of the first arm and the second arm to grip each of the target objects O1 to ON one by one.

Overview of Marker Detection Method Associated with Each of Markers

In this example, the marker detection method associated with each of the markers Mk11 to MkN include three detection methods of a first detection method, a second detection method, a third detection method. Hereinafter, these three detection methods are described. The marker detection method may have a configuration of including another detection method such as a method in which a portion or all of these three detection methods are combined instead of a portion or all of the three detection methods or may have a configuration of including a portion or all of these three detection methods are combined in addition to these three detection method.

First, processes that the robot control device 130 performs commonly to each of the three detection method of the first to third detection methods are described. In this example, in these three detection methods, when the marker is detected from the captured image, the robot control device 130 converts the captured image into a grayscale image (grayscale process). The robot control device 130 converts the captured image into a 256 gradation grayscale image, for example, in the grayscale process of the captured image. The robot control device 130 may have a configuration of converting the captured image into another gradation grayscale image, instead of the configuration of converting the captured image into a 256 gradation grayscale image.

The robot control device 130 converts a grayscale image obtained by converting the captured image in the grayscale process, into a binarized image (monochrome image) (binarization process). The binarization process is a process for converting a color of a pixel having luminance of a predetermined threshold value (binarized threshold value) or greater on a grayscale image into white and converting a grayscale image into a binarized image by converting a pixel having luminance of less than the aforementioned threshold value into black. In this example, a binarized threshold value is luminance that is determined (selected) for each marker detected by the robot control device 130 and is luminance indicated by any one integer determined (selected) in the range from 0 to 255. The robot control device 130 detects a marker from the binarized image obtained by converting the grayscale image by the binarization process. That is, the binarized threshold value corresponds to the threshold value for detecting a marker from the captured image. When the marker is detected from the binarized image, the robot control device 130 detects the marker from the captured image by pattern matching based on the model image of the marker. The model image of the marker is, for example, a computer aided design (CAD) image. Since the marker detection method by pattern matching uses a method known in the related art, descriptions thereof are omitted. The robot control device 130 may have a configuration of detecting a marker from the captured image by another method. The model image of the marker may be another image of the captured image obtained by capturing a marker in a desired posture.

The robot control device 130 may have a configuration of converting the captured image into a binarized image without performing a grayscale process, instead of a configuration of converting the grayscale image into a binarized image. In this case, the robot control device 130 converts the captured image into a binarized image by converting a color of a pixel in a predetermined hue on the captured image into white and converting a pixel in a hue different from the aforementioned hue into black. The predetermined hue is an example of the binarized threshold value different from the luminance and is indicated by a combination of six hexadecimal numbers indicating red green blue (RGB) colors, (for example, FF0000 in a case of indicating red, 00FF00 in a case of indicating green, and 0000FF in a case of indicating blue). In the predetermined hue, an allowable range is set. For example, in a case where an allowable range of 00FF00 to 55FF55 is set for 00FF00 indicating green, the robot control device 130 determines that all the colors included in the range of 00FF00 to 55FF55 are green, which is the color indicated by 00FF00. In other words, such an allowable range is an error range in which combination of six digits of hexadecimal numbers indicating the aforementioned hue is caused to be a central value. The robot control device 130 detects the hue indicated by a combination of six digits of hexadecimal numbers included in the allowable range as the same hue. The predetermined hue is an example of a threshold value for determining a color of an image.

In this manner, commonly to the respective three detection methods of the first to third detection methods, the robot control device 130 converts the captured image into the binarized image and detects the marker from the converted binarized image based on the binarized threshold value.

Subsequently, differences of the respective first to third detection methods are described. In the respective first to third detection methods, methods for determining the binarized threshold values are different.

According to the first detection method, the robot control device 130 detects the marker by changing the binarized threshold value (that is, the threshold value for detecting the marker from the captured image) in a predetermined range. The predetermined range is a range corresponding to gradation of a grayscale image and is a range from 0 to 255 in this example. Therefore, the robot control device 130 changes the binarized threshold value 256 steps from 0 to 255 and detects a marker. Instead of this, the predetermined range may be a portion of the range in the range of 0 to 255.

Specifically, according to the first detection method, while changing the binarized threshold value from 0 to 255, one by one, the robot control device 130 determines (searches) the binarized threshold value appropriate for detecting a target marker which is marker (in this example, a marker selected by the robot control device 130 from any one of the markers Mk11 to MkN) of a target to be detected. The robot control device 130 converts the grayscale image into a binarized image using the determined binarized threshold value and detects the target marker from the converted binarized image. In this example, the binarized threshold value appropriate for detecting the target marker is a value (luminance) that realizes a binarization process for converting the captured image to a binarized image that can detect a target marker from the captured image including the target marker.

According to the second detection method, the robot control device 130 detects the target marker using a value (luminance) obtained by maximum likelihood estimation as a binarized threshold value (that is, threshold value for detecting a marker from a captured image). In this example, the robot control device 130 employs an Otsu's method as a method for obtaining a binarized threshold value according to the second detection method. Here, an overview of the Otsu's method is described. According to the Otsu's method, it is assumed that a histogram indicating a frequency of the luminance expressed in each pixel of the captured image has two peaks. It is assumed that the luminance included in one peak of the two peaks is luminance of respective pixels included in a first partial area (for example, partial area including target marker) which is a partial area in the captured image, and the luminance included in one remaining peak is luminance of each pixel included in a second partial area (for example, partial area that includes background without including target marker) which is different from the first partial area which is a partial area in the captured image.

According to the Otsu's method, under these assumptions, the robot control device 130 determines luminance in which a ratio of dispersion of the luminance in the first partial area and dispersion of the luminance in the second partial area becomes minimum, that is, luminance in which a degree of separation between the first partial area and the second partial area becomes maximum, based on maximum likelihood estimation as the binarized threshold value. The robot control device 130 converts the grayscale image into the binarized image using the determined binarized threshold value and detects the target marker from the converted binarized image.

According to the third detection method, the robot control device 130 detects a marker using a predetermined value (luminance) as the binarized threshold value. Specifically, the robot control device 130 converts the grayscale image into the binarized image using the predetermined value as the binarized threshold value and detects the target marker to be detected from the converted binarized image. In this example, the predetermined value as the binarized threshold value according to the third detection method is a value obtained by determining a binarized threshold value in advance, appropriate for detecting a target marker, while changing the binarized threshold value from 0 to 255 one by one. The aforementioned predetermined value may be a value determined in advance, by another method.

Here, accuracy in a case where the robot control device 130 detects the target marker from the captured image by the respective first to third detection methods is described. The detection accuracy which is accuracy in which the robot control device 130 detects the target marker from the captured image changes according to the luminance selected as the binarized threshold value. The height of the detection accuracy in this example is indicated by height of probability in which the detection of the target marker from the aforementioned captured image succeeds. Specifically, for example, in a case where luminance appropriate for detecting the target marker is not selected but luminance that is not appropriate for detecting the target marker is selected, as the binarized threshold value, frequency at which the robot control device 130 can detect the target marker from the captured image becomes low, that is, accuracy in which the robot control device 130 detects the target marker becomes low.

Since the first detection method searches the binarized threshold value appropriate for detecting the target marker while changing the binarized threshold value from 0 to 255, the detection time that is time required for detecting the target marker becomes longer than that of the second and third detection methods, but detection accuracy of the target marker is higher than that of the second and third detection methods. The accuracy in which the robot control device 130 detects the target marker from the captured image by the third detection method tends to be lower than that of the first detection method, since there is a case where an image capturing condition of the captured image changes. However, the accuracy is higher than that of the second detection method. The time in which the robot control device 130 detects the target marker from the captured image by the third detection method is shorter than that of the first and second detection methods, since the process for determining the binarized threshold value is not performed. The accuracy in which the robot control device 130 detects the target marker from the captured image by the second detection method is lower than that of the first and third detection methods, but detection time of the target marker is shorter than that of the first detection method and longer than that of the third detection method.

Since the robot control device 130 detects the target marker while combining three detection methods of the first to third detection methods, the improvement in the detection accuracy of the marker and shortening of the detection time of the marker can be compatible with each other. In a case where the robot control device 130 cannot detect the target marker, for example, by the third detection method, it is possible to execute the detection of the target marker by the second detection method. In a case where the marker of the target to be detected cannot be detected by the second detection method, the aforementioned marker can be detected by the first detection method.

Details of Marker

Hereinafter, details of the marker that the robot control device 130 detects from the captured image are described. The marker (that is, each of the markers Mk11 to MkN) is the figure center marker. Here, the figure center marker is described with reference to FIGS. 30 to 35.

The figure center of the figure center marker is the same as the figure center of the figure according to the first embodiment, and thus descriptions thereof are omitted.

The figure center marker is a marker configured with a combination of three or more figures. The figure center of each of the aforementioned three or more figures that configure the figure center marker belongs to (is included in) the predetermined range. For example, with respect to the figure center marker configured with a combination of the figure A0, the figure B0, and the figure C0, the figure center A1 of the figure A0, the figure center B1 of the figure B0, and the figure center C1 of the figure C0 belong to (are included in) the predetermined range. For example, the predetermined range is a circular range having a radius of about several pixels. However, the predetermined range may be a circular range having a radius of less than one pixel, may be a circular range having a radius of several pixels or more, or may be a range having an other shape different from a circle such as a rectangle.

Figure 30:
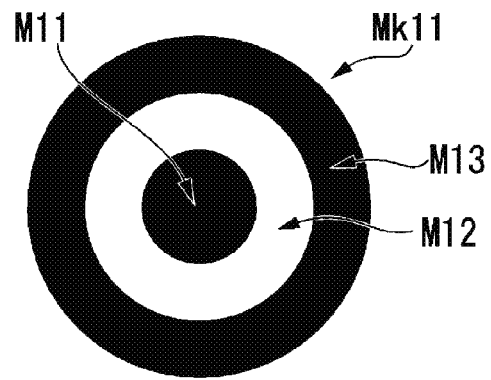
FIG. 30 is a diagram illustrating an example of the figure center marker.
Figure 31:
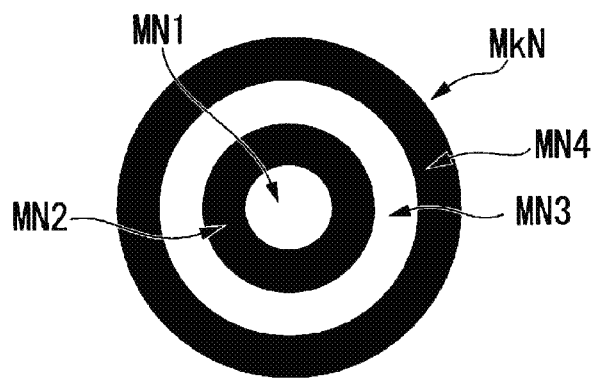
FIG. 31 is a diagram illustrating another example of the figure center marker.

FIG. 30 is a diagram illustrating an example of the figure center marker. The marker Mk11 illustrated in FIG. 30 is a figure center marker attached to the target object O1 illustrated in FIG. 29. As illustrated in FIG. 31, the three or more figures that configure the figure center marker are detected as partial areas of only white or black, in the binarized image. The marker Mk11 is configured with three figures of a figure M11 in which an outline is indicated by a black partial area in a circular shape, a figure M12 in which an outline is indicated by a white partial area in a ring shape, and a figure M13 is indicated by a black partial area in a ring shape. The marker Mk11 is formed such that the respective figure centers of the figure M11, the figure M12, and the figure M13 belong to the predetermined range. Therefore, the marker Mk11 configured with a combination of the figure M11, the figure M12, and the figure M13 is a figure center marker. The figures M11 to M13 in the marker Mk11 are concentric circles, and the figure centers are positioned in the center of the aforementioned concentric circles.

FIG. 31 is a diagram illustrating another example of the figure center marker. The marker MkN illustrated in FIG. 31 is a figure center marker attached to the target object ON illustrated in FIG. 29. The marker MkN is configured with four figures of a figure MN1 in which an outline is indicated by a white partial area in a circular shape, a figure MN2 in which an outline is indicated by a black partial area in a ring shape, a figure MN3 in which an outline is indicated by a white partial area in a ring shape, and a figure MN4 in which an outline is indicated by a black partial area in a ring shape. The marker MkN is formed such that the respective figure centers of the figure MN1, the figure MN2, the figure MN3, and the figure MN4 belong to the predetermined range. Therefore, the marker MkN configured with a combination of the figure MN1, the figure MN2, the figure MN3, and the figure MN4 is a figure center marker. The figures MN1 to MN4 in the marker MkN are concentric circles, and the figure centers are positioned in the center of the aforementioned concentric circles.

In the markers Mk11 and MkN illustrated in FIGS. 30 and 31, a combination of three or more figures that configure the figure center marker configure the concentric circles. However, in the figure center marker, a combination of three or more figures that configure the figure center marker configures the concentric circle, but does not limited thereto. The markers may be a case where a combination of three or more figures that configures figure center marker illustrated in FIGS. 9 to 11 does not configure a concentric circle, in the same manner as in the first embodiment.

In this example, a position of the object (for example, each of the target objects O1 to ON illustrated in FIG. 29) to which these figure center marker are attached is indicated by the position of the figure center of the aforementioned figure center marker. The position of the figure center of the aforementioned figure center marker is indicated by a vector (average of three or more vectors) obtained by dividing the sum of the vectors illustrating the positions of the three or more figure centers included in the predetermined range by the number of figure centers. Instead of this, the position of the object to which the aforementioned figure center marker is attached may have a configuration of being indicated by another position associated with the position of the figure center of the aforementioned figure center marker. The robot control device 130 according to the present embodiment detects each of the markers Mk11 to MkN that are figure center markers illustrated in FIGS. 9 to 11, 30, and 31 from the captured image and calculates a position of a figure center of each of the detected markers Mk11 to MkN as a position of each of the target objects O1 to ON.

Instead of these figure center markers, the marker that the robot control device 130 detects may be another marker such as a color marker, a barcode, or a QR code (Registered trademark).

Relationship with Binarized Threshold Value and Accuracy in which the Robot Control Device 130 Detects Marker Hereinafter, a relationship with the binarized threshold value and accuracy in which the robot control device 130 detects a target marker is described with reference to FIGS. 32 to 36.

Figure 32:
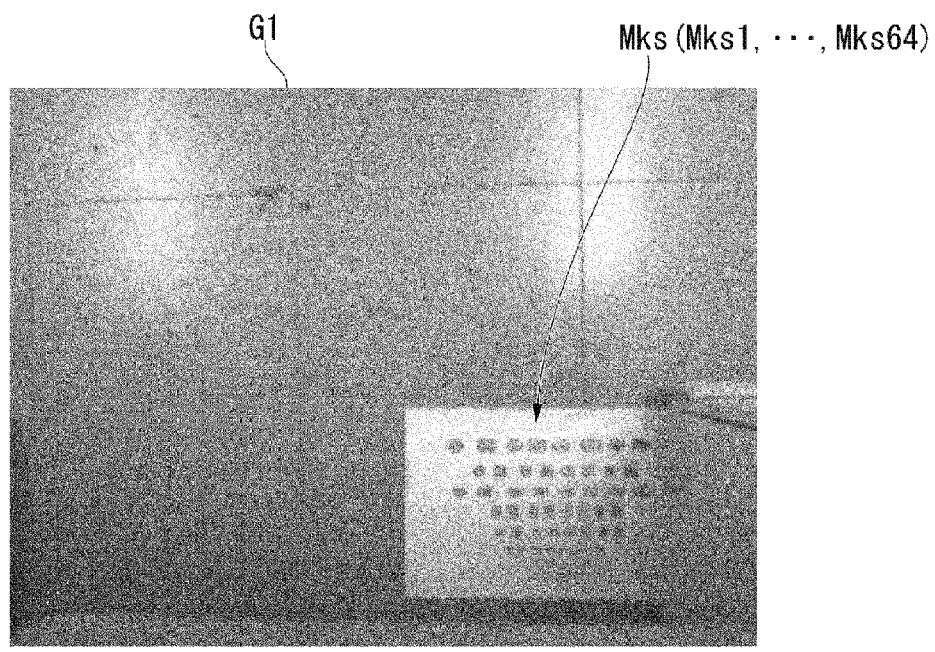
FIG. 32 is a diagram illustrating an example of the captured image including 64 figure center markers.

FIG. 32 is a diagram illustrating an example of the captured image including 64 figure center markers. 64 figure center markers Mks of markers Mks1 to Mks64 are included in a captured image G1 illustrated in FIG. 32. In a case where the robot control device 130 converts the captured image G1 into the binarized image based on the binarized threshold value that is not appropriate for detecting the target marker, the aforementioned binarized image becomes as a binarized image G2 illustrated in FIG. 33.

Figure 33:
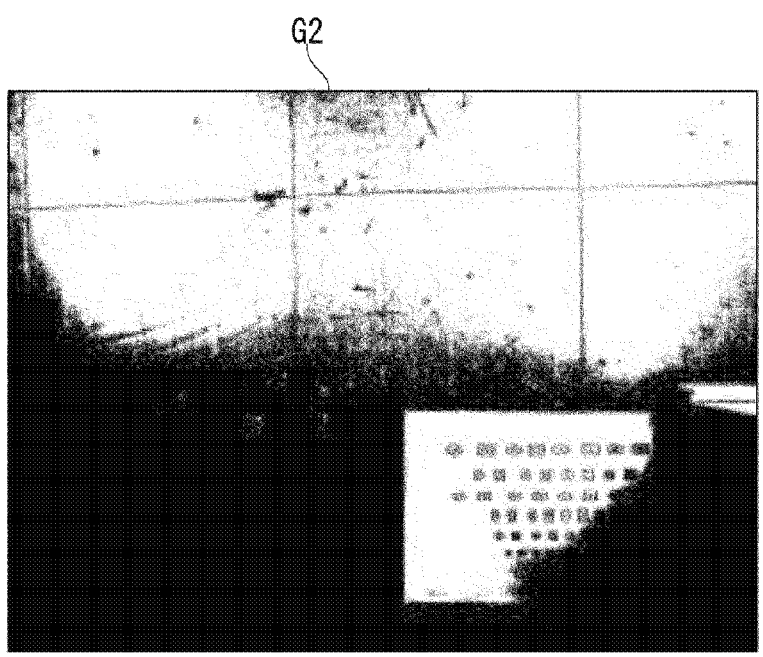
FIG. 33 is a diagram illustrating an example of a binarized image in a case where the robot control device binarizes a captured image G1 illustrated in FIG. 32 based on luminance that is not appropriate for detecting the marker.

FIG. 33 is a diagram illustrating an example of a binarized image in a case where the robot control device 130 binarizes the captured image G1 illustrated in FIG. 32 based on the binarized threshold value that is not appropriate for detecting the target marker. As illustrated in FIG. 33, at least a portion of the 64 figure center markers Mks included in the captured image G1 blackens out in the binarized image G2 in which the robot control device 130 binarizes the captured image G1 illustrated in FIG. 32 based on the binarized threshold value that is not appropriate for detecting the target marker.

Figure 34:
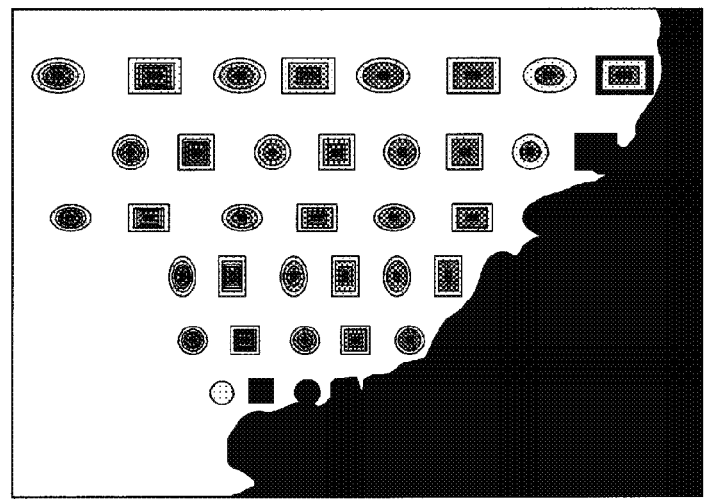
FIG. 34 is a diagram of exemplifying each of the three or more figures that configures a portion of the figure center markers that is detected by the robot control device from a binarized image G2 illustrated in FIG. 33.

FIG. 34 is a diagram of exemplifying each of the three or more figures that configures a portion of the figure center markers Mks that is detected by the robot control device 130 from the binarized image G2 illustrated in FIG. 33. In FIG. 34, the aforementioned figures are respectively differentiated according to the difference of hatching. As illustrated in FIG. 34, a portion of the three or more figures that configure each of the figure center markers Mks detected by the robot control device 130 from the binarized image G2 blackens out, another portion thereof is detected as figures in shapes different from the original, a portion of the three or more figures that configures each of the figure center markers Mks is detected as one figure in still another portion, and the rest portion is normally detected. That is, the robot control device 130 cannot detect a desired figure center marker to be detected among the markers Mks1 to Mks64 from the binarized image G2 obtained by binarizing the captured image G1 based on the binarized threshold value that is not appropriate for detecting the target marker, in some cases. For example, in a case where the desired figure center markers to be detected are all figure center markers of the markers Mks1 to Mks64, the robot control device 130 cannot detect the desired figure center markers in the example illustrated in FIGS. 33 and 34.

Figure 35:
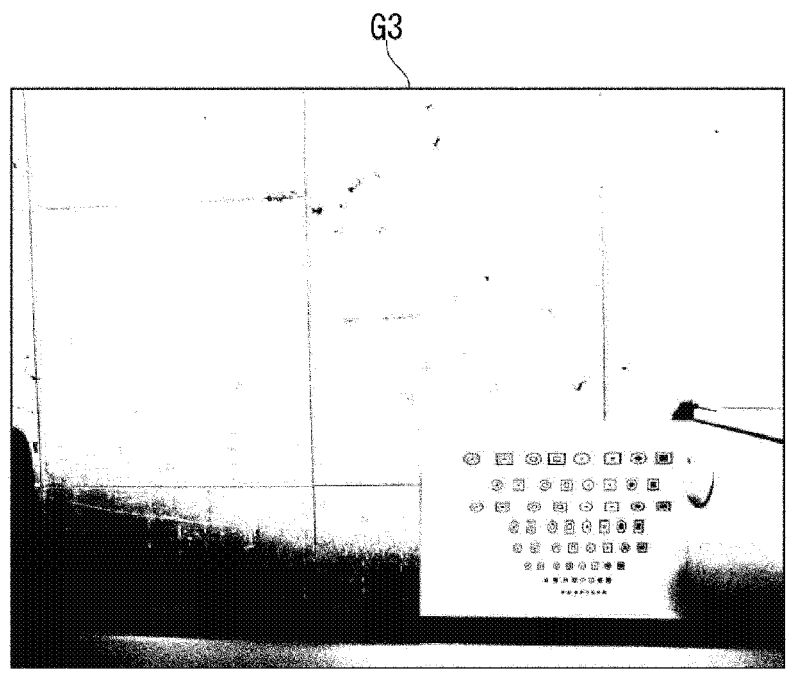
FIG. 35 is a diagram illustrating an example of a binarized image in a case where the robot control device binarizes the captured image G1 illustrated in FIG. 32 based on luminance appropriate for detecting the marker.

Meanwhile, FIG. 35 is a diagram illustrating an example of a binarized image in a case where the robot control device 130 binarizes the captured image G1 illustrated in FIG. 32 based on the binarized threshold value appropriate for detecting the target marker. As illustrated in FIG. 35, in a binarized image G3 obtained by binarizing the captured image G1 illustrated in FIG. 32 by the robot control device 130 based on the binarized threshold value appropriate for detecting the target marker, all of the 64 figure center markers included in the captured image G1 do not blacken out.

Figure 36:
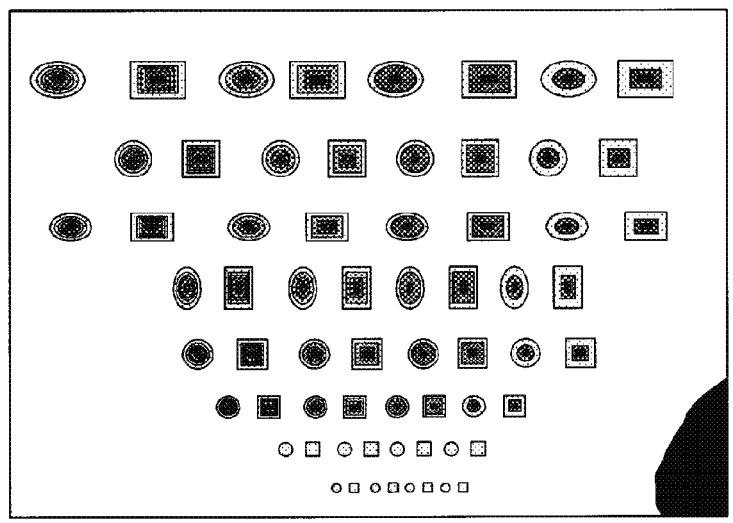
FIG. 36 is a diagram of exemplifying each of the three or more figures that configure the figure center markers detected by the robot control device from the binarized image G2 illustrated in FIG. 35.

FIG. 36 is a diagram of exemplifying each of the three or more figures that configure the figure center markers Mks detected by the robot control device 130 from the binarized image G2 illustrated in FIG. 35. In FIG. 36, the aforementioned figures are respectively differentiated according to the difference of hatching. As illustrated in FIG. 36, all of the three or more figures that configure each of the figure center markers Mks detected by the robot control device 130 from the binarized image G3 are normally detected. That is, the robot control device 130 can detect the desired figure center marker to be detected, among the marker Mks1 to the marker Mks64, from the binarized image G3 obtained by binarizing the captured image G1 based on a binarized threshold value appropriate for detecting the marker. For example, in a case where the desired figure center markers to be detected are the figure center markers of all of the markers Mks1 to Mks64, in the example illustrated in FIGS. 35 and 36, the robot control device 130 can detect the desired figure center markers.

In this manner, in a case where the luminance selected as the binarized threshold value is luminance that is not appropriate for detecting the target marker, the robot control device 130 cannot detect the target marker in some cases. However, in a case where the luminance selected as the binarized threshold value is luminance appropriate for detecting the target marker, the robot control device 130 can detect the target marker. Therefore, selecting luminance appropriate for detecting the target marker by the robot control device 130 as the binarized threshold value is important for the robot control device 130 to cause the robot 120 to perform a work with high accuracy.

Hardware Configuration of Robot Control Device 130

Figure 37:
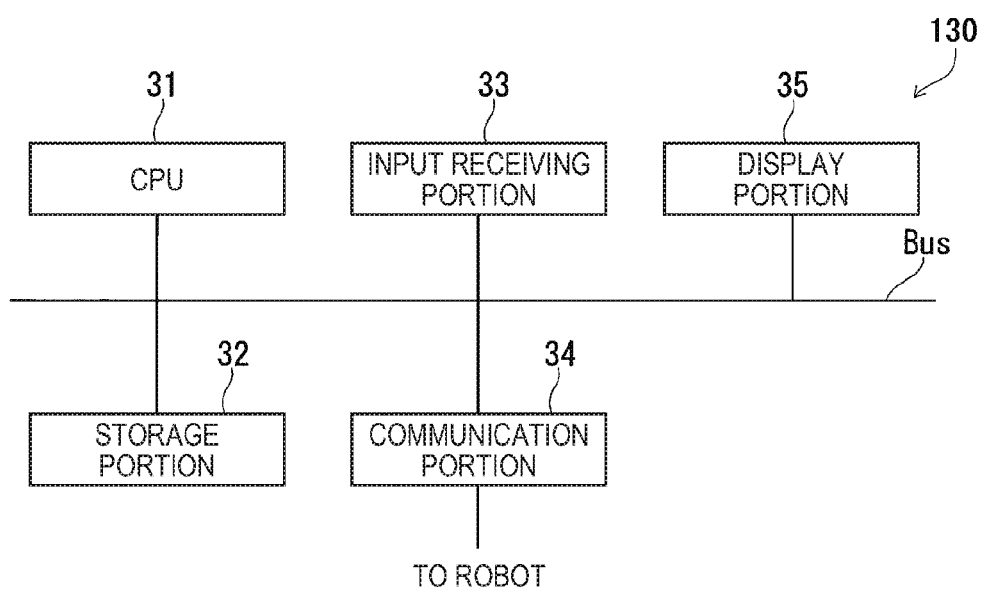
FIG. 37 is a diagram illustrating an example of the hardware configuration of the robot control device.

Hereinafter, hardware configuration of the robot control device 130 is described with reference to FIG. 37. FIG. 37 is a diagram illustrating an example of the hardware configuration of the robot control device 130. For example, the robot control device 130 includes the central processing unit (CPU) 31, the storage portion 32, the input receiving portion 33, the communication portion 34, and the display portion 35. The robot control device 130 performs a communication with the robot 120 via the communication portion 34. These components are communicably connected to each other via the buses Bus.

The CPU 31, the storage portion 32, the input receiving portion 33, the communication portion 34, and the display portion 35 are the same as those according to the first embodiment, and thus descriptions thereof are omitted.

Instead of being built in the robot control device 130, the storage portion 32 may be an external storage device connected by a digital input-output port such as USB. The storage portion 32 stores various items of information, images, or programs that the robot control device 130 processes or information illustrating a position of the material supplying area (not illustrated).

Functional Configuration of Robot Control Device 130

Figure 38:
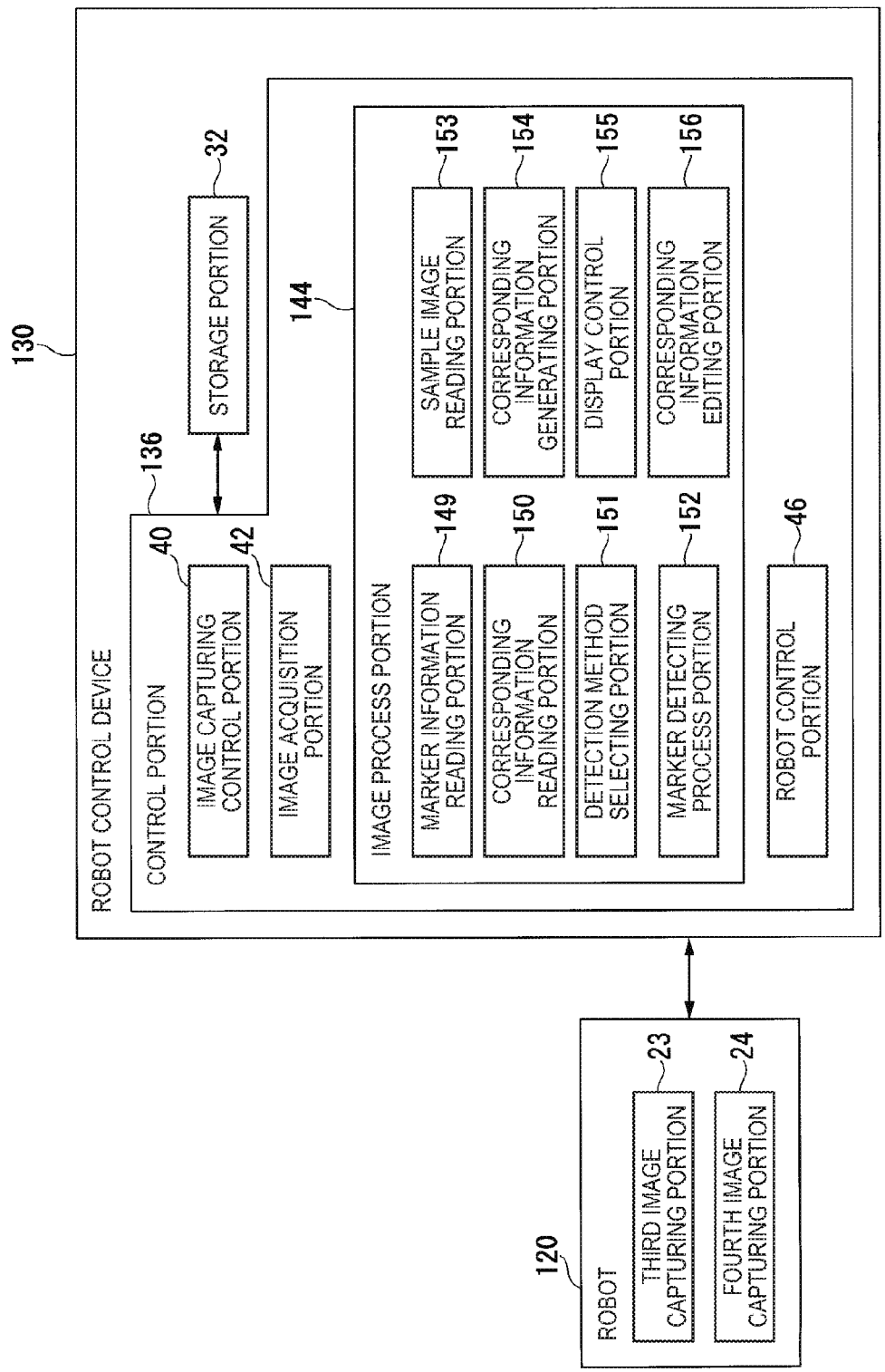
FIG. 38 is a diagram illustrating an example of the functional configuration of the robot control device.

Hereinafter, the functional configuration of the robot control device 130 is described with reference to FIG. 38. FIG. 38 is a diagram illustrating an example of the functional configuration of the robot control device 130. The robot control device 130 includes the storage portion 32 and a control portion 136.

The control portion 136 controls the entire robot control device 130. The control portion 136 includes the image capturing control portion 40, the image acquisition portion 42, an image process portion 144, and the robot control portion 46. These functional portions included in the control portion 136 are realized, for example, by the CPU 31 executing various programs stored in the storage portion 32. A portion or all of these functional portions may be hardware functional portions such as a large scale integration (LSI) or an application specific integrated circuit (ASIC).

The image capturing control portion 40 and the image acquisition portion 42 are the same as those according to the first embodiment, and thus descriptions thereof are omitted.

The image process portion 144 performs various image processes on the captured image acquired by the image acquisition portion 42. The image process portion 144 includes a marker information reading portion 149, a corresponding information reading portion 150, a detection method selecting portion 151, a marker detecting process portion 152, a sample image reading portion 153, a corresponding information generating portion 154, a display control portion 155, and a corresponding information editing portion 156.

The marker information reading portion 149 reads marker information stored in the storage portion 32 in advance. The marker information is information including information illustrating each of the one or more markers detected when the robot control device 130 causes the robot 120 to perform a predetermined work. In this example, the marker information includes information in which the marker ID illustrating each of the aforementioned one or more markers and the model images of the marker are associated with each other. The marker information may have a configuration including other information associated with the marker ID.

Figures 39, 40:
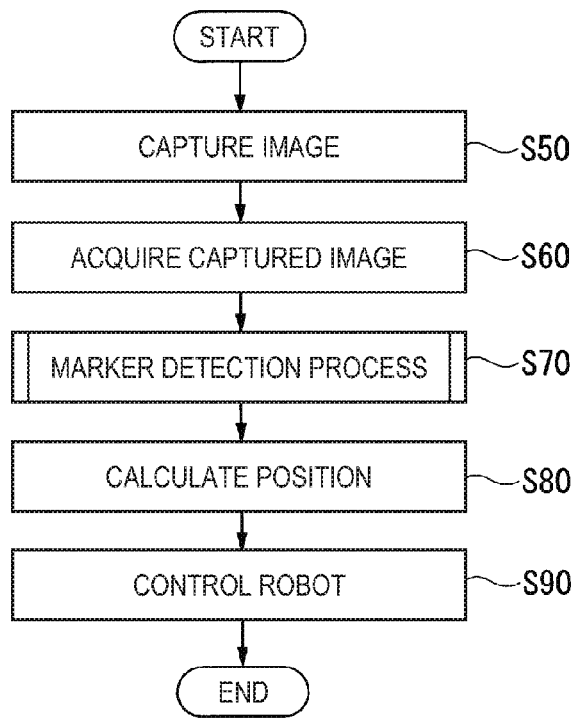
FIG. 39 is a diagram illustrating an example of the table in which corresponding information is stored.
FIG. 40 is a flow chart illustrating an example of a flow of a process in which a control portion causes the robot to perform a predetermined work.

The corresponding information reading portion 150 reads corresponding information stored in the storage portion 32 in advance, from the storage portion 32. In this example, the corresponding information is information including information in which the marker ID illustrating each of the plural markers and information illustrating the marker detection method appropriate for detecting the marker illustrated by the marker ID are associated with each other. In this example, the corresponding information is stored in the table illustrated in FIG. 39 and stored in the storage portion 32. FIG. 39 is a diagram illustrating an example of the table in which the corresponding information is stored.

In the table illustrated in FIG. 39, the marker ID and the marker detection method are stored in association with each other. In the aforementioned table, the marker ID, detectable minimum threshold values that are minimum threshold values among the binarized threshold values realizing conversion of the aforementioned captured image to the binarized image in which the marker illustrated by the marker ID can be detected from the captured image, and detectable ranges indicated by the detectable maximum threshold values which are maximum threshold values among the aforementioned binarized threshold values are stored in an associated manner. That is, the detectable range is a range from a detectable minimum threshold value to a detectable maximum threshold value.

With respect to the marker detection method, in this example, "−2" illustrates a first detection method, "−1" illustrates a second detection method, and another positive integer illustrates a third detection method. The aforementioned another positive integer illustrates the predetermined value in the third detection method, that is, a binarized threshold value (luminance) in the third detection method. In this example, the aforementioned binarized threshold value is an average value of the detectable minimum threshold value and the detectable maximum threshold value in the detectable range associated with the aforementioned binarized threshold value. The aforementioned binarized threshold value may be, for example, values in another detectable range such as a detectable minimum threshold value, a detectable maximum threshold value, or a value different from the average value of the detectable range. In this example, null information is stored in the detectable range (that is, the detectable minimum threshold value and the detectable maximum threshold value) associated with each of the first and second detection methods.

For example, in FIG. 39, the second detection method is associated with a marker having the marker ID of "1" as the marker detection method appropriate for detecting the aforementioned marker. The third detection method is associated with a marker having the marker ID of "2" as the marker detection method appropriate for detecting the aforementioned marker, and the binarized threshold value used for detecting the aforementioned marker is 90. The first detection method is associated with a marker having the marker ID of "4" as the marker detection method appropriate for detecting the aforementioned marker.

The detection method selecting portion 151 selects a marker detection method associated with the marker ID illustrating a target marker that the marker detecting process portion 152 selects based on the marker information that the marker information reading portion 149 reads from the storage portion 32, based on the corresponding information that the corresponding information reading portion 150 reads from the storage portion 32.

The marker detecting process portion 152 selects the marker ID illustrating the target marker one by one, based on the marker information that the marker information reading portion 149 reads from the storage portion 32. The marker detecting process portion 152 detects the target marker from the captured image that the image acquisition portion 42 acquires, based on the marker detection method that the detection method selecting portion 151 selects.

The sample image reading portion 153 reads one or more sample images used when the corresponding information generating portion 154 generates the corresponding information, from the storage portion 32. One or more markers illustrated by the marker ID included in the marker information that the marker information reading portion 149 reads from the storage portion 32 are included in the sample image. Each of one or more sample images has different image capturing conditions in which the images are captured. The image capturing condition is, for example, a condition determined according to difference in brightness of lighting on a portion or all of the one or more markers included in the aforementioned sample image when the sample image is captured, difference in disposing positions of a portion or all of the one or more markers included in the sample image, difference in day and time or season when the sample image is captured, or difference in a location at which the sample image is captured.

In this example, a case where the aforementioned one or more sample images are captured in advance and stored in the storage portion 32 is described. Instead of this, the aforementioned one or more sample images have a configuration of being captured by the third image capturing portion 23 and the fourth image capturing portion 24. In this case, the image process portion 144 may not include the sample image reading portion 153. Instead of this, the image acquisition portion 42 acquires the captured image to become the sample image, from the third image capturing portion 23 and the fourth image capturing portion 24.

The corresponding information generating portion 154 generates the corresponding information based on the one or more sample images that the sample image reading portion 153 reads from the storage portion 32.

The display control portion 155 causes the display portion 35 to display an edit screen including the graphical user interface (GUI) for editing the corresponding information stored in the storage portion 32 or the like.

The corresponding information editing portion 156 edits the corresponding information stored in the storage portion 32, based on an operation from the user that the display control portion 155 receives via the edit screen displayed on the display portion 35.

The robot control portion 46 causes the robot 120 to perform a predetermined work based on the position of the figure center of the target marker that the marker detecting process portion 152 detects.

With Respect to Flow of Process that Control Portion 136 Causes Robot 120 to Perform Predetermined Work Hereinafter, a process that the control portion 136 causes the robot 120 to perform a predetermined work is described with reference to FIG. 40. FIG. 40 is a flow chart illustrating an example of a flow of a process in which the control portion 136 causes the robot 120 to perform a predetermined work.

The image capturing control portion 40 causes the third image capturing portion 23 and the fourth image capturing portion 24 to stereoscopically capture the capture range including the work area illustrated in FIG. 29 (Step S50). Subsequently, the image acquisition portion 42 acquires the captured image that the third image capturing portion 23 and the fourth image capturing portion 24 stereoscopically capture in Step S50 from the third image capturing portion 23 and the fourth image capturing portion 24 (Step S60).

Subsequently, the marker detecting process portion 152 executes the marker detection process and detects each of the markers Mk11 to MkN included in the captured image based on the captured image that the image acquisition portion 42 acquires in Step S60 (Step S70). Subsequently, the robot control portion 46 calculates respective positions of the figure centers of the markers Mk11 to MkN that the marker detecting process portion 152 detects in Step S70 as respective positions of the target objects O1 to ON illustrated in FIG. 29 (Step S80).

Subsequently, the robot control portion 46 causes the first arm to grip the target objects O1 to ON one by one, based on the respective positions of the target objects O1 to ON calculated in Step S80 and supplies the material supplying area (not illustrated) (Step S90). The robot control portion 46 reads the information illustrating the position of the material supplying area from the storage portion 32 in advance. The robot control portion 46 causes the first arm to supply the target objects O1 to ON to the material supplying area and ends the process.

With Respect to Flow of Marker Detection Process

Figure 41:
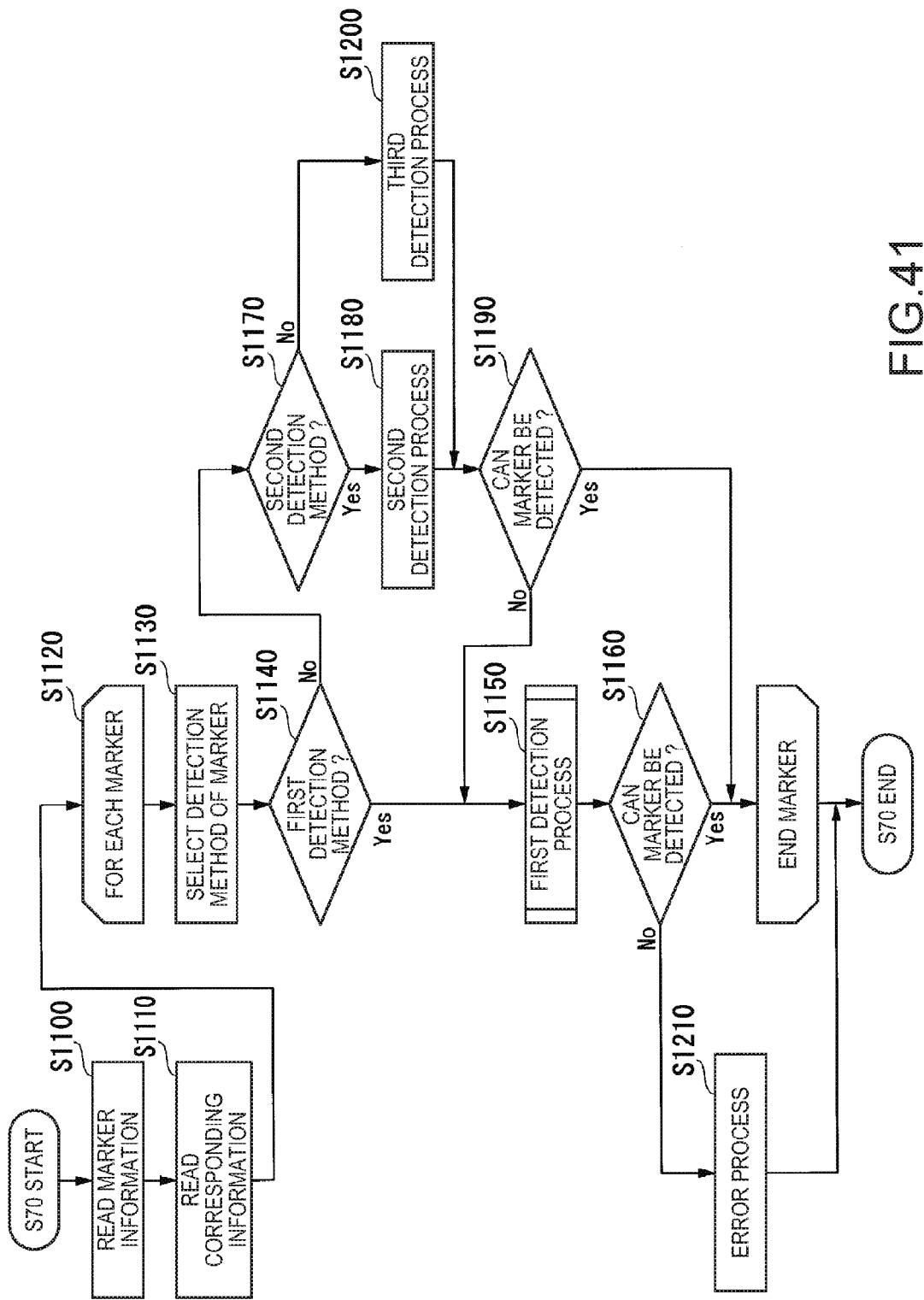
FIG. 41 is a flow chart illustrating an example of the flow of the marker detection process in Step S70 illustrated in FIG. 40.

Hereinafter, with reference to FIG. 41, the marker detection process in Step S70 illustrated in FIG. 40 is described. FIG. 41 is a flow chart illustrating an example of the flow of the marker detection process in Step S70 illustrated in FIG. 40.

The marker detecting process portion 152 causes the marker information reading portion 149 to read the marker information from the storage portion 32 (Step S1100). Subsequently, the marker detecting process portion 152 causes the corresponding information reading portion 150 to read the corresponding information from the storage portion 32 (Step S1110). Subsequently, the marker detecting process portion 152 selects the marker ID (in this example, the markers ID that respectively illustrate the markers Mk11 to MkN) included the marker information that the marker information reading portion 149 read from the storage portion 32 in Step S1100 one by one and repeatedly performs processes from Steps S1130 to S1210 for each target marker using the markers illustrated by the selected markers ID as the target markers (Step S1120).

Subsequently, the detection method selecting portion 151 detects the marker detection method associated with the target marker that the marker detecting process portion 152 selects in Step S1120 from the corresponding information that the corresponding information reading portion 150 reads from the storage portion 32 in Step S1110 and selects the detected marker detection method as the marker detection method of the target marker.

Subsequently, the marker detecting process portion 152 determines whether the marker detection method that the detection method selecting portion 151 selects in Step S1130 is the first detection method or not (Step S1140). In a case where it is determined that the marker detection method that the detection method selecting portion 151 selects is the first detection method (Step S1140-Yes), the marker detecting process portion 152 executes the first detect process based on the first detection method and detects the target marker (Step S1150).

Subsequently, the marker detecting process portion 152 determines whether the detection of the target marker in Step S1150 succeeds or not (Step S1160). In a case where it is determined that the detection of the target marker succeeds (Step S1160-Yes), the marker detecting process portion 152 proceeds to Step S1120 and selects the marker that the next marker ID illustrates as the target marker. In a case where it is determined that detection of the target marker succeeds and a case where an unselected marker ID in Step S1120 does not exist, the marker detecting process portion 152 ends the process. Meanwhile, in a case where it is determined that the detection of the target marker does not succeed (failed) (Step S1160-No), the marker detecting process portion 152 executes an error process (Step S1210) and ends a process. Specifically, in the error process, the marker detecting process portion 152, for example, causes the display control portion 155 to display the information illustrating the failure of the detection of the target marker on the display portion 35. Instead of this, the error process may be another process that informs the user of the failure in the detection of the target marker.

Meanwhile, in Step S1140, in a case where it is determined that the marker detection method that the detection method selecting portion 151 selects is not the first detection method (Step S1140-No), the marker detecting process portion 152 determines whether the marker detection method that the detection method selecting portion 151 selects in Step S1130 is the second detection method or not (Step S1170). In a case where it is determined that the marker detection method that the detection method selecting portion 151 selects is the second detection method (Step S1170-Yes), the marker detecting process portion 152 executes the second detect process based on the second detection method and detects the target marker (Step S1180). In the second detect process based on the second detection method, in this example, the binarized threshold value is determined by the Otsu's method described above and the captured image is converted into the binarized image based on the determined binarized threshold value. In the aforementioned second detect process, the target marker is detected from the converted aforementioned binarized image. Since the Otsu's method is a method well-known in the art, details of the second detect process are omitted herein. The method for detecting the target marker from the binarized image may be a method well-known in the art or may be a method newly developed from this, and details thereof are omitted.

Subsequently, the marker detecting process portion 152 determines whether the detection of the target marker in Step S1180 succeeds or not (Step S1190). In a case where it is determined that the detection of the target marker succeeds (Step S1190-Yes), the marker detecting process portion 152 proceeds to Step S1120 and selects the marker that the next marker ID illustrates as the target marker. In a case where it is determined that the detection of the target marker succeeds, and a case where an unselected marker ID does not exist in Step S1120, the marker detecting process portion 152 ends the process. Meanwhile, in a case where it is determined that the detection of the target marker does not succeed (Step S1190-No), the marker detecting process portion 152 proceeds to Step S1150, executes the first detect process based on the first detection method, and detects the target marker.

Meanwhile, in Step S1170, in a case where it is determined that the marker detection method that the detection method selecting portion 151 selects is not the second detection method (Step S1170-No), the marker detecting process portion 152 executes the third detect process based on the third detection method and detects the target marker (Step S1200). The marker detecting process portion 152 proceeds to Step S1190 and determines whether the detection of the target marker in Step S1200 succeeds or not. In the third detect process based on the third detection method, the marker detecting process portion 152 detects the binarized threshold value associated with the target marker based on the corresponding information that the marker information reading portion 149 reads from the storage portion 32 in Step S1110 and determines the detected binarized threshold value as the binarized threshold value determined in advance. The marker detecting process portion 152 converts the captured image into the binarized image based on the determined binarized threshold value. In the aforementioned third detect process, the target marker is detected from the converted aforementioned binarized image. The method for detecting the target marker from the binarized image may be the method well-known in the art or may be a method newly developed from this, and details thereof are omitted.

In this manner, in a case where the target marker can be detected by the second detection method or the third detection method, even if the target marker is not detected by the first detection method in which the detection time of the target marker is longer than the second and third detection methods, the robot control device 130 can detect the target marker by the second detection method or the third detection method in which the detection time is shorter than that in the first detection method. In a case where the target marker can be detected by the second detection method or the third detection method, that is, a case where the second detection method or the third detection method is associated with the target marker.

Even if the target marker is not detected by the first and second detection methods in which the detection time of the target marker is longer than the third detection method, in a case where the target marker can be detected by the third detection method, the robot control device 130 can suppress the decrease of the detection accuracy of the target marker and detects the target marker by the third detection method of which detection time is shorter than that of the first and second detection methods. As a result, the robot control device 130 can make the improvement in the detection accuracy of the marker and the shortening of the detection time of the marker be compatible with each other.

With Respect to Flow of First Detect Process

Figure 42:
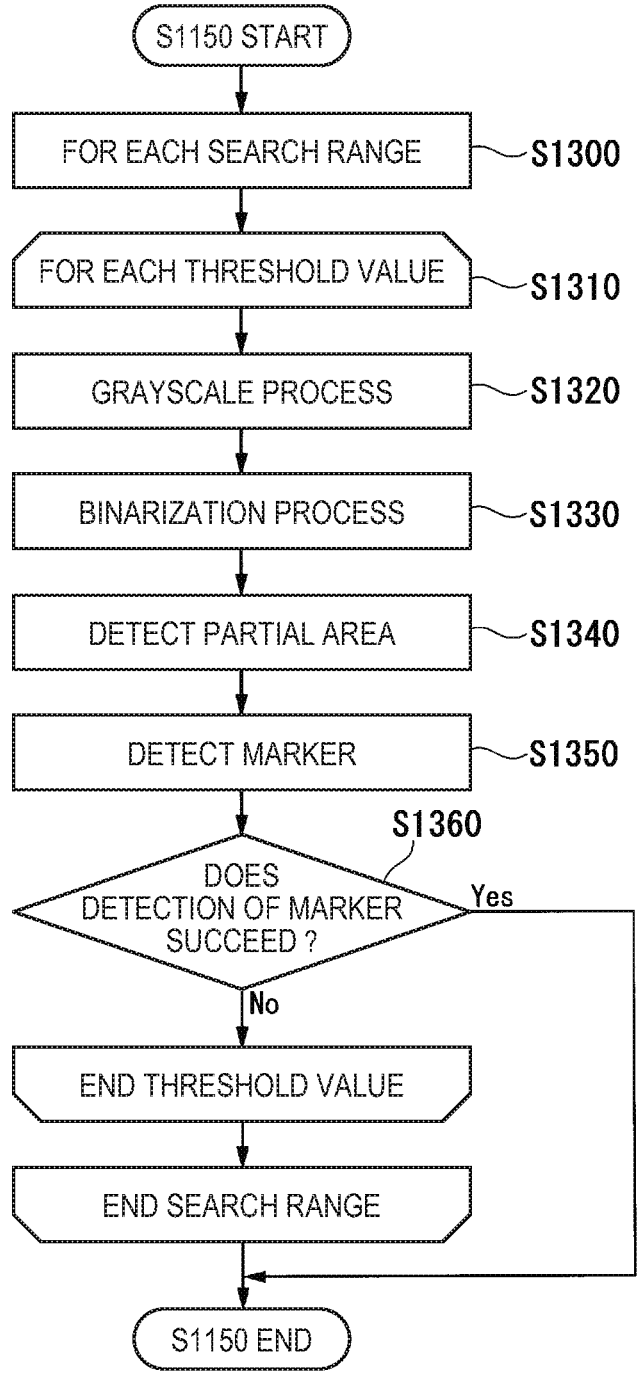
FIG. 42 is a flow chart illustrating an example of the flow of a first detect process in Step S1150 illustrated in FIG. 41.

Hereinafter, a first detect process in Step S1150 illustrated in FIG. 41 is described with reference to FIG. 42. FIG. 42 is a flow chart illustrating an example of the flow of the first detect process in Step S1150 illustrated in FIG. 41.

The marker detecting process portion 152 sets the one or more search ranges on the captured image that the image acquisition portion 42 acquires in Step S50 illustrated in FIG. 40 and repeatedly executes processes from Steps S1310 to S1360 for each set search range (Step S1300). In this example, there is only one search range. That is, the search range is the entire captured image.

After the search range is selected in Step S1300, the marker detecting process portion 152 selects luminance (256 integer values including 0) from 0 to 255 in an order from 0 one by one, as the binarized threshold value and repeatedly performs a process from Steps S1320 to S1360 for each selected binarized threshold value (Step S1310).

After the binarized threshold value is selected in Step S1310, the marker detecting process portion 152 converts the captured image that the image acquisition portion 42 acquires in Step S50 illustrated in FIG. 40 into the grayscale image (Step S1320). Subsequently, the marker detecting process portion 152 converts the grayscale image obtained by converting the captured image by the grayscale process in Step S1320 into the binarized image based on the binarized threshold value selected in Step S1310 (Step S1330).

Subsequently, the marker detecting process portion 152 detects one or more partial areas from the binarized image obtained by converting the grayscale image by the binarization process in Step S1330 (Step S1340). The aforementioned partial area is a white partial area which is an area configured only with one or more white pixels in the binarized image and a black partial area configured only with one or more black pixels in the aforementioned binarized image. In a case where pixels having the same color as the aforementioned pixel exist around eight pixels with the pixel selected from the binarized image as a center, the marker detecting process portion 152 regards these pixels as pixels included in one connected partial area. After one or more partial areas are detected from the binarized image, the marker detecting process portion 152 performs labeling for differentiating each of the detected aforementioned partial area.

Subsequently, the marker detecting process portion 152 executes detection of the target marker based on the one or more partial areas detected in Step S1340 (Step S1350). Specifically, the marker detecting process portion 152 calculates the positions of the figure centers of the respective figures in a case where the partial areas labeled in Step S1340 are respectively set to be the figures. The marker detecting process portion 152 detects a combination of the figure (that is, the partial area) in which three or more figure centers belong to the predetermined range as the figure center marker, based on the calculated positions of the figure centers. The marker detecting process portion 152 detects the target marker by pattern matching or the like, from the detected one or more figure center markers. In a case where the target marker is detected by pattern matching from the one or more figure center markers, the marker detecting process portion 152 reads the model image of the target marker stored in the storage portion 32 in advance and detects the target marker from the one or more figure center markers based on the read aforementioned model image.

Subsequently, the marker detecting process portion 152 determines whether detection of the target marker in the process of Step S1350 succeeds or not (Step S1360). In a case where it is determined that the detection of the target marker succeeds (Step S1360-Yes), the marker detecting process portion 152 ends the process. Meanwhile, in a case where it is determined that the detection of the target marker does not succeed (Step S1360-No), the marker detecting process portion 152 proceeds to Step S1310 and selects the next binarized threshold value. After the process from Steps S1320 to S1360 is executed on all the binarized threshold value that can be selected in Step S1310, the marker detecting process portion 152 proceeds to Step S1300 and selects the next search range. In this example, since there is only one search range, the marker detecting process portion 152 executes the processes from Steps S1320 to S1360 in all the binarized threshold values that can be selected in Step S1310 and ends the process.

Figure 43:
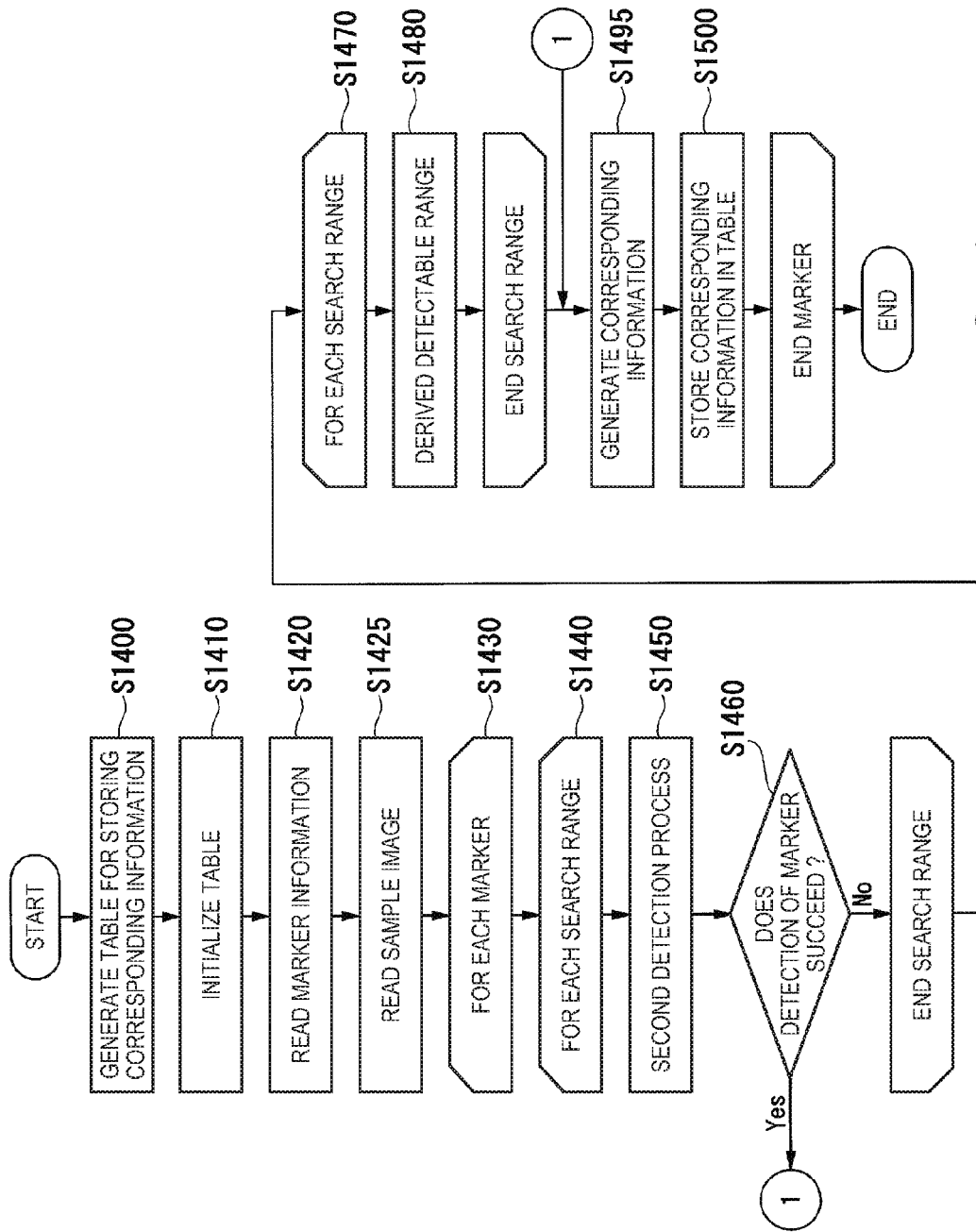
FIG. 43 is a flow chart illustrating an example of a flow of a process in which the robot control device generates corresponding information.

In this manner, the robot control device 130 detects each of the aforementioned plural markers by the marker detection method associated with each of the plural markers (in this example, the markers Mk11 to MkN). Accordingly, the robot control device 130 can make the improvement in the detection accuracy of the marker and the shortening of the detection time of the marker be compatible with each other.
With Respect to Flow of Process for Generating Corresponding Information Hereinafter, the process in which the robot control device 130 generates the corresponding information with reference to FIG. 43 is described. FIG. 43 is a flow chart illustrating an example of a flow of a process in which the robot control device 130 generates the corresponding information.

The corresponding information generating portion 154 generates a table that stores the corresponding information in a storage area of the storage portion 32 (Step S1400). Subsequently, the corresponding information generating portion 154 initializes the table generated in the storage area of the storage portion 32 in Step S1400 (Step S1410). For example, the corresponding information generating portion 154 stores the null information in each field for storing the information in the aforementioned table, as initialization of the aforementioned table. Instead of this, the corresponding information generating portion 154 may have a configuration of initializing the aforementioned table by another method.

Subsequently, the corresponding information generating portion 154 reads the marker information from the storage portion 32 to the marker information reading portion 149 (Step S1420). Subsequently, the corresponding information generating portion 154 causes the sample image reading portion 153 to read the sample image from the storage portion 32 (Step S1425). In this example, a case where there is only one sample image that the sample image reading portion 153 reads is described. Instead of a configuration of causing the sample image reading portion 153 to read the sample image from the storage portion 32, the corresponding information generating portion 154 may have a configuration in which the image capturing control portion 40 causes the third image capturing portion 23 and the fourth image capturing portion 24 to capture the captured image to become the sample image. In this case, the corresponding information generating portion 154 causes the image acquisition portion 42 to acquire the captured image captured by the third image capturing portion 23 and the fourth image capturing portion 24 as the sample image.

Subsequently, the corresponding information generating portion 154 selects the marker ID included in the marker information that the marker information reading portion 149 reads in Step S1420 one by one and repeatedly performs processes from Steps S1440 to S1500 for each target marker using the marker illustrated by the selected marker ID as the target marker (Step S1430).

After the target marker is selected in Step S1430, the corresponding information generating portion 154 sets one or more search ranges with respect to the sample image that the sample image reading portion 153 reads in Step S1425 and repeatedly executes the processes from Steps S1450 to S1500 for each of the set search ranges (Step S1440). In this example, there is only one search range. That is, the search range is the entire captured image.

The corresponding information generating portion 154 executes the second detect process based on the second detection method and detects the target marker from the sample image that the sample image reading portion 153 reads from the storage portion 32 in Step S1425 (Step S1450). Subsequently, the corresponding information generating portion 154 determines whether the detection of the target marker in Step S1450 succeeds or not (Step S1460). In a case where it is determined that the detection of the target marker succeeds (Step S1460-Yes), the corresponding information generating portion 154 proceeds to Step S1495 generates the corresponding information in which information (in this example, "−1" described above) illustrating the second detection method, the marker ID illustrating the target marker, and the null information as the information illustrating the detectable range are associated with each other (Step S1495). Meanwhile, in a case where it is determined that the detection of the target marker does not succeed (Step S1460-No), the corresponding information generating portion 154 proceeds to Step S1440 and selects the next search range. In this example, since there is only one search range, in a case where it is determined that the detection of the target marker does not succeed, the corresponding information generating portion 154 proceeds to Step S1470 and repeatedly executes the processes from Steps S1480 to S1490 for each search range set in the sample image in Step S1440 (Step S1470).

After the search range is selected in Step S1470, the corresponding information generating portion 154 derives the detectable range of the target marker (Step S1480). Here, the process of Step S1480 is described. The corresponding information generating portion 154 executes processes from Steps S1300 to S1350, in a case where in the flow chart illustrated in FIG. 42 on the sample image that the sample image reading portion 153 reads from the storage portion 32 in Step S1425, Step S1360 is omitted. Accordingly, the corresponding information generating portion 154 derives the detectable minimum threshold value and the detectable maximum threshold value in the search range in which the detection of the target marker succeeds. In this example, since there is only one search range, the detection of the target marker is executed in the aforementioned process from the entire aforementioned sample image and derives the detectable minimum threshold value and the detectable maximum threshold value.

In a case where the detectable minimum threshold value and the detectable maximum threshold value cannot be derived, that is, in a case where the target marker cannot be detected in the aforementioned process at all, the corresponding information generating portion 154 sets the detectable minimum threshold value and the detectable maximum threshold value as null information.

After the detectable range is derived in Step S1480, the corresponding information generating portion 154 proceeds to Step S1470 and selects the next search range. In this example, since there is only one search range, the corresponding information generating portion 154 derives the detectable range in Step S1480, proceeds to Step S1495, and generates the corresponding information in which the detectable minimum threshold value and the detectable maximum threshold value derived in Step S1480, the marker ID illustrating the target marker, the average value between the detectable minimum threshold value and the detectable maximum threshold value as the information illustrating the third detection method are associated with each other. At this point, in a case where the detectable minimum threshold value and the detectable maximum threshold value are null information, the corresponding information generating portion 154 generates the corresponding information in which the detectable minimum threshold value and the detectable maximum threshold value which are null information, the marker ID illustrating the target marker, and the information (in this example, "−2") illustrating the first detection method are associated with each other, instead of generating the aforementioned corresponding information.

Subsequently, the corresponding information generating portion 154 stores the corresponding information generated in Step S1495 in the initialized table in Step S1410 (Step S1500). The corresponding information generating portion 154 proceeds to Step S1430 and selects the next marker ID. In a case where an unselected marker ID does not exist in Step S1430, the corresponding information generating portion 154 ends the process.

In this manner, the robot control device 130 generates the corresponding information based on the sample image and the marker information. Accordingly, the robot control device 130 can detect the target marker using the marker detection method associated with the target marker based on the generated corresponding information. As a result, the robot control device 130 causes the improvement in the detection accuracy of the marker and the shortening of the detection time of the marker.

With Respect to Flow of Process for Editing Corresponding Information

Figure 44:
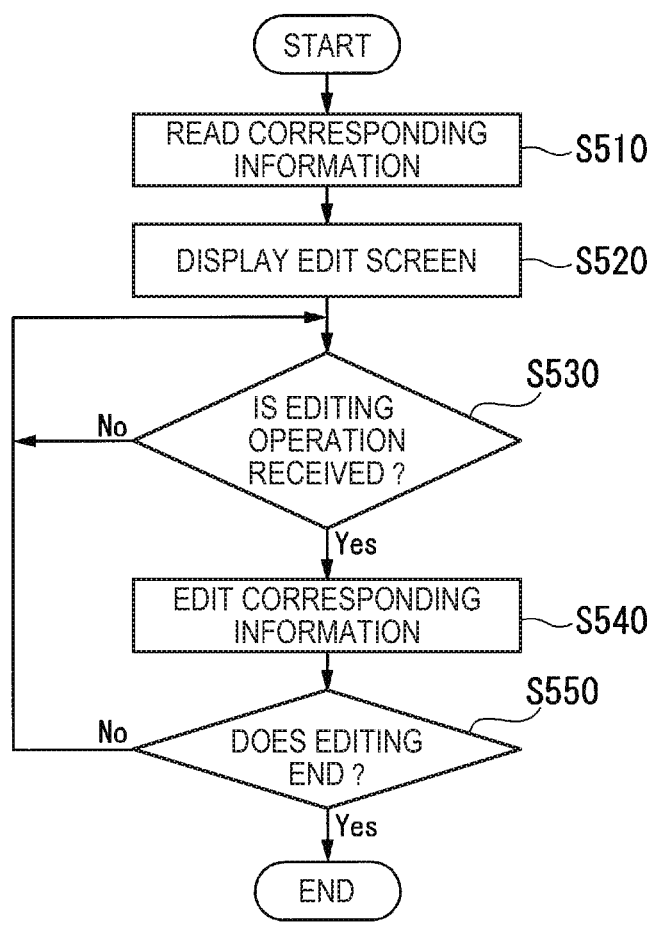
FIG. 44 is a flow chart illustrating an example of a flow of a process in which the robot control device edits the corresponding information based on an operation received from the user.

Hereinafter, the process in which the robot control device 130 edits the corresponding information based on an operation received from the user is described with reference to FIG. 44. FIG. 44 is a flow chart illustrating an example of a flow of the process in which the robot control device 130 edits the corresponding information based on the operation received from the user. Hereinafter, a process after the display control portion 155 receives an operation for displaying the edit screen on the display portion 35 via the input receiving portion 33 is described.

The corresponding information editing portion 156 reads the corresponding information from the storage portion 32 to the corresponding information reading portion 150 (Step S510). Subsequently, the display control portion 155 causes the display portion 35 to display the edit screen (Step S520). Subsequently, the corresponding information editing portion 156 stands by until an editing operation for editing the corresponding information from the user via the edit screen (Step S530). After the editing operation for editing the corresponding information is received from the user via the edit screen (Step S530-Yes), the corresponding information editing portion 156 edits the corresponding information based on the editing operation received from the user (Step S540). For example, the corresponding information editing portion 156 changes the marker detection method associated with the marker ID selected by the user to another marker detection method based on the editing operation received from the user. For example, the corresponding information editing portion 156 changes a portion or all of the binarized threshold value, the detectable minimum threshold value, and the detectable maximum threshold value associated with the marker ID selected by the user into other values, based on the editing operation received from the user.

Subsequently, the corresponding information editing portion 156 determines whether an operation for ending the editing of the corresponding information is received from the user via the edit screen or not (Step S550). In a case where it is determined that an operation for ending the editing of the corresponding information is not received (Step S550-No), the corresponding information editing portion 156 proceeds to Step S530 and stands by until an editing operation for editing the corresponding information is further received from the user via the edit screen. Meanwhile, in a case where it is determined that an operation for ending the editing of the corresponding information is received (Step S550-Yes), the corresponding information editing portion 156 ends the process.

In this manner, the robot control device 130 edits the corresponding information based on the operation received from the user. Accordingly, the robot control device 130 can provide the user with the function for editing the corresponding information to corresponding information desired by the user. Here, the determining method by the user of the marker detection method in a case where the user changes the marker detection method associated with the marker ID in the edition of the corresponding information performed by the user is described with reference to FIG. 45.

Figure 45:
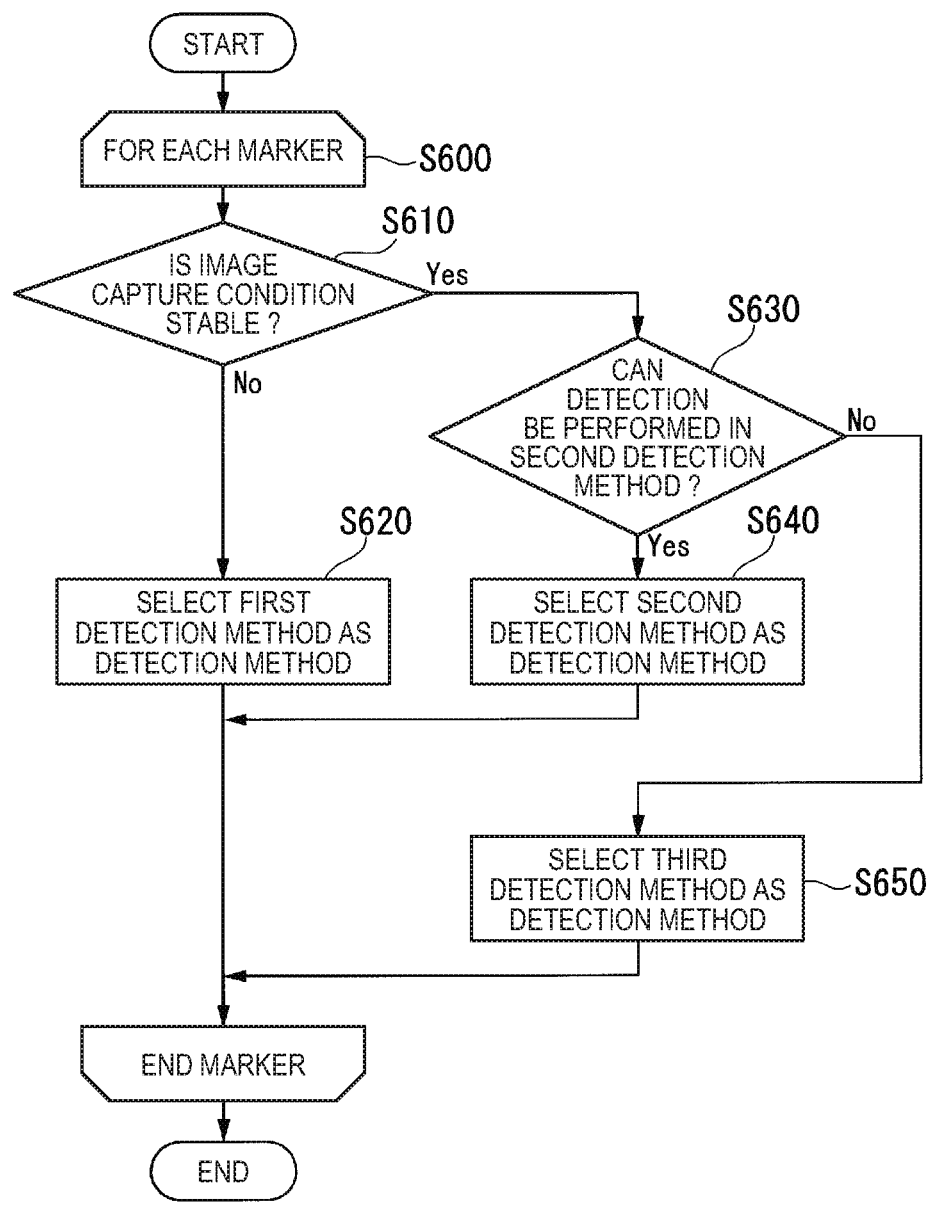
FIG. 45 is a diagram illustrating an example of a flow of a determining method by the user of the marker detection method.

FIG. 45 is a diagram illustrating an example of the flow of the determining method by the user of the marker detection method.

The user selects the markers ID included in the marker information one by one and performs processes from Steps S610 to S650 for each target marker using the marker illustrated by the selected marker ID as the target marker (Step S600).

The user determines whether the image capturing condition of the capture range that is captured by the third image capturing portion 23 and the fourth image capturing portion 24 is stable or not (Step S610). The stability of the image capturing condition is, for example, indicated by whether the image capturing condition is changed within a predetermined time. The user determines that the image capturing condition is not stable in a case where the image capturing condition is changed within a predetermined time. Meanwhile, in a case where the image capturing condition is not changed within the predetermined time, user determines that the image capturing condition is stable. The predetermined time is, for example, 30 minutes. Instead of 30 minutes, the predetermined time may be another time. The stability of the image capturing condition may have a configuration of being indicated by other conditions.

In a case where it is determined that the image capturing condition of the capture range is not stable (Step S610-No), the user selects the first detection method as the marker detection method of the target marker (Step S620). Meanwhile, in a case where it is determined that the image capturing condition of the capture range is stable (Step S610-Yes), the user determines whether the target marker can be detected by the second detection method or not (Step S630). In a case where the marker detection method associated with the target marker from the corresponding information is the second detection method, the user determines that the target marker can be detected by the second detection method based on the marker ID illustrating the target marker. Meanwhile, based on the marker ID illustrating the target marker, in a case where the marker detection method associated with the target marker from the corresponding information is not the second detection method, the user determines that the target marker cannot be detected by the second detection method.

In a case where it is determined that the target marker can be detected by the second detection method (Step S630-Yes), the user selects the second detection method as the marker detection method of the target marker. Meanwhile, in a case where it is determined that the target marker cannot be detected by the second detection method (Step S630-No), the user selects the third detection method as the marker detection method of the target marker.

In this manner, the user determines the marker detection method for each of the plural markers. Accordingly, the user can associate the marker detection method appropriate for detecting the aforementioned marker with the aforementioned marker, for each of the plural markers. As a result, the robot control device 130 more reliably make the improvement in the detection accuracy of the marker and the shortening of the detection time of the marker be compatible with each other.

Instead of the user, the process in the flow chart illustrated in FIG. 45 may have a configuration of being operated by functional portion included in the robot control device 130. In this case, the process in Step S610 determines whether the image capturing condition is stable or not, for example, based on an output value from a sensor that detects a physical amount indicating the image capturing condition in the capture range such as a sensor that detects brightness in the capture range.

Modified Example of Embodiment

Hereinafter, a modified example of the embodiment according to the invention is described with reference to the drawings. In the modified example of the embodiment, when the corresponding information is generated, the robot control device 130 generates the corresponding information based on two or more sample images, instead of the configuration of generating the corresponding information based on one sample image.

Figure 46:
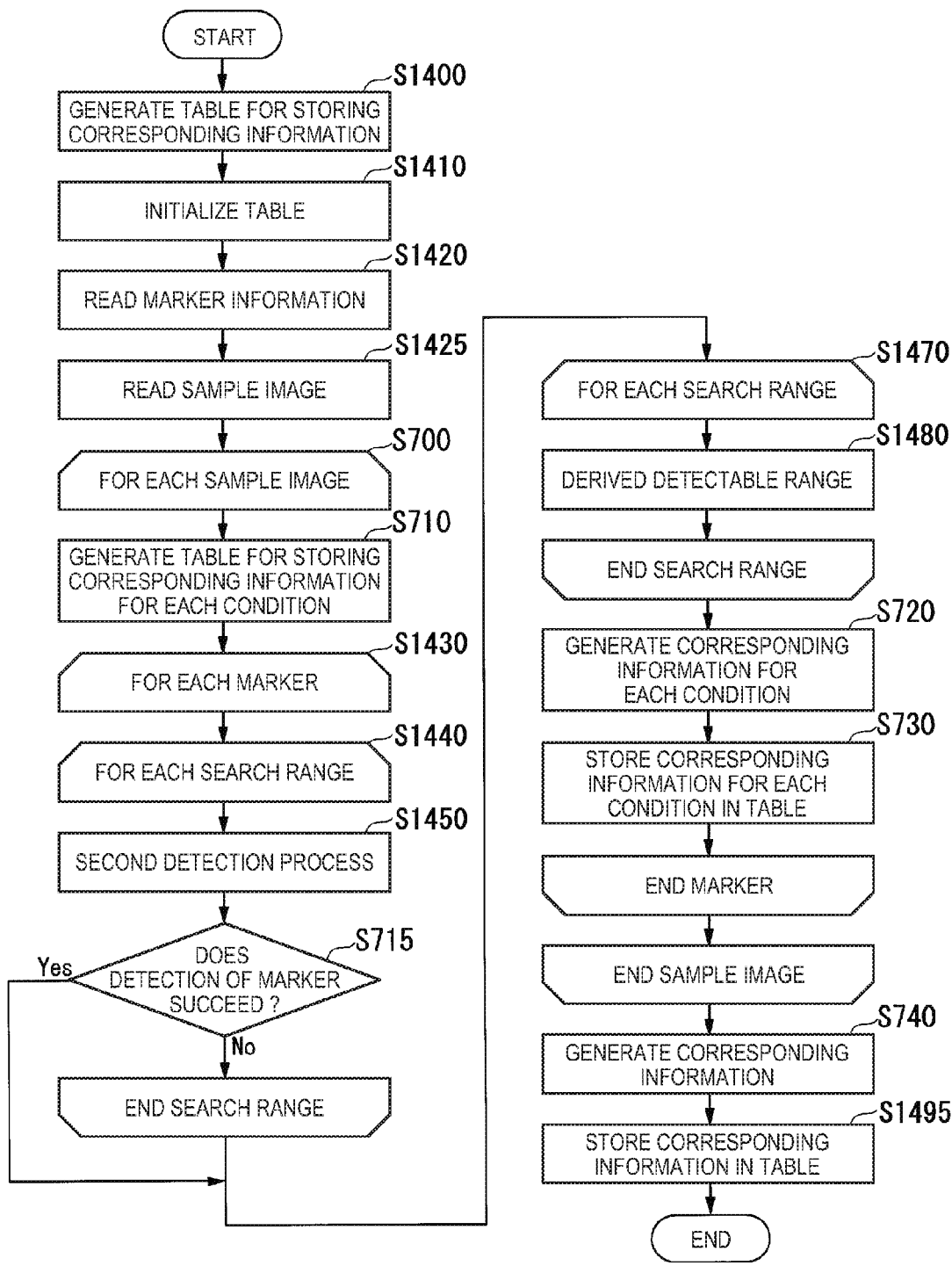
FIG. 46 is a flow chart illustrating an example of a flow of a process in which the robot control device generates the corresponding information according to a modified example of the embodiment.

With Respect to Flow of Process for Generating Corresponding Information According to Modified Example of Embodiment Hereinafter, a process in which the robot control device 130 generates the corresponding information according to the modified example of the embodiment with reference to FIG. 46. FIG. 46 is a flow chart illustrating an example of the flow of the process in which the robot control device 130 generates the corresponding information according to the modified example of the embodiment. Among the processes of the flow chart illustrated in FIG. 46, processes of Steps S1400 to S1425, processes of Steps S1430 to S1450, processes of Steps S1470 to S1480, and a process of Step S1495 are the same as the processes of Steps S1400 to S1425, the processes of Steps S1430 to S1450, the processes of Steps S1470 to S1480, and the process of Step S1495 illustrated in FIG. 43, and the descriptions thereof are omitted. Hereinafter, a case where the sample image reading portion 153 reads each of the sample images GS1 to GS3 which are three sample images different from each other in Step S1425 is described. The number of sample images that the sample image reading portion 153 reads from the storage portion 32 in Step S1425 may be any numbers, as long as the number is 2 or greater.

After the sample image reading portion 153 reads 2 or more sample images (in this example, the sample images GS1 to GS3) from the storage portion 32 in Step S1425, the corresponding information generating portion 154 selects the aforementioned sample images one by one and repeatedly performs processes (including processes from Steps S1430 to S1480) from Steps S710 to S730 for each selected sample image (Step S700).

After the sample image is selected in Step S700, the corresponding information generating portion 154 generates the table storing corresponding information for each condition that is generated for each sample image in the storage area of the storage portion 32. The corresponding information generating portion 154 initializes the aforementioned table generated in the storage area of the storage portion 32 (Step S710). For example, the corresponding information generating portion 154 stores null information in each field storing the information in the aforementioned table, as initialization of the aforementioned table. Instead of this, the corresponding information generating portion 154 may have a configuration of initializing the aforementioned table by another method.

As described above, the sample images have different image capturing conditions when the sample image is captured. Therefore, before the corresponding information is generated, the corresponding information generating portion 154 in this example generates corresponding information for each condition for each sample image and generates the corresponding information based on the generated corresponding information for each condition. The corresponding information for each condition is information in which the marker ID, the detectable minimum threshold value and the detectable maximum threshold value indicating the detectable range, the information illustrating whether the marker illustrated by the marker ID is detected in the second detection method (detection by the maximum likelihood estimation), and the binarized threshold value by the aforementioned second detection method are associated with each other as stored in the table illustrated in FIG. 47. FIG. 47 is a diagram of exemplifying corresponding information for each condition that is generated for each of the sample images GS1 to GS3. In this example, the information illustrating which the marker illustrated by the marker ID can be detected by the second detection method is "1", and the information illustrating which the aforementioned detection cannot be performed is "0". In this example, in a case where the aforementioned detection cannot be performed in the aforementioned binarized threshold value, null information is stored.

After detection of the target marker by the second detect process in Step S1450 is executed, the corresponding information generating portion 154 determines whether the detection of the target marker in Step S1450 succeeds or not (Step S715). In a case where it is determined that the detection of the target marker succeeds (Step S715-Yes), the corresponding information generating portion 154 proceeds to Step S1470 and repeatedly executes the process of Step S1480 for each search range which is set in the sample image in Step S1440. Meanwhile, in a case where it is determined that the detection of the target marker does not succeed (Step S715-No), the corresponding information generating portion 154 proceeds to Step S1440 and selects the next search range. In this example, since there is only one search range, in a case where it is determined that the detection of the target marker does not succeed, the corresponding information generating portion 154 proceeds to Step S1470 and repeatedly executes the process of Step S1480 for each search range which is set in the sample image in Step S1440.

After the process of Step S1480 is executed on all the search ranges in the processes of Steps S1470 to S1480, the corresponding information generating portion 154 generates the corresponding information for each condition in which the detectable minimum threshold value and the detectable maximum threshold value derived in Step S1480, the marker ID illustrating the target marker, the information illustrating whether the target marker is detected by the second detection method which is a result of determination in Step S715, and the binarized threshold value determined in Step S1450 are associated with each other (Step S720).

Subsequently, the corresponding information generating portion 154 stores the corresponding information generated in Step S720 in the table initialized in Step S710 (Step S730). The corresponding information generating portion 154 proceeds to Step S1430 and selects the next marker ID. In a case where an unselected marker ID does not exist in Step S1430, the corresponding information generating portion 154 proceeds to Step S700 and selects the next sample image. In a case where an unselected sample image does not exist in Step S700, the corresponding information generating portion 154 proceeds to Step S740 and generates the corresponding information based on the corresponding information for each condition generated in Step S720 (Step S740).

Figure 48:
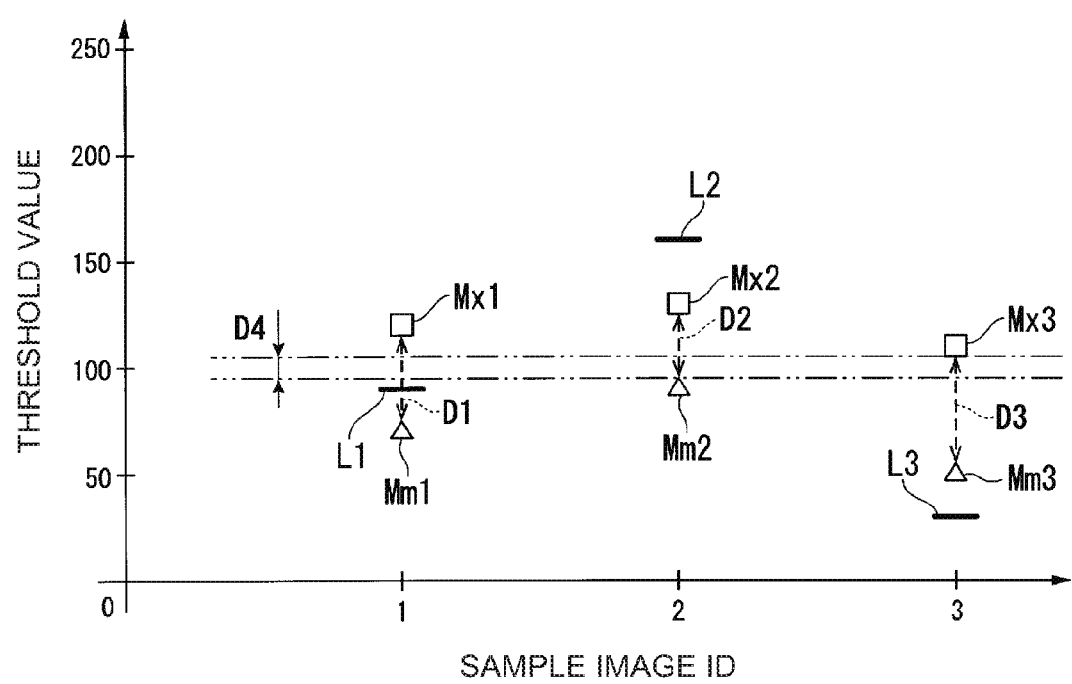
FIG. 48 is a diagram illustrating a process for generating corresponding information based on corresponding information for each condition.

Here, the process of Step S740 is described with reference to FIG. 48. FIG. 48 is a diagram illustrating a process for generating the corresponding information based on the corresponding information for each condition. With respect to the graph illustrated in FIG. 48, a horizontal axis illustrates a sample image ID identifying each sample image and a vertical axis illustrates luminance which is a binarized threshold value. In this example, the sample image ID of a sample image GS1 is "1", the sample image ID of a sample image GS2 is "2", and the sample image ID of a sample image GS3 is "3".

In the aforementioned graph, the detectable minimum value and the detectable maximum value in the corresponding information for each condition generated based on the aforementioned sample image and the binarized threshold value in the aforementioned corresponding information for each condition are plotted for each sample image illustrated by the sample image ID. The aforementioned binarized threshold value is a binarized threshold value in the second detection method. In the graph illustrated in FIG. 48, detectable minimum threshold values Mm1 to Mm3 in the corresponding information for each condition generated based on each sample image are respectively illustrated by outlined triangles, detectable maximum threshold values Mx1 to Mx3 in the aforementioned corresponding information for each condition are illustrated by outlined squares, and binarized threshold values L1 to L3 in the aforementioned corresponding information for each condition are respectively illustrated by horizontal bars in black heavy lines.

A range between the detectable minimum threshold value Mm1 and the detectable maximum threshold values Mx1 is a detectable range D1 derived based on the sample image GS1. A range between detectable minimum threshold value Mm2 and the detectable maximum threshold values Mx2 is a detectable range D2 derived based on the sample image GS2. A range between the detectable minimum threshold value Mm3 and the detectable maximum threshold values Mx3 is a detectable range D3 derived based on the sample image GS3.

Here, the corresponding information generating portion 154 specifies a maximum detectable minimum threshold value which is the greatest detectable minimum threshold value among the detectable minimum threshold values in each corresponding information for each condition generated based on each sample image. In the example illustrated in FIG. 48, the maximum detectable minimum threshold value is the detectable minimum threshold value Mm2. The corresponding information generating portion 154 specifies the minimum detectable maximum threshold value which is the smallest detectable maximum threshold value among the detectable maximum threshold values of the corresponding information for each condition generated based on the respective sample images. In the example illustrated in FIG. 48, the minimum detectable maximum threshold value is the detectable maximum threshold value Mx3.

The corresponding information generating portion 154 specifies a range between the minimum detectable maximum threshold value and the maximum detectable minimum threshold value, as a common detectable range D4. In the example illustrated in FIG. 48, a range between the detectable maximum threshold value Mx3 which is the minimum detectable maximum threshold value and the detectable minimum threshold value Mm2 which is the maximum detectable minimum threshold value is illustrated as the common detectable range D4. In a case where a common detectable range is a value of 1 or greater, the corresponding information generating portion 154 calculates an average value between the minimum detectable maximum threshold value and the maximum detectable minimum threshold value as the binarized threshold value (predetermined value) in the third detection method.

The corresponding information generating portion 154 associates the calculated aforementioned binarized threshold value with the marker ID illustrating the target marker as the information illustrating the third detection method. The corresponding information generating portion 154 generates the corresponding information by associating the minimum detectable maximum threshold value and the maximum detectable minimum threshold value in the common detectable range with the markers ID illustrating the target markers, as the detectable minimum threshold value and the detectable maximum threshold value indicating the detectable range of the target marker.

In a case where the common detectable range is a value of 0 or less, that is, in a case where a common detectable range does not exist, the corresponding information generating portion 154 determines whether the binarized threshold value calculated by the second detection method based on the aforementioned sample image in the detectable range derived based on the aforementioned sample image for each sample image is included or not. In a case where it is determined that all of the binarized threshold values calculated based on the aforementioned sample image are included in the detectable range derived based on the aforementioned sample image, the corresponding information generating portion 154 associates the information illustrating the second detection method with the marker ID illustrating the target marker. The corresponding information generating portion 154 generates corresponding information by associating the null information with the marker ID illustrating the target marker as the detectable minimum threshold value and the detectable maximum threshold value indicating the detectable range of the target marker.

Meanwhile, in a case where it is determined that at least one of the binarized threshold values calculated based on the aforementioned sample image is not included in the detectable range derived based on the aforementioned sample image, the corresponding information generating portion 154 associates the information illustrating the first detection method with the marker ID illustrating the target marker. The corresponding information generating portion 154 generates corresponding information in which the null information is associated with the marker ID illustrating the target marker as the detectable minimum threshold value and the detectable maximum threshold value indicating the detectable range of the target marker.

In the example illustrated in FIG. 48, a binarized threshold value L2 is not included in the detectable range D2, and further the binarized threshold value L3 is not included in the detectable range D3. Therefore, the corresponding information generating portion 154 determines that at least one of the binarized threshold values calculated based on the aforementioned sample image is not included in the detectable range derived based on the aforementioned sample image.

In this manner, the robot control device 130 generates or more sample images having different image capturing conditions and corresponding information based on the marker information. Accordingly, the robot control device 130 can obtain the same effect as the embodiment. As a result, the robot control device 130 can make the improvement in the detection accuracy of the marker and the shortening of the detection time of the marker be compatible with each other.

Figure 49:
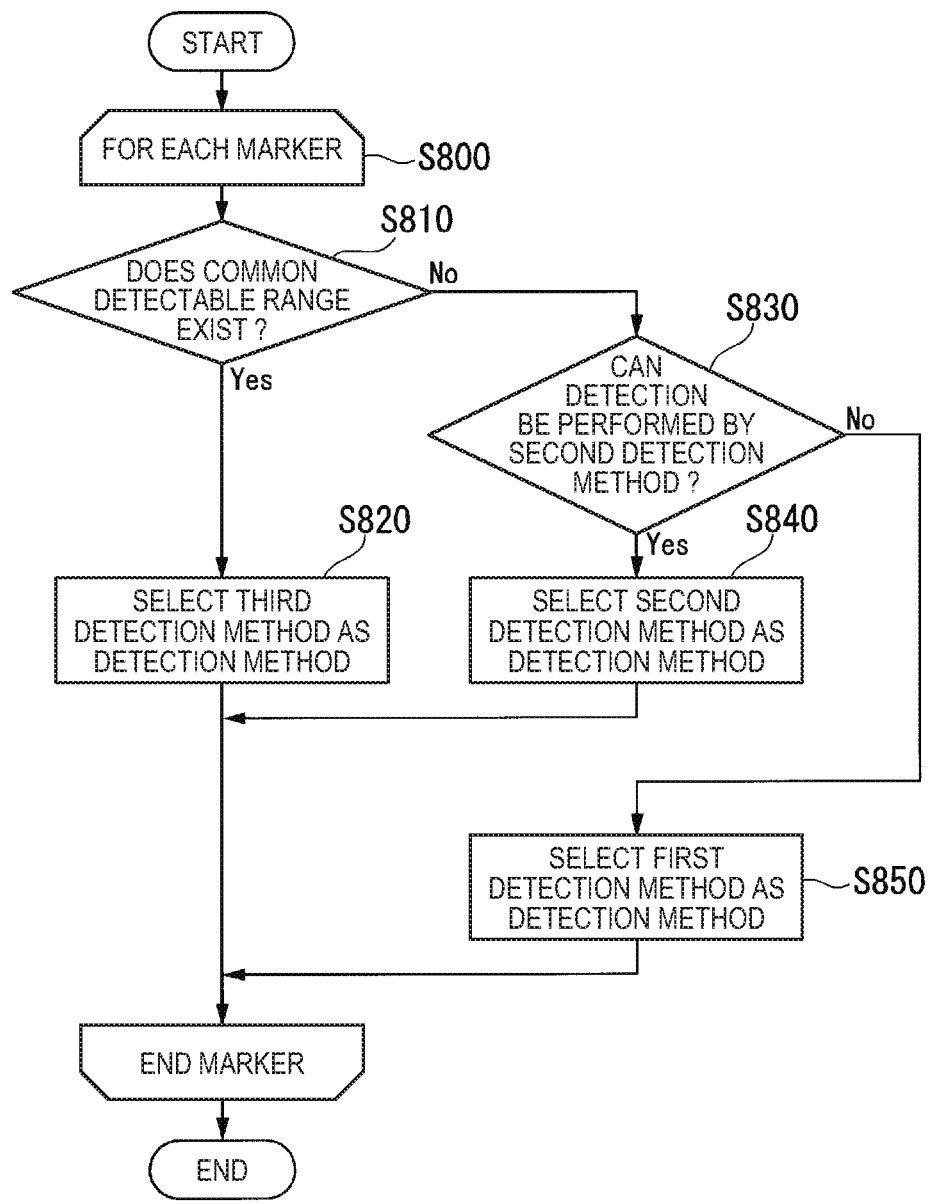
FIG. 49 is a flow chart illustrating an example of a flow of a determining method of a marker detection method by the user according to a modified example of the embodiment.

With Respect to Flow of Process for Editing Corresponding Information in Modification of Embodiment Hereinafter, the determining method of the marker detection method by the user in a case where the user changes a marker detection method associated with the marker ID among the edition of the corresponding information performed by the user is described with reference to FIG. 49. FIG. 49 is a flow chart illustrating an example of a flow of the determining method of the marker detection method by the user according to the modified example of the embodiment. Instead of the user, the process in the flow chart illustrated in FIG. 49 may have a configuration of being performed by the functional portion included in the robot control device 130.

The user selects the markers ID included in the marker information one by one and performs processes of Steps S810 to S850 for each target marker, using the marker illustrated by the selected marker ID as the target marker (Step S800).

Subsequently, the user determines whether the common detectable range is a value of 1 or greater based on the corresponding information for each condition (Step S810). In a case where it is determined that the common detectable range is a value of 1 or greater (Step S810-Yes), the user selects the third detection method as the marker detection method of the target marker (Step S820). This is because it is desired to cause the robot control device 130 to preferentially select a method having the shortest detection time of the target marker.

Meanwhile, in a case where it is determined that the common detectable range is not a value of 1 or greater (Step S810-No), the user determines whether the target marker can be detected by the second detection method based on the corresponding information for each condition or not (Step S830). Specifically, in a case where all of the binarized threshold values calculated by the second detection method based on the aforementioned sample images in the detectable range derived based on the aforementioned sample images are included for each sample image, the user determines that the target marker can be detected by the second detection method based on the corresponding information for each condition.

In a case where it is determined that the target marker can be detected by the second detection method (Step S830-Yes), the user selects the second detection method as the marker detection method of the target marker (Step S840). This is because the second detection method has a shorter detection time than the first detection method. Meanwhile, in a case where it is determined that the target marker cannot be detected by the second detection method (Step S830-No), the user selects the first detection method as the marker detection method of the target marker (Step S850).

In this manner, the user determines the marker detection method for each of the plural markers. In this manner, the user can associate marker detection method appropriate for detecting the aforementioned marker with the aforementioned marker for each of the plural markers. As a result, the robot control device 130 can more reliably cause the improvement in the detection accuracy of the marker and the shortening of the detection time of the marker are compatible with each other.

Among the plural markers described above, two markers (for example, two markers of marker associated with first detection method and marker associated with second detection method) respectively associated with the different marker detection method are examples of the first marker and the second marker.

As described above, the robot control device 130 (or image processing device independent from the robot control device 130) of the robot 120 according to the embodiment can detect the markers (in this example, the markers Mk11 to MkN) by the plural marker detection methods and detects the markers by one marker detection method among the plural marker detection methods. Accordingly, the robot control device 130 can make the improvement in the detection accuracy of the marker and the shortening of the detection time of the marker be compatible with each other.

When the markers associated with the first detection method among the plural markers are detected, the robot control device 130 detects the marker by changing the threshold value for detecting the marker from the image (in this example, captured image) in the predetermined range. Accordingly, when the markers associated with the first detection method among the plural markers are detected, the robot control device 130 can improve the detection accuracy of the marker.

When detecting the marker associated with the second detection method among the plural markers, the robot control device 130 detects the marker using a value (in this example, value obtained by Otsu's method) obtained by the maximum likelihood estimation as the threshold value for detecting the marker from the image. Accordingly, the marker associated with the second detection method among the plural markers is detected, the robot control device 130 can shorten the detection time of the marker.

When the marker associated with the third detection method among the plural markers is detected, the robot control device 130 detects the marker using the predetermined value as the threshold value for detecting the marker from the image. Accordingly, when the marker associated with the third detection method among the plural markers is detected, the robot control device 130 can shorten the detection time of the marker.

The robot control device 130 detects the marker by the detection method of the marker using the threshold value (in this example, binarized threshold value) for detecting the marker from the image and for binarizing the aforementioned image. Accordingly, the robot control device 130 can make the improvement in the detection accuracy of the marker and the shortening of the detection time of the marker be compatible with each other, by the detection method of the marker using the threshold value for binarizing the image.

The robot control device 130 detects a marker by the detection method of the marker using the threshold value for determining the color of the aforementioned image and for detecting the marker from the image. Accordingly, the robot control device 130 can make the improvement in the detection accuracy of the marker and the shortening of the detection time of the marker be compatible with each other by the detection method of the marker using the threshold value for determining the color of the image.

The robot control device 130 detects the marker based on the table (in this example, table in which corresponding information is stored) in which the marker and the detection method of the marker are associated with each other. Accordingly, the robot control device 130 can make the improvement in the detection accuracy of the marker and the shortening of the detection time of the marker be compatible with each other based on the table in which the markers and the detection methods of the marker are associated with each other.

The robot control device 130 determines the detection method of the first marker, based on the first marker (in this example, the markers Mk11 to MkN included in captured image) included in the image and the first marker (in this example, the markers Mk11 to MkN included in sample image) included in the image having different image capturing condition from that of the aforementioned image. Accordingly, the robot control device 130 can make the improvement in the detection accuracy of the marker and the shortening of the detection time of the marker be compatible with each other by the detection method of the first marker determined based on the first marker included in the image and the first marker included in the image having a different image capturing condition from that of the aforementioned image.

The robot control device 130 can edit the detection method of the first marker by causing the display portion to display the threshold value for detecting the first marker included in the image and the threshold value for detecting the first marker included in the image having a different image capturing condition from that of the aforementioned image. Accordingly, the robot control device 130 can make the improvement in the detection accuracy of the marker and the shortening of the detection time of the marker be compatible with each other by the edited detection method of the first marker.

The image process portion 144 in the control portion 136 may be different from the robot control device 130 as the image processing device. In this case, the robot 120, the robot control device 130, and the aforementioned image processing device configure the robot system. In this case, the image processing device may have a configuration of outputting the information based on the detected marker to another device different from the robot control device 130 and causing the aforementioned another device to display the aforementioned information such as augmented reality (AR). The information based on the detected marker is information associated with the aforementioned marker.

A portion or all of the first image capturing portion 21, the second image capturing portion 22, the third image capturing portion 23, and the fourth image capturing portion 24 may be an image capturing portion independent from the robot 120. In this case, the robot 120, the image capturing portion independent from the robot 120, the robot control device 130, and the image processing device configure the robot system.

Third Embodiment

Hereinafter, a third embodiment is described with reference to drawings. According to the present embodiment, differences from the embodiments described above are mainly described, the same components are denoted by the same reference numerals, and descriptions thereof may be omitted or simplified.

Figure 50:
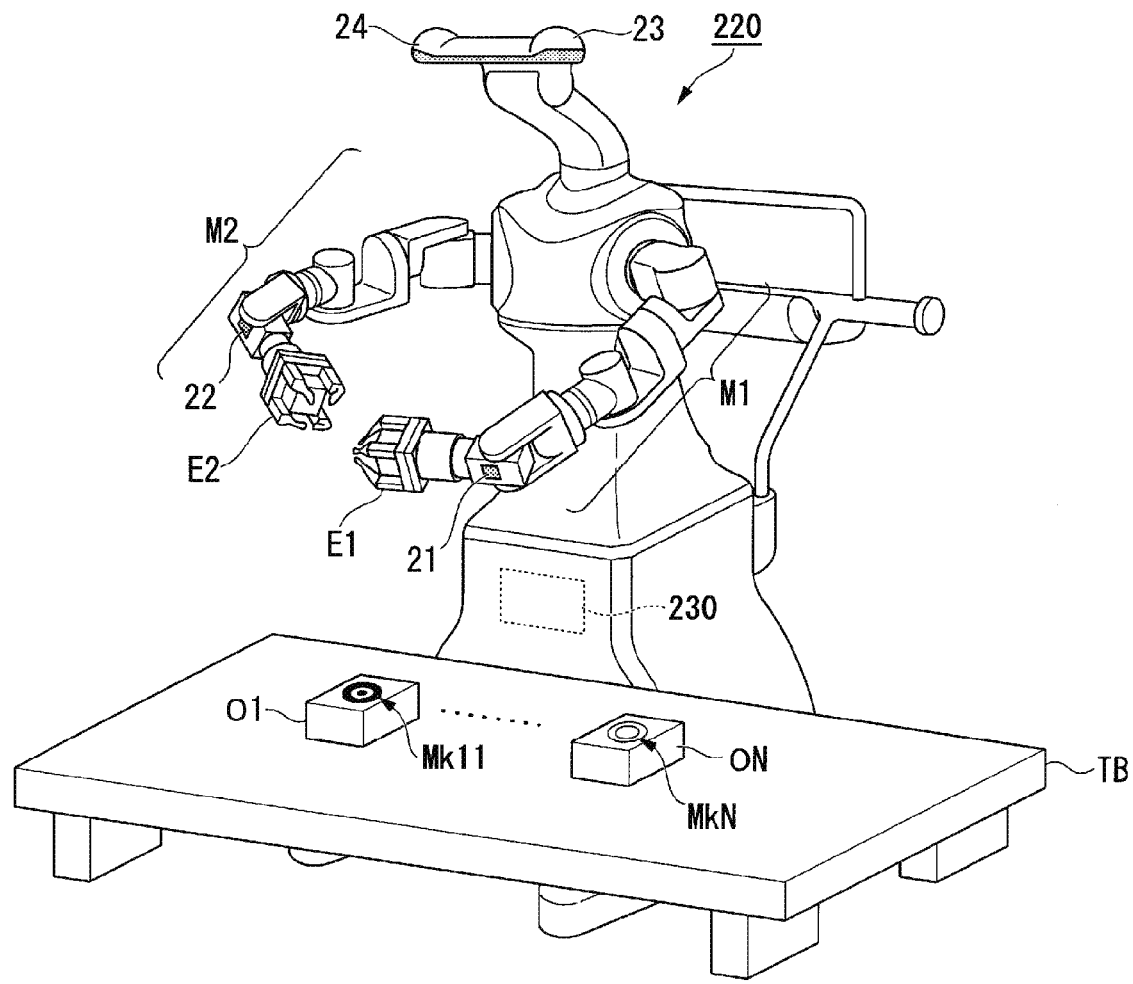
FIG. 50 is a configuration diagram illustrating an example of a robot according to the third embodiment.

FIG. 50 is a configuration diagram illustrating an example of a robot 220 according to the third embodiment.
Configuration of Robot 220

First, a configuration of the robot 220 is described.

The robot 220 is a double arm robot including a first arm, a second arm, a support supporting the first arm and the second arm, and a robot control device 230. The double arm robot is a robot including two arms such as a first arm and a second arm in this example. The robot 220 is a single arm robot, instead of a double arm robot. The single arm robot is a robot including one arm. For example, the single arm robot includes any one of a first arm and a second arm. The robot 220 may be a duplex arm robot including three or more arms, instead of a double arm robot.

The first arm includes a first end effector E1 and a first manipulator M1. The first arm according to the present embodiment is the same as that according to the embodiments above, and thus descriptions thereof are omitted.

The first end effector E1 is communicably connected to the robot control device 230 via cables. Accordingly, the first end effector E1 performs an operation based on a control signal acquired from the robot control device 230. For example, cable communication via cables is performed by standards such as Ethernet (Registered trademark) or universal serial bus (USB). The first end effector E1 may be a configuration connected to the robot control device 230 via wireless communication performed by communication standard such as Wi-Fi (Registered trademark).

The seven actuators (included in the joints) included in the first manipulator M1 are respectively communicably connected to the robot control device 230 via cables. Accordingly, the aforementioned actuators operates the first manipulator M1 based on a control signal acquired from the robot control device 230. The cable communication via the cables is performed, for example, by standards such as Ethernet (Registered trademark) or USB. A portion or all of the seven actuators included in the first manipulator M1 may have a configuration of being connected to the robot control device 230 via wireless communication performed by communication standard such as Wi-Fi (Registered trademark).

The first image capturing portion 21 is the same as that according to the embodiments above, and thus descriptions thereof are omitted.

The first image capturing portion 21 is communicably connected to the robot control device 230 via cables. The cable communication via the cables is performed, for example, by standards such as Ethernet (Registered trademark) or USB. The first image capturing portion 21 may have a configuration of being connected to the robot control device 230 by wireless communication performed by communication standards such as Wi-Fi (Registered trademark).

The second arm includes the second end effector E2 and the second manipulator M2. The second arm according to the present embodiment is the same as that according to the embodiments above, and thus descriptions thereof are omitted.

The second end effector E2 is communicably connected to the robot control device 230 via the cables. Accordingly, the second end effector E2 performs an operation based on a control signal acquired from the robot control device 230. The cable communication via the cables is performed, for example, by standard such as Ethernet (Registered trademark) or USB. The second end effector E2 may have a configuration of being connected to the robot control device 230 by wireless communication performed by communication standard such as Wi-Fi (Registered trademark).

The seven actuators (included in the joints) included in the second manipulator M2 are respectively communicably connected to the robot control device 230 via cables. Accordingly, the aforementioned actuators operates the second manipulator M2 based on a control signal acquired from the robot control device 230. The cable communication via the cables is performed, for example, by standards such as Ethernet (Registered trademark) or USB. A portion or all of the seven actuators included in the second manipulator M2 may have a configuration of being connected to the robot control device 230 via wireless communication performed by communication standard such as Wi-Fi (Registered trademark).

The second image capturing portion 22 is the same as that according to the embodiments above, and thus descriptions thereof are omitted.

The second image capturing portion 22 is communicably connected to the robot control device 230 via cables. The cable communication via the cables is performed, for example, by standards such as Ethernet (Registered trademark) or USB. The second image capturing portion 22 may have a configuration of being connected to the robot control device 230 by wireless communication performed by communication standards such as Wi-Fi (Registered trademark).

The robot 220 includes the third image capturing portion 23 and the fourth image capturing portion 24. The third image capturing portion 23, the fourth image capturing portion 24 according to the present embodiment are the same as those according to the embodiments above, and thus descriptions thereof are omitted.

The third image capturing portion 23 is communicably connected to the robot control device 230 via the cables. The cable communication via the cables is performed, for example, by standards such as Ethernet (Registered trademark) or USB. The third image capturing portion 23 may have a configuration of being connected to the robot control device 230 by wireless communication performed by communication standards such as Wi-Fi (Registered trademark).

The fourth image capturing portion 24 is communicably connected to the robot control device 230 via the cables. The cable communication via the cables is performed, for example, by standards such as Ethernet (Registered trademark) or USB. The fourth image capturing portion 24 may have a configuration of being connected to the robot control device 230 by wireless communication performed by communication standards such as Wi-Fi (Registered trademark).

The respective functional portions that the robot 220 include, for example, acquires control signals from the robot control device 230 built in the robot 220. The aforementioned respective functional portions perform operations based on the acquired control signals. The robot 220 may have a configuration of being controlled by the robot control device 230 installed on an external portion, instead of the configuration in which the robot control device 230 is built.

In this case, the robot 220 and the robot control device 230 configure a robot system. The robot 220 may have a configuration of not including at least a portion of the first image capturing portion 21, the second image capturing portion 22, the third image capturing portion 23, or the fourth image capturing portion 24.

The robot control device 230 operates the robot 220 by transmitting a control signal to the robot 220. Accordingly, the robot control device 230 causes the robot 220 to perform a predetermined work.

Overview of Predetermined Work Performed by Robot 220

Hereinafter, an overview of the predetermined work performed by the robot 220 is described.

In this example, the robot 220 grips an object disposed a work area which is an area in which a work can be performed by both of the first arm and the second arm and performs a work of supplying (disposing) the gripped object to a material supplying area (not illustrated), as a predetermined work. The robot 220 may have a configuration of performing other works instead of this, as the predetermined work. The work area may be an area in which a work can be performed by any one of the first arm and the second arm.

In this example illustrated in FIG. 50, the work area is an area including an upper surface of a workbench TB. The workbench TB is, for example, a table. The workbench TB may be another object such as a floor or a shelf, instead of the table. N target objects O1 to ON are disposed as the object that the robot 220 grips, on an upper surface of the workbench TB. N is an integer of 1 or greater.

Each of the target objects O1 to ON is, for example, an industrial component or an industrial member such as a plate, a screw, or a bolt mounted in a product. In FIG. 50, in order to simplify drawings, the target objects O1 to ON are respectively illustrated as objects in a rectangular shape. Each of the target objects O1 to ON may be other objects such as a commodity or an organism instead of an industrial component or an industrial member. The respective shapes of the target objects O1 to ON may be other shapes instead of the rectangular shape. A portion of all of respective shapes of the target objects O1 to ON may be identical to each other or may be different from each other.

Overview of Process Performed by the Robot Control Device 230

Hereinafter, an overview of a process performed by the robot control device 230 is described, in order to cause the robot 220 to perform a predetermined work.

The robot control device 230 causes the robot 220 to capture a range including a work area as a capture range. The robot control device 230 acquires captured images that the robot 220 captures. The robot control device 230 detects a marker attached in the work area based on the acquired captured images. The robot control device 230 causes the robot 220 to perform a predetermined work according to the detected marker.

In this example, the marker attached in the work area is attached to each of the target objects O1 to ON disposed on the upper surface of the workbench TB in the work area. Instead of this, a portion or all of the marker attached to the work area may have a configuration of being attached to other objects of the target objects O1 to ON in the work area, the upper surface of the workbench TB, or the like.

The target objects O1 to ON are attached respectively to markers different from each other. These markers respectively illustrate positions of the target objects O1 to the ON in the robot coordinate system. For example, the marker Mk11 attached to the target object O1 illustrates a position of the target object O1 in the robot coordinate system. A marker MkN attached to the target object ON illustrates a position of the target object ON in the robot coordinate system. A portion or all of the markers attached to the target objects O1 to ON are the same marker. Respective markers may have a configuration of illustrating other information such as a configuration of illustrating an operation of the robot 220, instead of the configuration of illustrating the positions of the target objects O1 to ON in the robot coordinate system.

The robot control device 230 in this example causes the third image capturing portion 23 and the fourth image capturing portion 24 to stereoscopically capture the capture range. The robot control device 230 acquires captured images that the third image capturing portion 23 and the fourth image capturing portion 24 stereoscopically capture. The robot control device 230 detects each of N markers Mk11 to MkN respectively attached to the target objects O1 to ON based on the acquired captured images.

The robot control device 230 calculates positions of each of the detected markers Mk11 to MkN illustrate in the robot coordinate system. The robot control device 230 causes the robot 220 to grip each of the target objects O1 to ON one by one, based on the calculated positions and supplies the target objects O1 to ON to the material supplying area (not illustrated). In this example, the robot control device 230 causes the first arm to grip the target objects O1 to ON one by one and supplies the target objects O1 to ON to the material supplying area (not illustrated). Instead of this, the robot control device 230 may have a configuration of causing the second arm to grip each of the target objects O1 to ON one by one or may have another configuration such as a configuration of causing both of the first arm and the second arm to grip each of the target objects O1 to ON one by one.

When the marker is detected from the captured image, the robot control device 230 converts the captured image into a grayscale image (grayscale process). In this example, the robot control device 230 converts the captured image into a 256 gradation grayscale image in the grayscale process of the captured image. The robot control device 230 converts the grayscale image converted in the grayscale process, into a binarized image (monochrome image) (binarization process). The binarization process is a process for converting a grayscale image into a binarized image by converting a color of a pixel having luminance of a predetermined threshold value or greater on a grayscale image into white and converting a pixel having luminance of less than the aforementioned threshold value into black. In this example, a binarized threshold value is luminance that is determined (selected) for each marker detected by the robot control device 230 and is luminance indicated by any one integer determined (selected) in the range from 0 to 255. The robot control device 230 may have a configuration of converting the captured image into another gradation grayscale image, instead of the configuration of converting the captured image into a 256 gradation grayscale image.

The accuracy in which the robot control device 230 detects the marker from the captured image is changed according to the luminance selected as the predetermined threshold value when this binarization process is performed. Specifically, in a case where the luminance appropriate for detecting the marker is not selected as the predetermined threshold value and luminance that is not appropriate for detecting the marker is selected, the robot control device 230 may not detect a portion or all of the N markers in some cases. In this example, the luminance appropriate for detecting the marker as the predetermined threshold value is a value for realizing the binarization process for converting the captured image to the binarized image that can detect all N markers from the captured image including N markers. Instead of this, the luminance appropriate for detecting the marker as the predetermined threshold value may be another value such as a value for realizing the binarization process for converting the captured image into the binarized image that can detect N markers by a predetermined number or more from the captured image including the N markers or a value for realizing the binarization process for converting the captured image into the binarized image that can cause the most markers to be detected from the captured image including N markers.

When a predetermined work is performed in the robot 220, the robot control device 230 performs a process for determining the threshold value for converting the captured image into the binarized image in advance. According to the present embodiment, a process in which the robot control device 230 determines the aforementioned threshold value is described. Here, an overview of the aforementioned process is described. The robot control device 230 determines the first threshold value which is the threshold value for binarizing at least a portion of the image (for example, captured image described above) included in one or more markers based on the number of markers detected from the aforementioned image. Accordingly, the robot control device 230 can detect the marker with high accuracy and as a result, all the markers included in the image can be detected.

Details of Marker

Hereinafter, details of the marker that the robot control device 230 detects from the captured image are described. The marker (that is, each of the markers Mk11 to MkN) is the figure center marker. Here, the figure center marker and the figure center of the figure center marker are the same as those according to the second embodiment, and thus descriptions thereof are omitted.

In this example, a position of the object (for example, each of the target objects O1 to ON illustrated in FIG. 50) to which these figure center marker are attached is indicated by the position of the figure center of the aforementioned figure center marker. The position of the figure center of the aforementioned figure center marker is indicated by a vector (average of three or more vectors) obtained by dividing the sum of the vectors illustrating the positions of the three or more figure centers included in the predetermined range by the number of figure centers. Instead of this, the position of the object to which the aforementioned figure center marker is attached may have a configuration of being indicated by another position associated with the position of the figure center of the aforementioned figure center marker. The robot control device 230 according to the present embodiment detects each of the markers Mk11 to MkN that are figure center markers illustrated in FIGS. 9 to 11, 30, and 31 from the captured image and calculates a position of a figure center of each of the detected markers Mk11 to MkN as a position of each of the target objects O1 to ON.

Instead of these figure center markers, the marker that the robot control device 230 detects may be another marker such as a color marker, a barcode, or a QR code (Registered trademark).

Relationship with Binarized Threshold Value and Accuracy in which the Robot Control Device 230 Detects Marker Hereinafter, a relationship with the binarized threshold value and accuracy in which the robot control device 230 detects a marker is described with reference to FIGS. 51 to 55.

Figure 51:
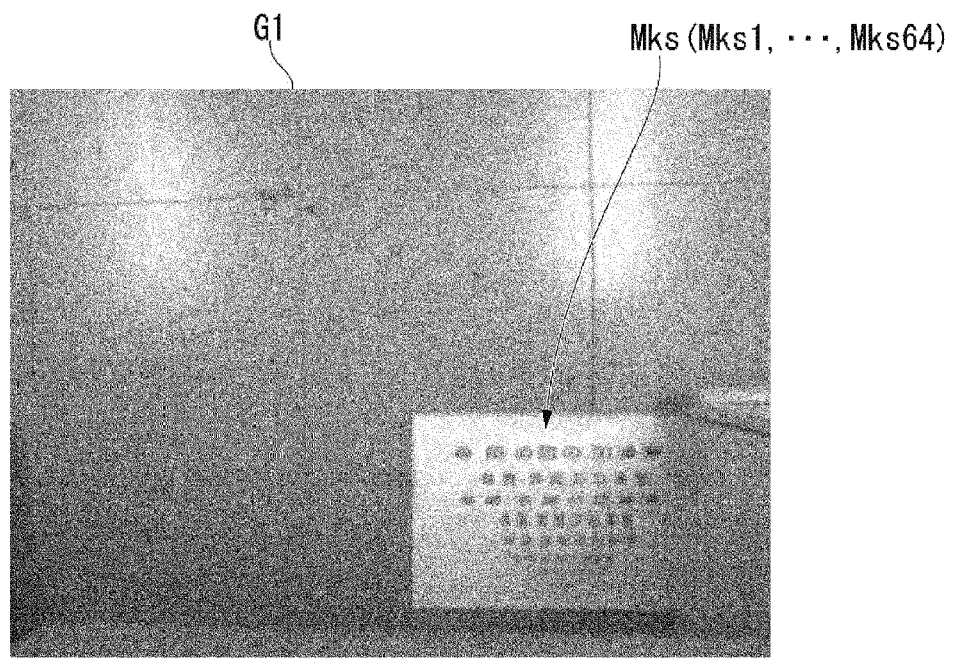
FIG. 51 is a diagram illustrating an example of a captured image including 64 figure center markers.

FIG. 51 is a diagram illustrating an example of the captured image including 64 figure center markers. 64 figure center markers Mks of markers Mks1 to Mks64 are included in a captured image G1 illustrated in FIG. 51. In a case where the robot control device 230 selects the luminance that is not appropriate for detecting the marker as the binarized threshold value of the captured image G1, the binarized image obtained by binarizing the captured image G1 by the robot control device 230 becomes the binarized image G2 illustrated in FIG. 52.

Figure 52:
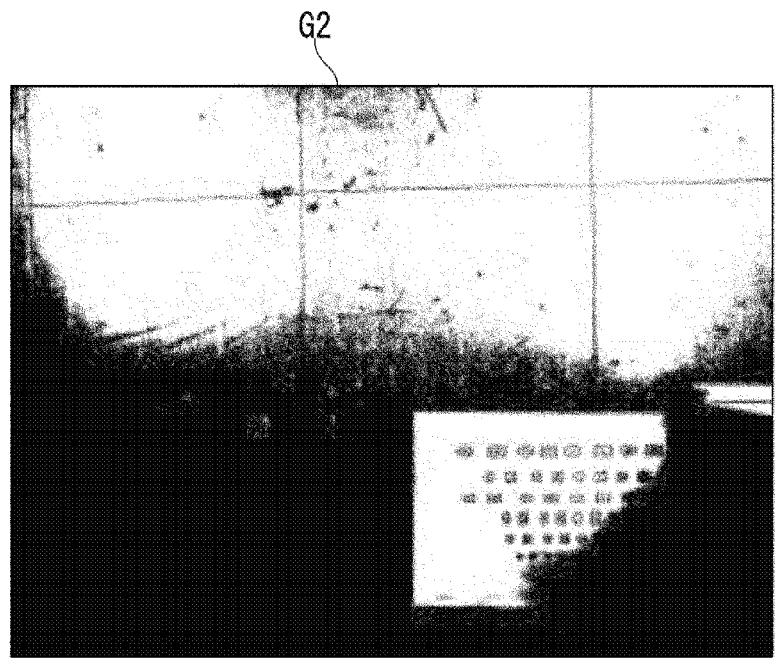
FIG. 52 is a diagram illustrating an example of a binarized image in a case where a robot control device binarizes the captured image G1 illustrated in FIG. 51 based on luminance that is not appropriate for detecting the marker.

FIG. 52 is a diagram illustrating an example of a binarized image in a case where the robot control device 230 binarizes the captured image G1 illustrated in FIG. 51 based on the luminance that is not appropriate for detecting the marker. As illustrated in FIG. 52, at least a portion of the 64 figure center markers included in the captured image G1 blackens out in the binarized image G2 in which the robot control device 230 binarizes the captured image G1 illustrated in FIG. 51 based on the luminance that is not appropriate for detecting the marker.

Figure 53:
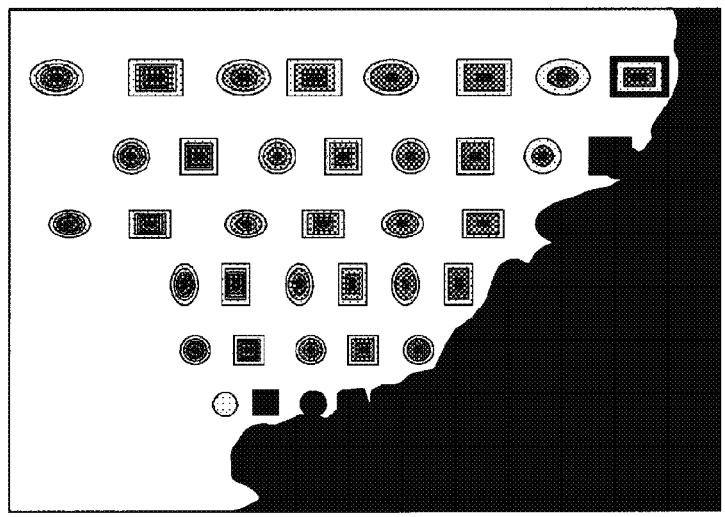
FIG. 53 is a diagram of exemplifying each of the three or more figures that configures figure center markers that are detected by the robot control device from the binarized image G2 illustrated in FIG. 52.

FIG. 53 is a diagram of exemplifying each of the three or more figures that configures the figure center markers that is detected by the robot control device 230 from the binarized image G2 illustrated in FIG. 52. In FIG. 53, the aforementioned figures are respectively differentiated according to the difference of hatching. As illustrated in FIG. 53, a portion of the three or more figures that configure the figure center markers detected by the robot control device 230 from the binarized image G2 blackens out, another portion thereof is detected as figures in shapes different from the original, a portion of the three or more figures that configures the figure center markers is detected as one figure in still another portion, and the rest portion is normally detected. That is, the robot control device 230 cannot detect figure center markers of all of the markers Mks1 to Mks64 from the binarized image G2 obtained by binarizing the captured image G1 based on the luminance that is not appropriate for detecting the marker.

Figure 54:
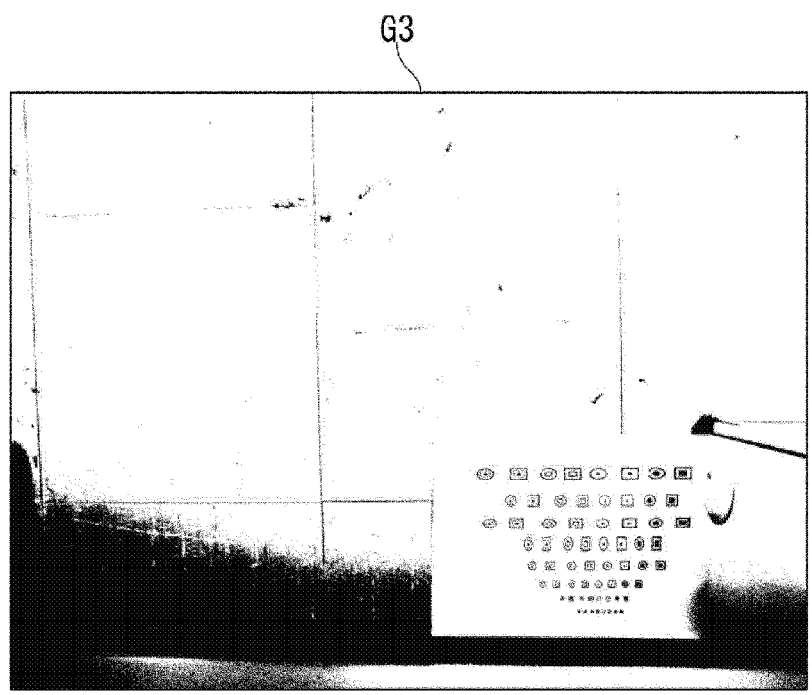
FIG. 54 is a diagram illustrating an example of a binarized image in a case where the robot control device binarizes the captured image G1 illustrated in FIG. 51 based on luminance appropriate for detecting the marker.

Meanwhile, FIG. 54 is a diagram illustrating an example of a binarized image in a case where the robot control device 230 binarizes the captured image G1 illustrated in FIG. 51 based on the luminance appropriate for detecting the marker. As illustrated in FIG. 54, in a binarized image G3 obtained by binarizing the captured image G1 illustrated in FIG. 51 by the robot control device 230 based on the luminance appropriate for detecting the marker, all of the 64 figure center markers included in the captured image G1 do not blacken out.

Figure 55:
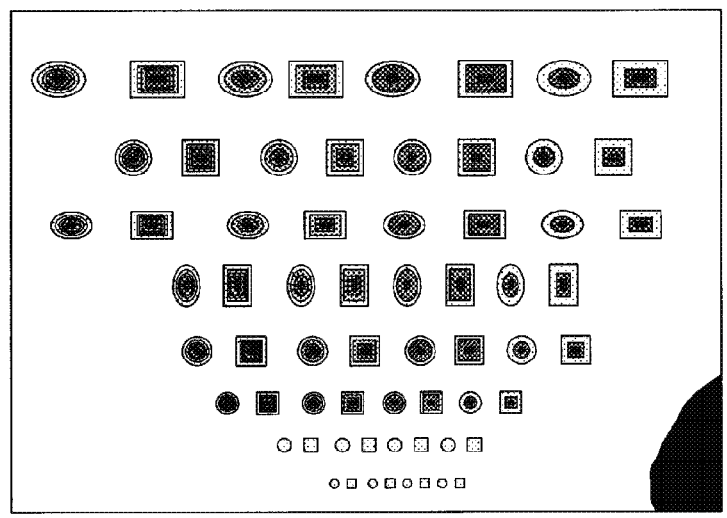
FIG. 55 is a diagram of exemplifying each of the three or more figures that configure the figure center markers detected by the robot control device from the binarized image G2 illustrated in FIG. 54.

FIG. 55 is a diagram of exemplifying each of the three or more figures that configure the figure center markers detected by the robot control device 230 from the binarized image G2 illustrated in FIG. 54. In FIG. 55, the aforementioned figures are respectively differentiated according to the difference of hatching. As illustrated in FIG. 55, all of the three or more figures that configure the figure center markers detected by the robot control device 230 from the binarized image G3 are normally detected. That is, the robot control device 230 can detect all desired figure center markers of the marker Mks1 to the marker Mks64, from the binarized image G3 obtained by binarizing the captured image G1 based on luminance appropriate for detecting the marker.

In this manner, in a case where the luminance selected as the binarized threshold value is luminance that is not appropriate for detecting the target marker, the robot control device 230 cannot detect the target marker in some cases. However, in a case where the luminance selected as the binarized threshold value is luminance appropriate for detecting the target marker, the robot control device 230 can detect the target marker. Therefore, selecting luminance appropriate for detecting the target marker by the robot control device 230 as the binarized threshold value is important for the robot control device 230 to cause the robot 220 to perform a work with high accuracy.

Hardware Configuration of Robot Control Device 230

Figure 56:
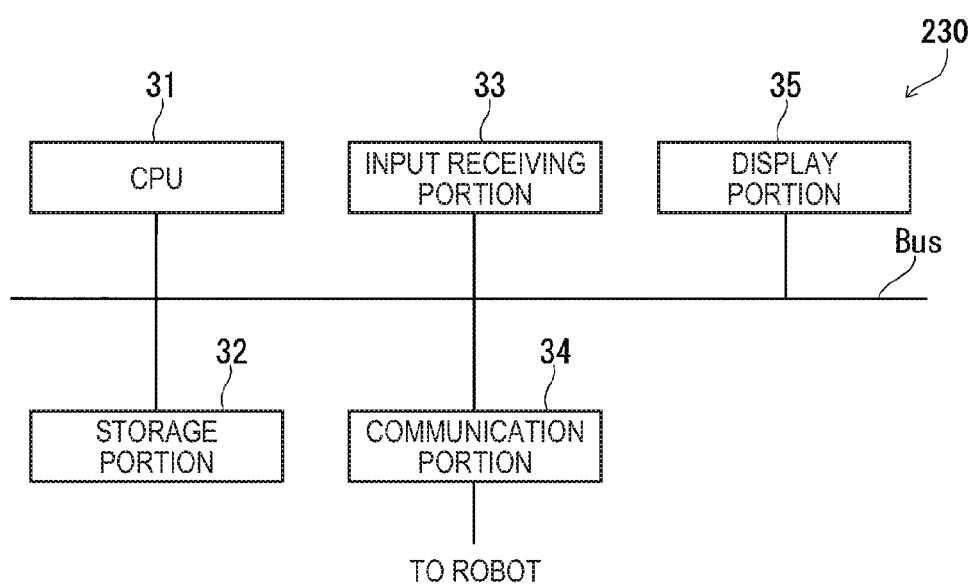
FIG. 56 is a diagram illustrating an example of a hardware configuration of the robot control device.

Hereinafter, hardware configuration of the robot control device 230 is described with reference to FIG. 56. FIG. 56 is a diagram illustrating an example of the hardware configuration of the robot control device 230. For example, the robot control device 230 includes the central processing unit (CPU) 31, the storage portion 32, the input receiving portion 33, the communication portion 34, and the display portion 35. The robot control device 230 performs a communication with the robot 220 via the communication portion 34. These components are communicably connected to each other via the buses Bus.

The CPU 31, the storage portion 32, the input receiving portion 33, the communication portion 34, and the display portion 35 are the same as those according to the embodiments above, and thus descriptions thereof are omitted.

Instead of being built in the robot control device 230, the storage portion 32 may be an external storage device connected by a digital input-output port such as USB. The storage portion 32 stores various items of information, images, or programs that the robot control device 230 processes or information illustrating a position of the material supplying area (not illustrated).

Functional Configuration of Robot Control Device 230

Figure 57:
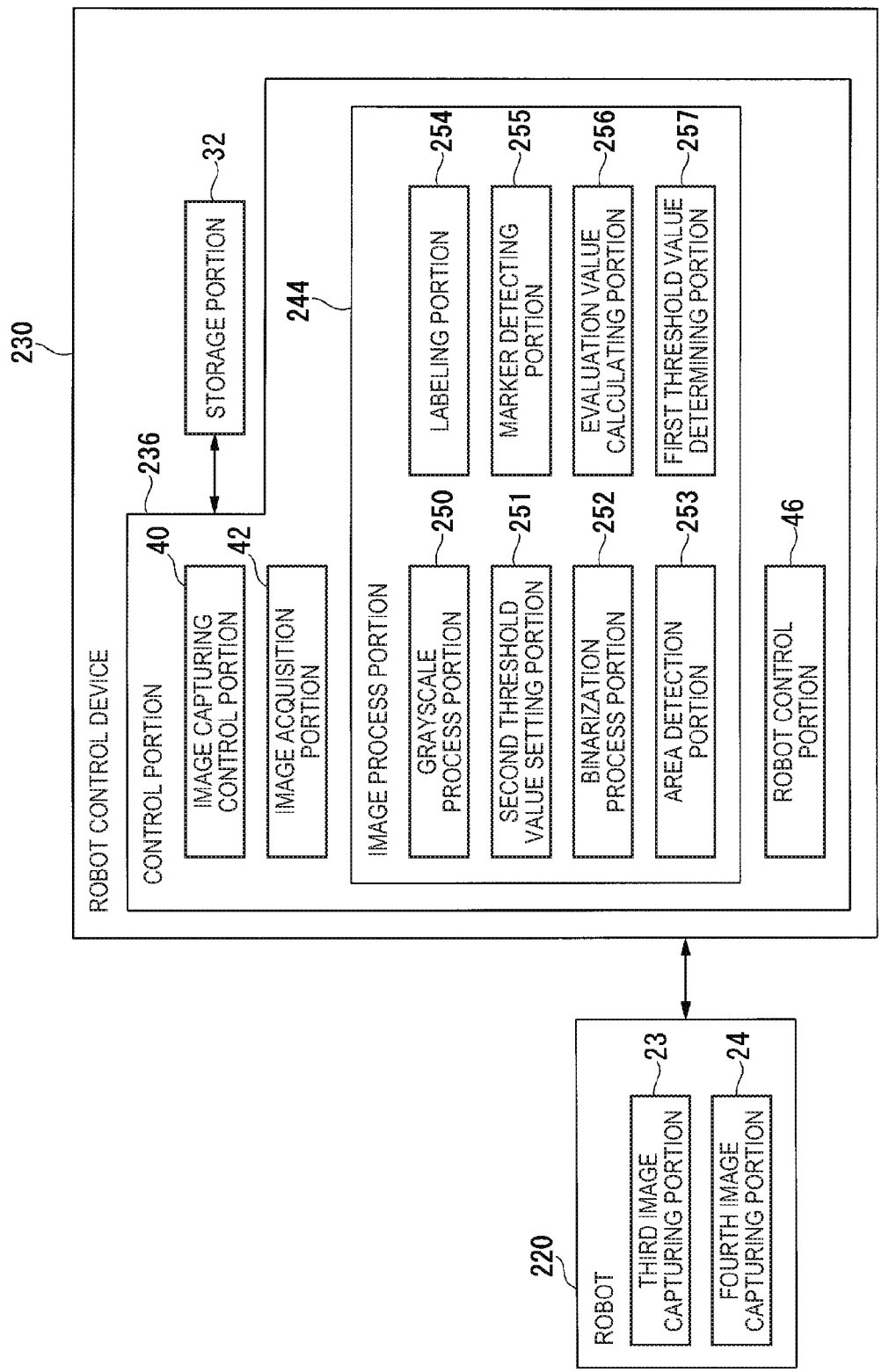
FIG. 57 is a diagram illustrating an example of the functional configuration of the robot control device.

Hereinafter, the functional configuration of the robot control device 230 is described with reference to FIG. 57. FIG. 57 is a diagram illustrating an example of the functional configuration of the robot control device 230. The robot control device 230 includes the storage portion 32 and a control portion 236.

The control portion 236 controls the entire robot control device 230. The control portion 236 includes the image capturing control portion 40, the image acquisition portion 42, an image process portion 244, and the robot control portion 46. These functional portions included in the control portion 236 are realized, for example, by the CPU 31 executing various programs stored in the storage portion 32. A portion or all of these functional portions may be hardware functional portions such as a large scale integration (LSI) or an application specific integrated circuit (ASIC).

The image capturing control portion 40 causes the third image capturing port ion 23 and the fourth image capturing portion 24 to stereoscopically capture the capture range including the work area.

The image acquisition portion 42 acquires the captured images stereoscopically captured by the third image capturing portion 23 and the fourth image capturing portion 24 from the third image capturing portion 23 and the fourth image capturing portion 24.

The image process portion 244 performs various image processes with respect to the captured image acquired by the image acquisition portion 42. The image process portion 244 includes a grayscale process portion 250, a second threshold value setting portion 251, a binarization process portion 252, an area detection portion 253, a labeling portion 254, a marker detecting portion 255, an evaluation value calculating portion 256, and a first threshold value determining portion 257.

The grayscale process portion 250 converts the captured image acquired by the image acquisition portion 42 into the grayscale image.

The second threshold value setting portion 251 sets a second threshold value which is a temporary threshold value for binarizing the grayscale image into the binarization process portion 252.

The binarization process portion 252 converts the grayscale image into the binarized image based on the second threshold value set in the second threshold value setting portion 251. The binarization process portion 252 converts the grayscale image into the binarized image based on the first threshold value determined by the first threshold value determining portion 257.

The area detection portion 253 detects one or more partial areas from the binarized image. The partial area that the area detection portion 253 detects is a white partial area which is an area configured only with one or more white pixels in the aforementioned captured image and a black partial area configured only with one or more black pixels in the aforementioned captured image. In a case where pixels having the same color as the color of the aforementioned pixel exist around eight pixels with the pixel selected from the aforementioned captured image exists, the area detection portion 253 regards these pixels as pixels included in one connected partial area.

The labeling portion 254 performs labeling for differentiating the partial area detected by the area detection portion 253. For example, the labeling portion 254 performs labeling by associating the areas ID with each of the aforementioned partial areas.

The marker detecting portion 255 detects the figure center marker from the binarized image.

The evaluation value calculating portion 256 calculates the number of partial areas labeled by the labeling portion 254 and the number of figure center markers detected by the marker detecting portion 255. The evaluation value calculating portion 256 calculates the evaluation value for evaluating whether the second threshold value that the second threshold value setting portion 251 sets for the binarization process portion 252 is appropriate for detecting the marker or not, based on the number of the calculated aforementioned partial areas and the number of the aforementioned figure center markers.

The first threshold value determining portion 257 determines the second threshold value of the highest evaluation value from the plural second threshold values as the first threshold value which is the threshold value appropriate for detecting the marker based on the evaluation value calculated by the evaluation value calculating portion 256 for each of the plural second threshold values that the second threshold value setting portion 251 sets for the binarization process portion 252. Instead of this, the first threshold value determining portion 257 may have a configuration for determining the other second threshold value as the first threshold value based on the aforementioned evaluation value. In this case, for example, the first threshold value determining portion 257 determines the second threshold value selected based on the predetermined rule as the first threshold value, among the second threshold values which are the predetermined value or greater. For example, the predetermined rule may be a rule for randomly selecting the second threshold value setting to be the first threshold value among the second threshold values which are the predetermined value or greater, a rule for selecting the maximum second threshold value as first threshold value, among the second threshold values which are the predetermined value or greater, or may be a rule for selecting the minimum second threshold value as the first threshold value from the second threshold values which are the predetermined value or greater.

The robot control portion 46 causes the robot 220 to perform the predetermined work based on the figure center marker that the marker detecting portion 255 detects.

Figure 58:
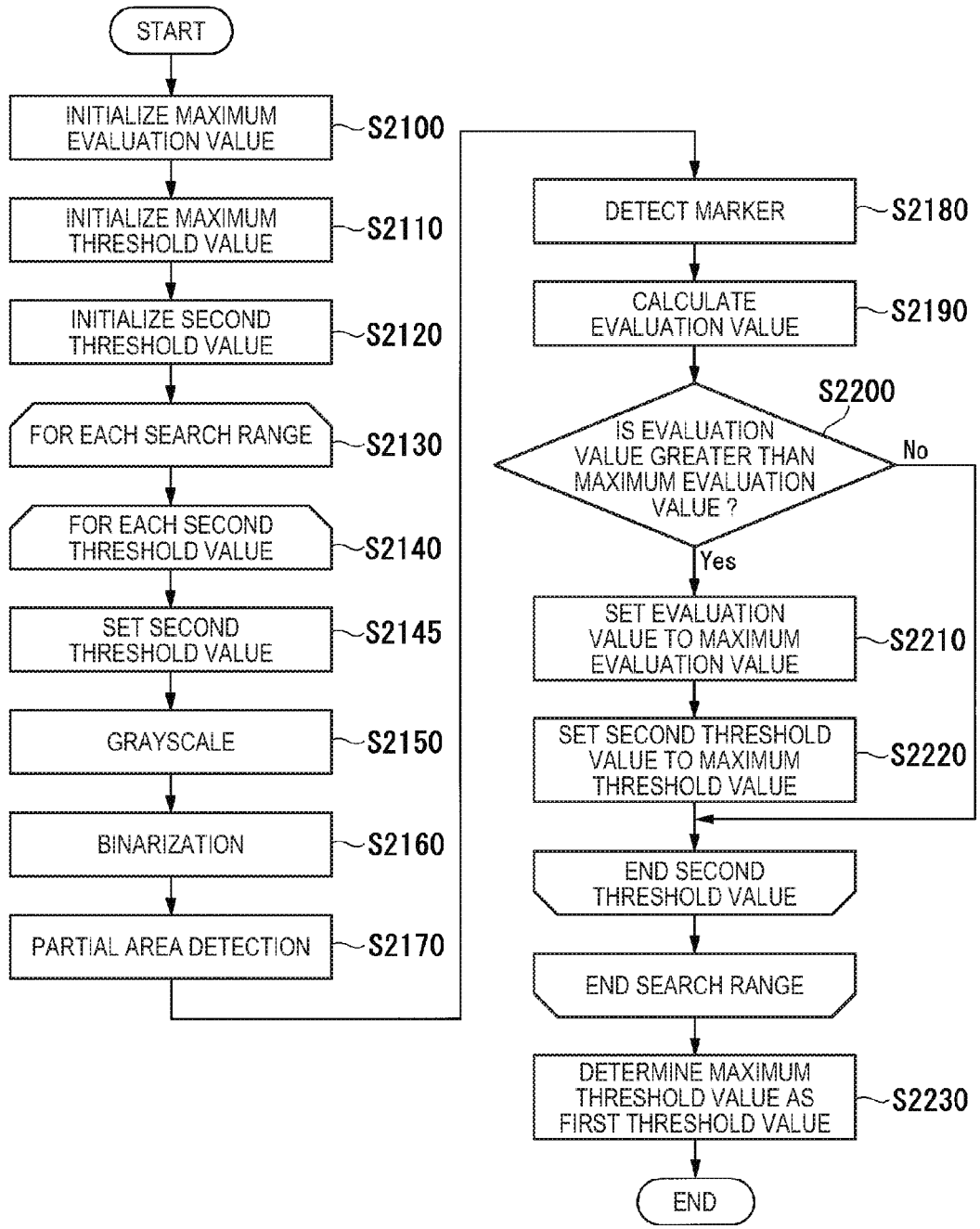
FIG. 58 is a flow chart illustrating an example of a flow of a process that a control portion performs in order to determine the first threshold value.

With Respect to Flow of Process that the Control Portion 236 Performs in Order to Determine First Threshold Value Hereinafter, a process that the control portion 236 performs in order to determine the first threshold value is described with reference to FIG. 58. FIG. 58 is a flow chart illustrating an example of a flow of the process that the control portion 236 performs in order to determine the first threshold value. Hereinafter, a flow of a process of the control portion 236 after the image acquisition portion 42 already has acquired the captured image from the third image capturing portion 23 and the fourth image capturing portion 24.

The evaluation value calculating portion 256 initializes the maximum evaluation value used in the processes from Steps S2130 to S2230 to zero (Step S2100). Instead of this, the evaluation value calculating portion 256 may have a configuration of initializing the maximum evaluation value to another value. Subsequently, the evaluation value calculating portion 256 initializes the maximum threshold value used in the processes from Steps S2130 to S2230 to zero (Step S2110). Instead of this, the evaluation value calculating portion 256 may have a configuration of initializing the maximum threshold value to another value. Subsequently, the evaluation value calculating portion 256 initializes the second threshold value set in the binarization process portion 252 into zero (Step S2120). Instead of this, the evaluation value calculating portion 256 may have a configuration of initializing the second threshold value set in the binarization process portion 252 to another value.

The processes from Steps S2100 to S2120 may have a configuration of being performed by another functional portion that the control portion 236 has, instead of a configuration of being performed by the evaluation value calculating portion 256. The processes from Steps S2100 to S2120 may have a configuration of being performed in an order different from the order illustrated in FIG. 58 and may have a configuration of being performed in parallel.

Subsequently, the control portion 236 sets one or more search ranges with respect to the captured image acquired by the image acquisition portion 42 and repeatedly executes processes from Steps S2140 to S2220 for each of the set search ranges (Step S2130). In this example, a case where there is only one search range (that is, a case where the search range is the entire captured image) is described.

After the search range is selected in Step S2130, the second threshold value setting portion 251 selects the luminance from 0 to 255 one by one as the second threshold value and repeatedly performs the processes from Steps S2145 to S2220 for each selected second threshold value (Step S2140). For example, the second threshold value setting portion 251 selects luminance (256 integer values including 0) from 0 to 255 from 0 one by one as the second threshold value. Instead of this, the second threshold value setting portion 251 may have another configuration such as a configuration for randomly selecting luminance from 0 to 255 one by one as the second threshold value.

After the second threshold value setting portion 251 selects the second threshold value in Step S2140, the second threshold value setting portion 251 sets the aforementioned second threshold value for the binarization process portion 252 (Step S2145). Subsequently, the grayscale process portion 250 converts the captured image acquired by the image acquisition portion 42 to the grayscale image (Step S2150). Subsequently, the binarization process portion 252 converts the grayscale image converted by the grayscale process portion 250 into the binarized image in Step S2150 based on the second threshold value set for the second threshold value setting portion 251 in Step S2145 (Step S2160).

Subsequently, the area detection portion 253 detects the white partial area and the black partial area from the binarized image converted by the binarization process portion 252 in Step S2160 as the partial area. The labeling portion 254 performs labeling for differentiating each of the partial areas detected by the area detection portion 253 (Step S2170).

Here, the process of Step S2170 is described. The partial area that the area detection portion 253 detects includes a partial area detected by the noise included in the binarized image and a partial area detected by each of three or more figures that configures the figure center marker. The noise included in the binarized image includes a background other than the figure center marker in the captured image, reflection of light or interference fringe in the captured image, or flickering of luminance followed by grayscale or binarization. The area detection portion 253 detects each white partial area and each black partial area generated on the binarized image by these noises, each white partial area detected by each of the three or more figures that configures the figure center marker, and each black partial area detected by each of the three or more figures that configures the figure center marker, as the partial area. The labeling portion 254 performs labeling for differentiating each partial area detected by the area detection portion 253.

Subsequently, the marker detecting portion 255 detects the figure center marker from the binarized image converted by the binarization process portion 252 in Step S2160 (Step S2180). Here, the process of Step S2180 is described. The marker detecting portion 255 calculates the position of the figure center of each figure in a case where each partial area labeled by the labeling portion 254 in Step S2170 is set as a figure. The marker detecting portion 255 detects a combination of the figure (that is, partial area) in which three or more figure centers belong to the predetermined range as the figure center marker based on the calculated position of the figure center. Among the partial areas detected by the noise included in the binarized image, probability in which the partial area in which three or more figure centers belong to the predetermined range is detected is smaller than probability in which a partial area in which two figure centers belong to the predetermined range is detected, by several digits. Accordingly, probability in which the marker detecting portion 255 detects a partial area detected by a noise included in binarized image as the figure that configures the figure center marker is small. Therefore, according to the present embodiment, a process for removing a noise from the binarized image is not performed, but the image process portion 244 may have a configuration of performing a process removing a noise from the binarized image.

Subsequently, the evaluation value calculating portion 256 calculates the number of partial areas labeled by the labeling portion 254 in Step S2170. The evaluation value calculating portion 256 calculates the number of figure center markers detected by the marker detecting portion 255 in Step S2180. The evaluation value calculating portion 256 calculates the evaluation value based on the number of the calculated figure center markers and the number of the calculated partial areas (Step S2190). For example, the evaluation value calculating portion 256 calculates a value obtained by dividing the number of the figure center markers by the number of the partial areas as the evaluation value. The evaluation value calculating portion 256 may have a configuration of calculating another value based on the number of the figure center marker and the number of the partial areas such as a value obtained by multiplying a weight by a value obtained by dividing the number of the figure center markers by the number of the partial areas as the evaluation value.

The evaluation value calculating portion 256 determines whether the evaluation value calculated in Step S2190 is greater than the current maximum evaluation value or not (Step S2200). In a case where it is determined that the evaluation value calculated in Step S2190 is greater than the current maximum evaluation value (Step S2200-Yes), the evaluation value calculating portion 256 sets the evaluation value calculated in Step S2190 to the maximum evaluation value (Step S2210). Subsequently, the evaluation value calculating portion 256 sets the current second threshold value to the maximum threshold value (Step S2220). The second threshold value setting portion 251 proceeds to Step S2140 and selects the next luminance as the second threshold value.

Meanwhile, in a case where the evaluation value calculating portion 256 determines that the evaluation value calculated in Step S2190 is not greater than the current maximum evaluation value (Step S2200-No), the second threshold value setting portion 251 proceeds to Step S2140 and selects the next luminance as the second threshold value. After the processes from Steps S2145 to S2220 are performed on the total luminance that can be selected in Step S2140, the control portion 236 proceeds to Step S2130, selects the next search area, and further performs processes from Steps S2140 to S2220. In this example, since there is only one search area, the control portion 236 executes the processes from Steps S2140 to S2220 are performed only one time.

Figure 59:
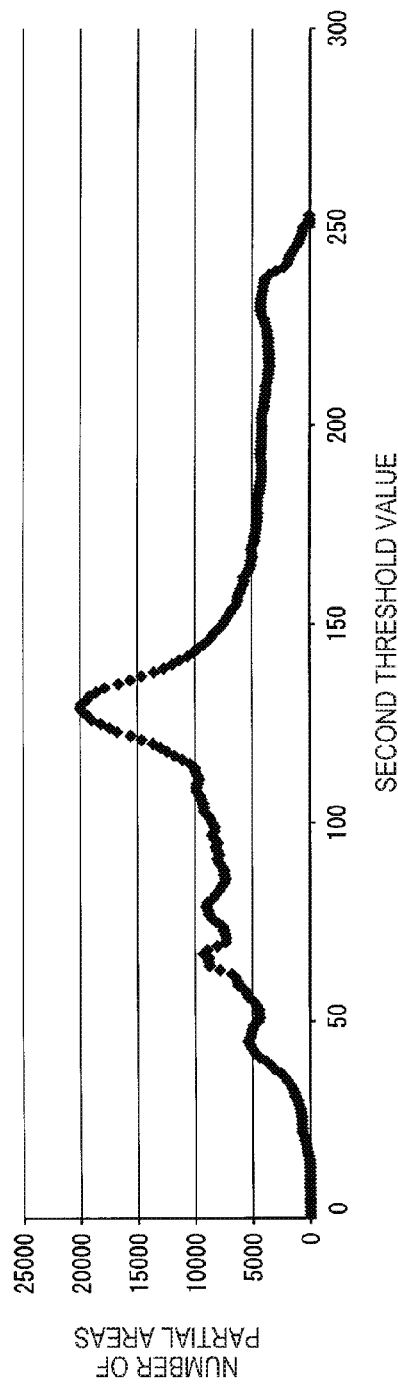
FIG. 59 is a diagram illustrating an example of a graph in which the number of partial areas detected by an area detection portion in Step S2170 is plotted for each second threshold value.

In this manner, the control portion 236 calculates the evaluation value for each second threshold value selected in Step S2140 with respect to the entire search area, that is, the entire captured image. Here, an evaluation value calculated for each second threshold value is described with reference to FIGS. 59 to 61. FIG. 59 is a diagram illustrating an example of a graph in which the number of partial areas detected by the area detection portion 253 in Step S2170 is plotted for each second threshold value. In FIG. 59, the horizontal axis indicates the second threshold value (that is, luminance selected in Step S2140) and the vertical axis indicates the number of the aforementioned partial areas.

As illustrated in FIG. 59, the luminance that can be selected as the second threshold value is 256 gradation from 0 to 255, and thus the number of partial areas becomes maximum near 127 and 128 in which the second threshold value is in the middle from 0 to 255. As the second threshold value goes far from 127 and 128, the number of the partial areas decreases. This is because probability in which the partial area detected by the noise included in the binarized image is expressed on the aforementioned binarized image in a manner of being biased on any one side of the white partial area and the black partial area is low, the number of the black partial areas decreases as the second threshold value is separated from near 127 and 128 toward 0, while the numbers of the white partial areas and the black partial areas near 127 and 128 are in the same level, and the number of the white partial areas decreases as the second threshold value is separated from near 127 and 128 toward 255. The reason that the graph illustrated in FIG. 59 has plural peaks is because the number of the partial areas detected by the figures that configure the artificially disposed figure center markers is added to the number of partial areas detected by the noise included in the binarized image.

Figure 60:
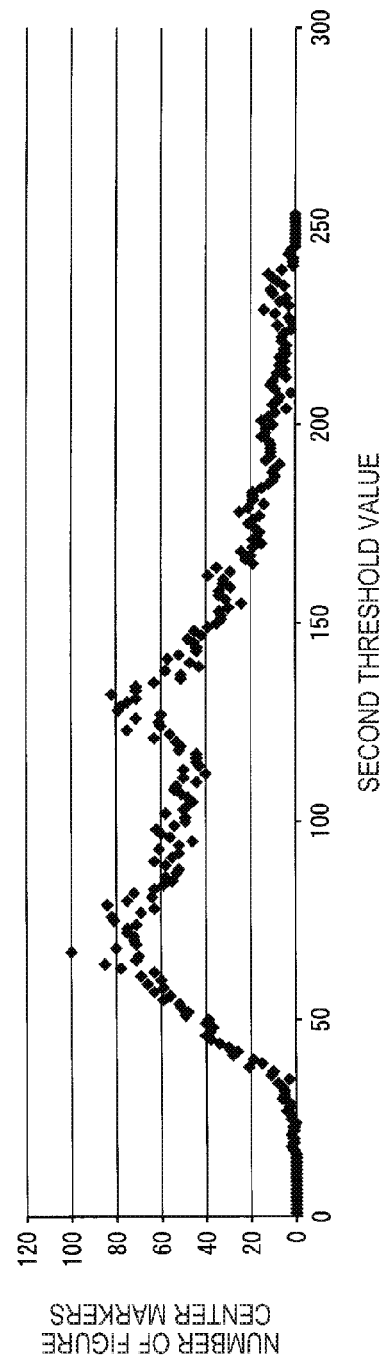
FIG. 60 is a diagram illustrating a graph in which the number of the figure center markers detected by a marker detecting portion in Step S2180 is plotted for each second threshold value.

With respect to the graph illustrated in FIG. 59, FIG. 60 is a diagram illustrating a graph in which the number of the figure center markers detected by the marker detecting portion 255 in Step S2180 is plotted for each second threshold value. In FIG. 60, the horizontal axis indicates the second threshold value (that is, luminance selected in Step S2140) and the vertical axis indicates the number of the aforementioned figure center markers.

As illustrated in FIG. 60, this graph has two peaks. The first peak is a peak near 127 and 128 in which the second threshold value is in the middle from 0 to 255. The aforementioned peak is a peak expressed by erroneous detection of the figure center marker since the figure center in a case where the partial area detected by the noise included in the binarized image is set as the figure accidently belongs to three or more predetermined ranges. The erroneous detection of the figure center marker becomes greater as the number of partial areas detected by the noise included in the binarized image becomes greater and becomes less as the number of the partial areas detected by the noise included in the binarized image becomes less. That is, the number of erroneous detection of the figure center markers is proportional to the number of the partial areas detected by the noise included in the binarized image. Therefore, the aforementioned peak is expressed near 127 and 128 in which the second threshold value is in the middle from 0 to 255. Meanwhile, the second peak is a peak expressed by the detection of the artificially disposed figure center marker.

Figure 61:
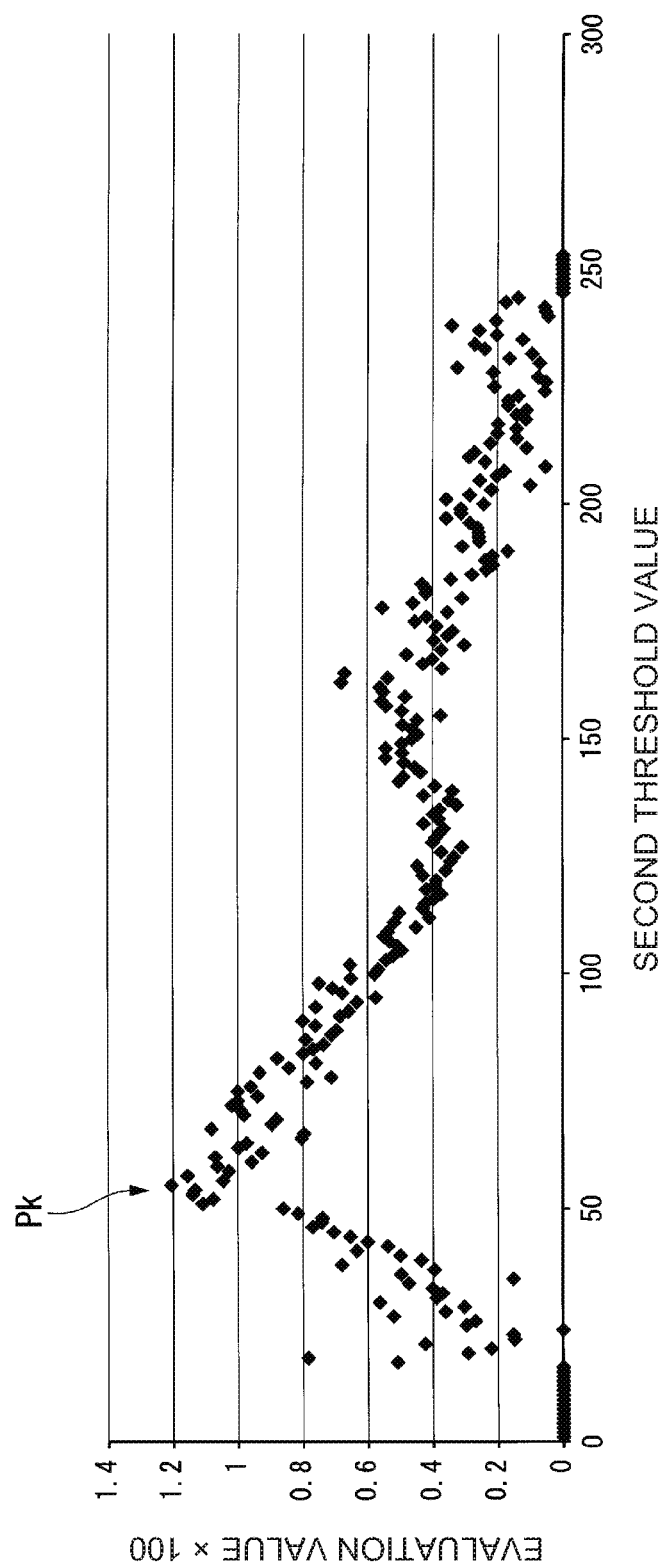
FIG. 61 is a diagram illustrating an example of a graph in which an evaluation value calculated by an evaluation value calculating portion in Step S2180 is plotted for each second threshold value.

The evaluation value calculating portion 256 calculates the evaluation value illustrated in FIG. 61 based on the number of the partial areas illustrated in FIGS. 59 and 60 and the number of the figure center markers. FIG. 61 is a diagram illustrating an example of the graph in which an evaluation value calculated by the evaluation value calculating portion 256 in Step S2180 is plotted for each second threshold value. In FIG. 61, the horizontal axis indicates the second threshold value (that is, luminance selected in Step S2140) and the vertical axis is indicated in the aforementioned evaluation value. With respect to the vertical axis of the graph illustrated in FIG. 61, in order to securely illustrate the change of the graph, the value of the evaluation value is converted to a scale of 100 times.

From FIG. 61, it is understood that the peaks expressed by the noise included in the binarized image disappear near 127 and 128 in which the second threshold value in the middle of from 0 to 255, and only a peak Pk that is expressed by detection of the artificially disposed figure center marker is expressed. This is because the number of erroneous detections of the figure center markers is proportional to the number of the partial areas detected by the noise included in the binarized image and thus the number obtained by dividing the number of the aforementioned erroneous detections by the number of the partial areas detected by the noise included in the binarized image tends to be substantially constant regardless of the number of the second threshold value. Accordingly, the control portion 236 can detect the entire figure center markers from the binarized image by binarizing the grayscale image using the second threshold value calculated by the evaluation value in the peak Pk.

By using this, after the evaluation value is calculated for each second threshold value selected in Step S2140 with respect to the entire search area, that is, the entire captured image (after processes from Steps S2130 to S2220 end), the first threshold value determining portion 257 determines the current maximum threshold value to be the first threshold value (Step S2230) and ends the process. The aforementioned maximum threshold value is, for example, a second threshold value calculated by the evaluation value in the peak Pk illustrated in FIG. 61.

In the flow chart illustrated in FIG. 58, a process in which the robot control device 230 determines the first threshold value based on the captured image stereoscopically captured by the third image capturing portion 23 and the fourth image capturing portion 24, that is, the captured image including the marker (in this example, each of the markers Mk11 to MkN) of which the position is to be detected in the predetermined work. However, the process for determining the first threshold value by the robot control device 230 is not limited thereto, and may be a process for determining the first threshold value based on another image different from the aforementioned captured image and including the aforementioned marker. In this case, the image capturing condition of the aforementioned image is desirably similar to the image capturing condition of the aforementioned captured image. The image capturing condition is, for example, a condition determined according to difference in brightness of lighting on a portion or all of the one or more markers included in the aforementioned captured image when the captured image is captured, difference in disposing positions of a portion or all of the one or more markers included in the captured image, difference in day and time or season when the captured image is captured, or difference in a location at which the captured image is captured.

Figure 62:
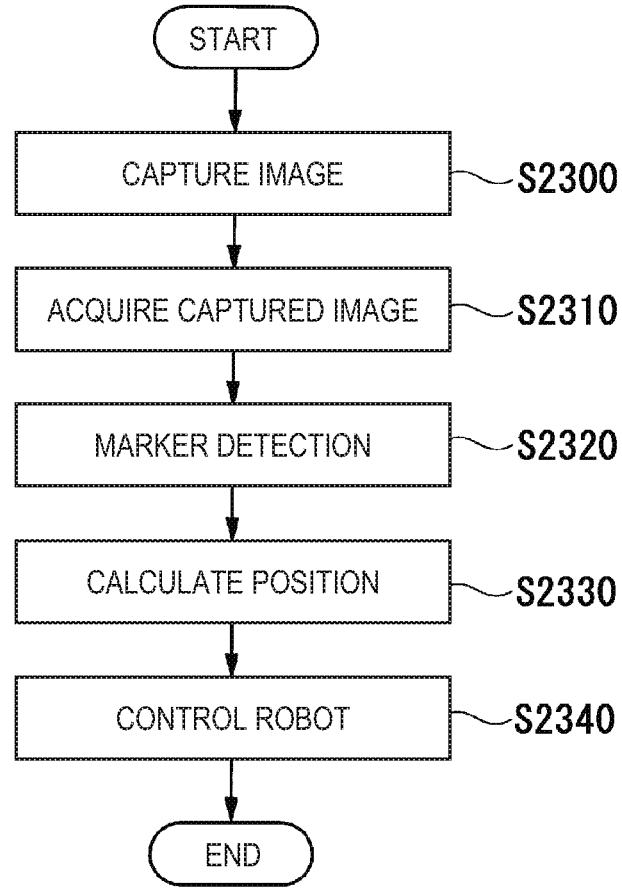
FIG. 62 is a flow chart illustrating an example of a flow of a process in which the control portion causes the robot to perform a predetermined work.

With Respect to Flow of Process in which the Control Portion 236 Causes the Robot 220 to Perform Predetermined Work Hereinafter, with reference to FIG. 62, the process in which the control portion 236 causes the robot 220 to perform the predetermined work based on the first threshold value determined by the process in the flow chart illustrated in FIG. 58 is described. FIG. 62 is a flow chart illustrating an example of a flow of the process in which the control portion 236 causes the robot 220 to perform a predetermined work. Hereinafter, the flow of the process of the control portion 236 after the first threshold value is determined by the process in the flow chart illustrated in FIG. 58 is described.

The image capturing control portion 40 causes the third image capturing portion 23 and the fourth image capturing portion 24 to stereoscopically capture the capture range including the work area illustrated in FIG. 50 (Step S300). Subsequently, the image acquisition portion 42 acquires the captured image stereoscopically captured by the third image capturing portion 23 and the fourth image capturing portion 24 in Step S300 from the third image capturing portion 23 and the fourth image capturing portion 24 (Step S310). The captured image acquired by the image acquisition portion 42 in Step S310 may be a captured image (for example, image in which position of marker is different or image in which background is different) in which a subject different from the captured image dealt in the process in the flow chart illustrated in FIG. 58 is captured or may be a captured image in which the same subject is captured. In this example, a case where the captured image acquired by the image acquisition portion 42 in Step S310 is a captured image in which the same subject as the captured image dealt in the process in the flow chart illustrated in FIG. 58 is captured is described.

Subsequently, the grayscale process portion 250 converts the captured image acquired by the image acquisition portion 42 in Step S310 into the grayscale image. The binarization process portion 252 converts the grayscale image converted by the grayscale process portion 250 into the binarized image based on the first threshold value determined by the first threshold value determining portion 257 in advance. The marker detecting portion 255 detects each of the markers Mk11 to MkN which are the figure center markers illustrated in FIG. 50, from the binarized image converted by the binarization process portion 252 based on the first threshold value (Step S320).

Subsequently, the robot control portion 46 calculates respective positions of the figure centers of the markers Mk11 to MkN that the marker detecting portion 255 detects in Step S320 as respective positions of the target objects O1 to ON illustrated in FIG. 50 (Step S330). Subsequently, the robot control portion 46 causes the first arm to grip the target objects O1 to ON one by one, based on the respective positions of the target objects O1 to ON calculated in Step S330 and supplies the material supplying area (not illustrated) (Step S340). The robot control portion 46 reads the information illustrating the position of the material supplying area from the storage portion 32 in advance. The robot control portion 46 causes the first arm to supply the target objects O1 to ON to the material supplying area and ends the process.

In this manner, the control portion 236 causes the robot 220 to perform a predetermined work based on the first threshold value determined by the process in the flow chart illustrated in FIG. 58. In the flow chart illustrated in FIG. 62, a process in which the robot control device 230 binarizes the aforementioned captured image, detects the markers (in this example, each of the markers Mk11 to MkN), and performs a predetermined work based on the detected aforementioned marker, using the first threshold value determined based on the captured image in which the capture range is captured by the third image capturing portion 23 and the fourth image capturing portion 24. However, the process of detecting the aforementioned marker by the robot control device 230 is not limited thereto, and may be a process of binarizing the aforementioned captured image and detecting the aforementioned marker using the first threshold value determined based on another image different from the aforementioned captured image.

Application of Determination of First Threshold Value

Figure 63:
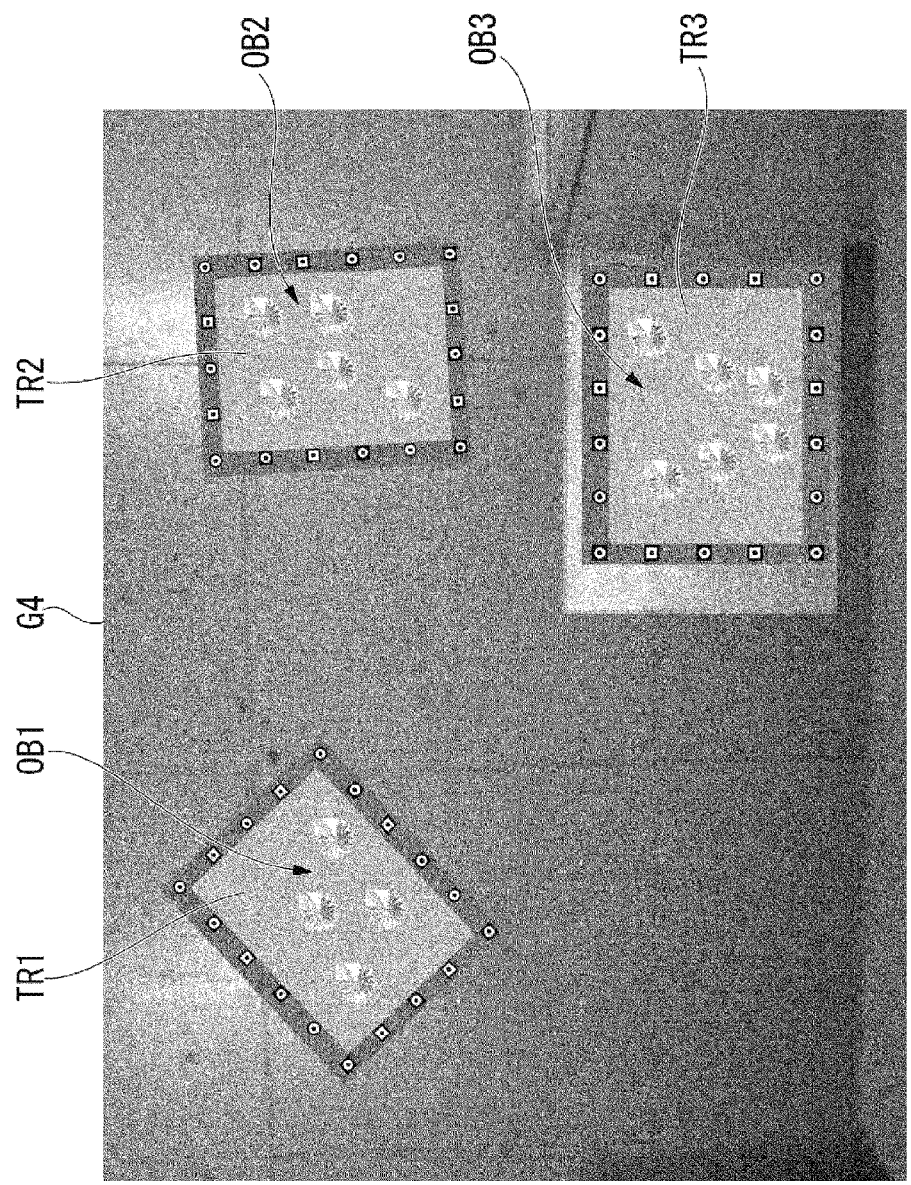
FIG. 63 is a diagram illustrating an example of a captured image in which a capture range including three trays of which circumferences are surrounded by plural figure center markers is captured.

Hereinafter, an application of the determination of the first threshold value is described with reference to FIG. 63. FIG. 63 is a diagram illustrating an example of the captured image in which the capture range including three trays of which circumferences are surrounded by plural figure center markers is captured. In FIG. 63, a captured image G4 includes a tray TR1 on which plural target objects OB1 are disposed, a tray TR2 on which plural target objects OB2 are disposed, and a tray TR3 on which plural target objects OB3 are disposed. Respective circumferences of the trays TR1 to TR3 are surrounded by plural figure center markers.

After the captured image G4 is acquired, the control portion 236 determines the luminance appropriate for detecting the figure center marker surrounding the respective circumferences of the trays TR1 to TR3 as the first threshold value, by the processes in the flow chart illustrated in FIG. 58. At this point, in a case where there are plural search areas selected in Step S2130 illustrated in FIG. 58 and each of the trays TR1 to TR3 is included in the different search areas, the control portion 236 determines the first threshold value for each of the trays TR1 to TR3.

It is likely that the luminance appropriate for detecting the figure center markers surrounding respective circumferences of the trays TR1 to TR3 is luminance appropriate for detecting an object disposed on each of the trays TR1 to TR3. Therefore, the control portion 236 determines luminance appropriate for detecting the figure center markers surrounding the respective circumferences of the trays TR1 to TR3 as luminance appropriate for detecting objects respectively disposed on the trays TR1 to TR3. In this case, the aforementioned first threshold value is luminance appropriate for detecting the objects respectively disposed on the trays TR1 to TR3.

In this example, the objects respectively disposed on the trays TR1 to TR3 are respectively the plural target objects OB1, the plural target objects OB2, and the plural target objects OB3 illustrated in FIG. 63. The control portion 236 determines luminance appropriate for detecting the objects respectively disposed on the trays TR1 to TR3 as the first threshold value, by the process in the flow chart illustrated in FIG. 58. The control portion 236 detects objects disposed on each of the trays TR1 to TR3, based on the determined first threshold value. Accordingly, the robot control device 230 can detect the objects disposed on each of the trays TR1 to TR3 with high accuracy. The control portion 236 calculates respective positions of the detected objects, causes the robot 220 to grip the aforementioned objects one by one based on the calculated positions, and supplies the aforementioned objects to the material supplying area.

The robot control device 230 described in the present embodiment has a configuration of determining the first threshold value which is the threshold value obtained by binarizing at least a portion of the captured image in which one or more figure center markers are included based on the number of the figure center markers detected from the aforementioned captured image but may have a configuration of determining the threshold value for multivaluing at least a portion of the aforementioned captured image based on the number of the figure center markers detected from the aforementioned captured image. The multivalue processing is processing of converting the grayscale image into an image with three or more colors such as ternary or teradic processing. For example, ternary processing which is an example of multivaluing processing of converting a color of a pixel having luminance of a predetermined threshold value X11 or greater and less than a predetermined threshold value X12 on the grayscale image into a first color (for example, white), converting a color of the pixel having luminance of the predetermined threshold value X12 or greater and less than a predetermined threshold value X13 on the aforementioned grayscale image into a second color (for example, red), and converting a color of a pixel having luminance of the predetermined threshold value X13 or greater and less than a predetermined threshold value X14 on the aforementioned grayscale image into a third color (for example, black). In this case, the robot control device 230 determines each of these threshold value X11 to the threshold value X14 based on the number of the figure center markers detected from the captured image included in one or more figure center markers.

The robot control device 230 described in the present embodiment may have a configuration of determining whether the figure center marker can be detected even if the binarization process is not performed and detecting the figure center marker from the captured image according to this determination result before the process of Step S2100 in the flow chart illustrated in FIG. 58. In this case, the robot control device 230 detects the figure center marker from the captured image that the image acquisition portion 42 acquires from the third image capturing portion 23 and the fourth image capturing portion 24 before the process of Step S2100. The robot control device 230 determines whether the detection of the figure center marker by the aforementioned detection succeeds or not. In a case where it is determined that the detection of the figure center marker succeeds, the robot control device 230 executes the processes of Steps S330 to S340 in the flow chart illustrated in FIG. 62 based on the detected figure center marker without determining the first threshold value (without performing binarizing). Meanwhile, in a case where it is determined that the detection of the figure center marker fails, the robot control device 230 executes the processes of Steps S2100 to S2230 in the flow chart illustrated in FIG. 58 and determines the first threshold value. The robot control device 230 executes the processes of Steps S300 to S340 illustrated in FIG. 62, based on the determined first threshold value.

As described above, the robot control device 230 (or image processing device independent from the robot control device 230) of the robot 220 according to the present embodiment determines the first threshold value which is the threshold value for multivaluing at least a portion of the image (in this example, captured image described above) that the one or more markers include (in this example, figure center marker) based on the number of the detected markers from the aforementioned image or an image (in this example, captured image in which a subject is captured different from the image in which one or more markers are included) different from the aforementioned image. Accordingly, the robot control device 230 can detect the marker with high accuracy.

The robot control device 230 determines the first threshold value based on the number of the markers detected from the image according to the change of the second threshold value which is the temporary threshold value used for determining the first threshold value. Accordingly, the robot control device 230 detects the marker with high accuracy based on the first threshold value determined based on the number of the markers detected from the image according to the change of the second threshold value.

The robot control device 230 determines the first threshold value based on the number of the markers and the number of the areas detected when the aforementioned image is multivalued using the second threshold value. Accordingly, the robot control device 230 can detect the marker with high accuracy based on the first threshold value determined based on the number of the markers and the number of the areas detected when the aforementioned image is multivalued using the second threshold value.

The robot control device 230 determines the first threshold value which is the threshold value obtained by binarizing at least a portion of the image in which the one or more markers are included, based on the number of the markers detected from the aforementioned image or the image different from the aforementioned image. Accordingly, the robot control device 230 can detect the marker from the image binarized using the first threshold value.

The robot control device 230 determines the first threshold value which is the threshold value obtained by multivaluing at least a portion of the image in which the one or more figure center markers are included based on the number of the markers detected from the aforementioned image or the image different from the aforementioned image. Accordingly, the robot control device 230 can detect the figure center marker with high accuracy.

The robot control device 230 detects the target object from the image using the first threshold value. Accordingly, the robot control device 230 can detect the target object with high accuracy.

The image process portion 244 in the control portion 236 may be independent from the robot control device 230 as the image processing device. In this case, the robot 220, the robot control device 230, and the aforementioned image processing device configure the robot system. In this case, the image processing device may have a configuration of outputting the information based on the detected marker to another device different from the robot control device 230 and causing the aforementioned another device to display the aforementioned information such as augmented reality (AR). The information based on the detected marker is information associated with the aforementioned marker.

A portion or all of the first image capturing portion 21, the second image capturing portion 22, the third image capturing portion 23, and the fourth image capturing portion 24 may be an image capturing portion independent from the robot 220. In this case, the robot 220, the image capturing portion independent from the robot 220, the robot control device 230, and the image processing device configure the robot system.

Above, embodiments of the invention are described in detail with reference to the drawings. However, the specific configurations are not limited to the embodiments described above, and can be changed, modified, or deleted without departing from the gist of the invention.

Programs for realizing functions of arbitrary components in the devices (for example, the robot control device 30 of the robot 20 or an image processing device independent from the robot control device 30) described above are stored in a computer readable recording medium and executed by causing these programs to be read by a computer system and to be executed.

Here, the "computer system" includes hardware such as an operating system (OS) or a peripheral device. The "computer readable recording medium" refers to a storage device such as a portable medium such as a flexible disk device, a magneto-optic disk, ROM, and compact disk (CD)-ROM, and a hard disk built in a computer system. The "computer readable recording medium" includes a medium storing a program for a certain period of time, such as a server in a case where the program is transmitted via a network such as the Internet or a communication circuit such as a telephone circuit or a volatile memory (RAM) inside a computer system that becomes a client.

The program may be transmitted to another computer system via a transmission medium or by transmission waves in the transmission medium, from the computer system in which the program is stored in the storage device. Here, the transmission medium that transmits the program refers to a medium having a function of transmitting information, such as the network such as the Internet (communication network) or a communication circuit (communication line) such as a telephone circuit.

The program may be a program for realizing a portion of the function described above. The program may be a program realizing a combination of the function with a program stored in the computer system, that is, a so-called differential file (differential program).

The entire disclosure of Japanese Patent Application No. 2015-204360, filed Oct. 16, 2015, No. 2015-205301, filed Oct. 19, 2015 and No. 2015-204358, filed Oct. 16, 2015 are expressly incorporated by reference herein.

What is claimed is:

1. A control device including an image processing device that detects a marker,
wherein the marker includes a first figure in which three or more figure centers are overlapped with each other and a data area provided on an internal or external portion of the first figure, and the image processing device detects the first figure, detects the figure centers of the first figure, determines a multiplicity based upon the detected figure centers, and detects the data area based on the figure centers of the first figure and the determined multiplicity, wherein the multiplicity comprises a number of overlapped figure centers corresponding to the detected figure centers, wherein the control device causes actuation of at least one device controlled by the control device according to a code within the data area.

2. The control device according to claim 1,
wherein the image processing device detects the data area based on a direction passing through the figure centers of the first figure.

3. The control device according to claim 2,
wherein the data area is detected by changing the direction with the figure centers of the first figure as a center.

4. The control device according to claim 1,
wherein the data area has a figure having a smaller number of the overlapped figure centers compared with the first figure.

5. The control device according to claim 1,
wherein the marker has a second figure in which three or more figure centers are overlapped with each other, and the data area is positioned between the first figure and the second figure.

6. The control device according to claim 5,
wherein the data area is detected based on a direction in which the figure centers of the first figure and the figure centers of the second figure are connected to each other.

7. A robot comprising:
the control device according to claim 1.

8. A robot comprising:
the control device according to claim 2.

9. A robot comprising:
the control device according to claim 3.

10. A robot comprising:
the control device according to claim 4.

11. A robot comprising:
the control device according to claim 5.

12. A robot comprising:
the control device according to claim 6.

13. A robot system comprising:
an image capturing device capturing a captured image including a marker; and
a robot according to claim 7.

14. An object comprising:
a marker disposed on the object, the marker comprising:
a first figure in which three or more figure centers are overlapped with each other and arranged over the marker to indicate a multiplicity associated with the three or more figure centers, the multiplicity comprising a number of overlapped figure centers corresponding to the first figure, and
a data area provided on an external portion of the first figure, the data area including one or more code figures indicative of an operation to be performed by a robot after the robot detects the data area.

15. The object according to claim 14, comprising:
a second figure in which three or more figure centers are overlapped with each other,
wherein the data area is positioned between the first figure and the second figure, wherein the first figure and the second figure are disposed on the object.

16. A robot comprising:
an image capturing device that is configured to stereoscopically capture an image;
a robot arm; and
a control device that is configured to:
    detect a marker within image, the marker including a first figure in which three or more figure centers are overlapped with each other;
    determine at least one figure center of the three or more figure centers based upon the stereoscopically captured image;
    determine a multiplicity based upon the determined at least one figure center, the multiplicity comprising a number of overlapped figure centers corresponding to the first figure;
    determine a data area associated with the marker based upon the at least one figure center and the multiplicity;
    determine a posture of the marker within a robot coordinate system based upon the determined at least one figure center; and
    cause the robot arm to actuate based upon a code within the data area.

17. The robot as recited in claim 16, wherein the control device is further configured to calculate at least one of a position or a posture of the marker based upon the first figure.

18. The robot as recited in claim 16, wherein the control device is further configured to detect a sign comprising a portion of a fixed code within the marker and along a periphery of the first figure based upon the at least one figure center and the multiplicity.

19. The robot as recited in claim 18, wherein the control device is further configured to detect an entire fixed code based on the determined at least one figure center and the sign, wherein the control device causes the image capturing device to capture the entire fixed code by operating the image capturing device within a predetermined search range in a direction from the at least one figure center to the sign.

* * * * *